:::

United States Patent
Ilic et al.

(10) Patent No.: US 10,282,069 B2
(45) Date of Patent: May 7, 2019

(54) DYNAMIC PRESENTATION OF SUGGESTED CONTENT

(71) Applicant: Microsoft Technology Licensing, LLC, Redmond, WA (US)

(72) Inventors: Andreja Ilic, Nis (RS); Ivan Vujic, Novi Beograd (RS); Miloš Jovanovic, Belgrade (RS); Aljoša Obuljen, Novi Beograd (RS); Karim T. Farouki, Seattle, WA (US); Jennifer Michelstein Halberstam, Kirkland, WA (US); Katrika Morris, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 233 days.

(21) Appl. No.: 14/503,174

(22) Filed: Sep. 30, 2014

(65) Prior Publication Data
US 2016/0092428 A1    Mar. 31, 2016

(51) Int. Cl.
*G06F 3/0484*    (2013.01)
*G06F 17/21*    (2006.01)
(Continued)

(52) U.S. Cl.
CPC ...... *G06F 3/04842* (2013.01); *G06F 3/04847* (2013.01); *G06F 17/212* (2013.01);
(Continued)

(58) Field of Classification Search
CPC .................................................. G01M 17/00
(Continued)

(56) References Cited

U.S. PATENT DOCUMENTS

| 5,031,121 A | 7/1991 | Iwai et al. |
| 5,517,621 A | 5/1996 | Fukui |

(Continued)

FOREIGN PATENT DOCUMENTS

| EP | 1555634 A1 | 7/2005 |
| EP | 2584509 A1 | 4/2013 |

(Continued)

OTHER PUBLICATIONS

Office action for U.S. Appl. No. 14/503,192, dated Dec. 7, 2015, Tumanov et al., "Optimizing a Visual Perspective of Media", 11 pages.

(Continued)

*Primary Examiner* — Joy M Weber
(74) *Attorney, Agent, or Firm* — Scott Y. Shigeta; Jacob P. Rohwer; Newport IP, LLC

(57) ABSTRACT

A dynamic presentation of contextually relevant content during an authoring experience. As a user writes about a topic, the authored content is analyzed to identify one or more keywords that may be used to identify, retrieve and present suggested content to the user. The suggested content may be received from one or more resources, such as a search engine, a data store associated with the user, social media resources or other local or remote files. Techniques described herein might also select the keywords from authored content based on a cursor position. As a result, the suggested content may change as the cursor moves to a new position in the authored content. In addition, techniques described herein provide a user interface control that allows for the selection and de-selection of one or more keywords, which allows a user to tailor the suggested content by toggling one or more controls.

20 Claims, 23 Drawing Sheets

(51) Int. Cl.
*G06F 17/24* (2006.01)
*G06F 17/30* (2006.01)
*G06F 17/22* (2006.01)
*G06F 17/27* (2006.01)

(52) U.S. Cl.
CPC ........ *G06F 17/2229* (2013.01); *G06F 17/248* (2013.01); *G06F 17/278* (2013.01); *G06F 17/30056* (2013.01)

(58) Field of Classification Search
USPC ...................................................... 715/862
See application file for complete search history.

(56) References Cited

U.S. PATENT DOCUMENTS

| | | | |
|---|---|---|---|
| 5,742,837 A | 4/1998 | Fukui | |
| 5,911,146 A | 6/1999 | Johari | |
| 6,694,053 B1 | 2/2004 | Burns et al. | |
| 6,711,291 B1 | 3/2004 | Stubler et al. | |
| 7,064,759 B1 | 6/2006 | Feierbach et al. | |
| 7,133,571 B2 | 11/2006 | Cheatle | |
| 7,260,245 B2 | 8/2007 | Harrington et al. | |
| 7,283,992 B2* | 10/2007 | Liu | G06F 17/30017 |
| 7,290,006 B2 | 10/2007 | Xie et al. | |
| 7,308,116 B2 | 12/2007 | Harrington et al. | |
| 7,466,875 B1 | 12/2008 | Siegel et al. | |
| 7,561,722 B2 | 7/2009 | Harrington | |
| 7,609,847 B2 | 10/2009 | Widdowson | |
| 7,743,323 B1 | 6/2010 | Rodriguez | |
| 7,895,197 B2 | 2/2011 | Meyer et al. | |
| 7,978,918 B2 | 7/2011 | Scalise et al. | |
| 8,175,376 B2 | 5/2012 | Marchesotti et al. | |
| 8,363,984 B1 | 1/2013 | Goldman | |
| 8,379,055 B2 | 2/2013 | Lam | |
| 8,406,515 B2 | 3/2013 | Cheattle | |
| 8,462,394 B2 | 6/2013 | Fan et al. | |
| 8,479,092 B1 | 7/2013 | Pandey | |
| 8,538,982 B2* | 9/2013 | Effrat | G06F 17/3064 707/723 |
| 8,572,209 B2 | 10/2013 | Healey et al. | |
| 8,577,913 B1* | 11/2013 | Hansson | G06F 17/30 707/767 |
| 8,660,351 B2 | 2/2014 | Tang | |
| 8,700,604 B2 | 4/2014 | Roseman et al. | |
| 8,849,725 B2 | 9/2014 | Duan | |
| 8,990,235 B2* | 3/2015 | King | G06F 17/2211 707/759 |
| 9,009,092 B2 | 4/2015 | Michelstein et al. | |
| 9,292,595 B2 | 3/2016 | Joshi | |
| 9,626,768 B2 | 4/2017 | Tumanov et al. | |
| 9,881,222 B2 | 1/2018 | Tumanov et al. | |
| 2002/0113801 A1 | 8/2002 | Reavy et al. | |
| 2002/0138519 A1 | 9/2002 | Miller | |
| 2003/0056177 A1 | 3/2003 | Nara | |
| 2003/0080995 A1 | 5/2003 | Tenenbaum et al. | |
| 2004/0013302 A1 | 1/2004 | Ma et al. | |
| 2004/0024613 A1 | 2/2004 | Harrington et al. | |
| 2004/0205643 A1 | 10/2004 | Harrington | |
| 2004/0243930 A1 | 12/2004 | Schowtka | |
| 2005/0060664 A1 | 3/2005 | Rogers | |
| 2005/0125725 A1 | 6/2005 | Gatt | |
| 2005/0157926 A1 | 7/2005 | Moravec et al. | |
| 2005/0223320 A1 | 10/2005 | Brintzenhofe | |
| 2006/0044324 A1 | 3/2006 | Shum et al. | |
| 2006/0104511 A1 | 5/2006 | Guo et al. | |
| 2006/0200759 A1 | 9/2006 | Agrawala et al. | |
| 2007/0027830 A1 | 2/2007 | Simons et al. | |
| 2007/0028165 A1 | 2/2007 | Cole | |
| 2007/0156747 A1* | 7/2007 | Samuelson | G06F 17/30873 |
| 2007/0156757 A1 | 7/2007 | Tang et al. | |
| 2007/0157080 A1 | 7/2007 | Wadsworth | |
| 2007/0174291 A1 | 7/2007 | Cooper | |
| 2007/0174307 A1 | 7/2007 | Villaron | |
| 2007/0204220 A1 | 8/2007 | Petrov et al. | |
| 2007/0257929 A1 | 11/2007 | Wade et al. | |
| 2007/0294238 A1 | 12/2007 | Citron | |
| 2007/0299821 A1 | 12/2007 | McCully et al. | |
| 2007/0300185 A1 | 12/2007 | Macbeth et al. | |
| 2008/0141171 A1 | 6/2008 | Schowtka | |
| 2008/0301126 A1 | 12/2008 | Asai | |
| 2008/0306913 A1 | 12/2008 | Newman | |
| 2009/0150364 A1 | 6/2009 | Melander | |
| 2009/0240677 A1 | 9/2009 | Parekh et al. | |
| 2009/0287680 A1* | 11/2009 | Paek | G06F 17/3064 |
| 2009/0309894 A1 | 12/2009 | Lam | |
| 2010/0017704 A1 | 1/2010 | Jaffe et al. | |
| 2010/0036717 A1 | 2/2010 | Trest | |
| 2010/0046842 A1* | 2/2010 | Conwell | G06F 17/30265 382/218 |
| 2010/0153841 A1 | 6/2010 | Haug, III | |
| 2010/0156919 A1 | 6/2010 | Bala et al. | |
| 2010/0174985 A1 | 7/2010 | Levy | |
| 2010/0211866 A1 | 8/2010 | Nicholas | |
| 2010/0228742 A1 | 9/2010 | Vandelle | |
| 2010/0251086 A1 | 9/2010 | Haumont | |
| 2010/0318888 A1 | 12/2010 | Leshner et al. | |
| 2010/0328725 A1 | 12/2010 | Gaucas | |
| 2011/0016421 A1 | 1/2011 | Krupka et al. | |
| 2011/0029635 A1 | 2/2011 | Shkurko | |
| 2011/0029860 A1 | 2/2011 | Ptucha et al. | |
| 2011/0029914 A1 | 2/2011 | Whitby | |
| 2011/0043652 A1 | 2/2011 | King et al. | |
| 2011/0052081 A1 | 3/2011 | Onoe | |
| 2011/0060761 A1 | 3/2011 | Fouts | |
| 2011/0125831 A1 | 5/2011 | Hatami-Hanza | |
| 2011/0125837 A1 | 5/2011 | Hatami-hanza | |
| 2011/0157226 A1 | 6/2011 | Ptucha | |
| 2011/0161308 A1 | 6/2011 | Andersen et al. | |
| 2011/0231754 A1 | 9/2011 | Campbell et al. | |
| 2011/0305397 A1 | 12/2011 | Piramuthu | |
| 2012/0007900 A1 | 1/2012 | Murai et al. | |
| 2012/0059838 A1 | 3/2012 | Berntson et al. | |
| 2012/0079400 A1 | 3/2012 | Nauerz | |
| 2012/0099158 A1 | 4/2012 | Matsunaga et al. | |
| 2012/0158687 A1 | 6/2012 | Fang | |
| 2012/0159314 A1 | 6/2012 | Schrier | |
| 2012/0278704 A1 | 11/2012 | Ying | |
| 2012/0303706 A1 | 11/2012 | Young et al. | |
| 2013/0036113 A1 | 2/2013 | Damera-Venkata et al. | |
| 2013/0073998 A1 | 3/2013 | Migos et al. | |
| 2013/0094034 A1 | 4/2013 | Heckler | |
| 2013/0108122 A1 | 5/2013 | Ptucha | |
| 2013/0108168 A1 | 5/2013 | Ptucha | |
| 2013/0211819 A1 | 8/2013 | Kagan et al. | |
| 2013/0212487 A1 | 8/2013 | Cote | |
| 2013/0246926 A1 | 9/2013 | Vemireddy | |
| 2013/0254615 A1 | 9/2013 | Nykyforov | |
| 2013/0262988 A1 | 10/2013 | Nakagawa | |
| 2013/0272611 A1 | 10/2013 | Nakamura | |
| 2013/0311490 A1 | 11/2013 | Mansfield | |
| 2013/0346843 A1 | 12/2013 | Murray | |
| 2014/0006424 A1 | 1/2014 | Al-Kofahi et al. | |
| 2014/0025619 A1 | 1/2014 | Michelstein | |
| 2014/0025650 A1 | 1/2014 | Lee et al. | |
| 2014/0026038 A1 | 1/2014 | Lee | |
| 2014/0032529 A1 | 1/2014 | Chang et al. | |
| 2014/0075280 A1 | 3/2014 | Laakmann et al. | |
| 2014/0075289 A1 | 3/2014 | Brant | |
| 2014/0136959 A1 | 5/2014 | Matas | |
| 2014/0149845 A1 | 5/2014 | Ansel et al. | |
| 2014/0164911 A1 | 6/2014 | Nickolov | |
| 2014/0189525 A1 | 7/2014 | Trevisiol et al. | |
| 2014/0208203 A1 | 7/2014 | Tang et al. | |
| 2014/0215312 A1 | 7/2014 | Hicks et al. | |
| 2014/0245132 A1 | 8/2014 | Schultz | |
| 2014/0281847 A1 | 9/2014 | Marra et al. | |
| 2014/0281928 A1 | 9/2014 | Tkach | |
| 2014/0289640 A1 | 9/2014 | Poornachandra | |
| 2014/0365938 A1 | 12/2014 | Black et al. | |
| 2015/0019545 A1 | 1/2015 | Chedeau et al. | |
| 2015/0019958 A1 | 1/2015 | Ying et al. | |
| 2015/0073922 A1 | 3/2015 | Epperson et al. | |
| 2015/0082159 A1 | 3/2015 | DeLuca et al. | |

(56) References Cited

U.S. PATENT DOCUMENTS

| | | |
|---|---|---|
| 2015/0127748 A1 | 5/2015 | Buryak |
| 2015/0149371 A1 | 5/2015 | Kunzang |
| 2015/0154303 A1 | 6/2015 | Shing |
| 2015/0248423 A1 | 9/2015 | Christolini |
| 2016/0062960 A1 | 3/2016 | Eggleston et al. |
| 2016/0092404 A1 | 3/2016 | Farouki et al. |
| 2016/0092405 A1 | 3/2016 | Lee et al. |
| 2016/0092406 A1 | 3/2016 | Farouki et al. |
| 2016/0092419 A1 | 3/2016 | Farouki et al. |
| 2016/0093059 A1 | 3/2016 | Tumanov et al. |
| 2016/0093080 A1 | 3/2016 | Tumanov et al. |
| 2017/0193318 A1 | 7/2017 | Tumanov et al. |

FOREIGN PATENT DOCUMENTS

| | | | |
|---|---|---|---|
| WO | WO 2001/050349 A1 | 7/2001 | |
| WO | 2013051218 A1 | 4/2013 | |
| WO | WO2013051218 | 4/2013 | |
| WO | WO2014/015081 A2 | 1/2014 | |
| WO | 2014069755 A1 | 5/2014 | |
| WO | WO2014069755 | 5/2014 | |

OTHER PUBLICATIONS

PCT Search & Written Opinion for Application No. for PCT/US2015/052765, dated Jan. 11, 2016, a counterpart foreign applictaion of U.S. Appl. No. 14/503,199, 11 pages.

Abidi, "Intelligent Information Personalization: From Issues to Strategies", 2009, 21 pages.

Written Opinion of the International Preliminary Examining Authority in PCT Application No. PCT/US2015/052764, dated Aug. 23, 2016, 7 pages.

Bioechle, et al., "OCD Dolores—Recovering Logical Structures for Dummies", 10th IAPR International Workshop on Document Analysis Systems (DAS), IEEE, 2012, pp. 245-249.

Chen, et al., "A survey of document image classification: problem statement, classifier architecture and performance evaluation", International Journal of Document Analysis and Recognition (IJDAR), Berlin, Germany, vol. 10, No. 1, Springer, 2006, pp. 1-16.

Flynn, "Document Classification in Support of Automated Metadata Extraction from Heterogenous Collections", retrieved on Feb. 17, 2016 at <<http://www.cs.odu.edu/~pflynn/dissertation/flynn-thesis-9apr2014.pdf>>, Thesis Submitted to the Faculty of Old Dominion University, 2014, pp. i-187.

Liu, et al., "Optimizing Photo Composition", In Computer Graphics Forum, 2010, vol. 29 (2), pp. 469-478.

Mao, et al., "Document Structure Analysis Algorithms: A Literature Survey", Optomechatronic Micro/Nano Devices and Components III, Proceedings of SPIE, vol. 5010, SPIE, Bellingham, WA, 2003, pp. 197-207.

PCT Search Report and Written Opinion dated Feb. 25, 2016 for PCT Application No. PCT/US2015/052539, 17 pages.

PCT Search Report and Written Opinion dated Feb. 26, 2016 for PCT Application No. PCT/US2015/052764, 14 pages.

Search & Written Opinion dated Jan. 11, 2016 in PCT Application No. PCT/US2015/052765.

Search Report & Written Opinion dated Dec. 23, 2015 in PCT Application No. PCT/US2015/052538.

Tao, et al., "Contextual modeling for logical labeling of PDF documents", Computers and Electrical Engineering, vol. 40, No. 4, 2014 pp. 1363-1375.

Zhang, et al., "Auto Cropping for Digital Photographs", In IEEE International Conference on Multimedia and Expo, 2005, 4 pages.

Fitzpatrick, Jason , "Fillerati Generates Dummy Text from Classic Literary Works", Retrieved from ttp://web.archive.org/web/20140527042603/http:// lifehacker.com/5656091/fillerati -generates -dummy -text -from -classic-literary-works>>, May 27, 2014, 3 Pages.

International Search Report and Written Opinion Issued in PCT Application No. PCT/US2015/052763, a foreign counter application to U.S. Appl. No. 14/503,188, dated Mar. 1, 2016, 13 pages.

"Loducca: Twipsum", Retrieved from <<http://adsoftheworld.com/media/online/loduccaiwipsum>>, Sep. 1, 2011, 2 Pages.

"Fillerama", Retrieved from <http://web.archive.org/web/20140701213636/http://www.macdrifter.com/2011/11/fillerama-link.html>>, Jul. 1, 2014, 4 Pages.

Office action for U.S. Appl. No. 14/503,192, dated Apr. 13, 2016, Tumanov et al., "Optimizing a Visual Perspective of Media", 12 pages.

Office Action for U.S. Appl. No. 14/503,211, dated May 18, 2016, David Benjamin Lee, "Intent Based Authoring", 18 pages.

Office action for U.S. Appl. No. 14/503,216, dated May 6, 2016, Farouki et al., "Inferring Layout Intent", 14 pages.

Office action for U.S. Appl. No. 14/503,207, dated May 6, 2016, Tumanov et al., "Optimizing the Legibility of Displayed Text", 22 pages.

"All Things Seen and Unseen", Published on: Dec. 2012, Available at: http://rmarsh.com/plugins/similar-posts/, 63pp.

"Editorial Assistant by Zemanta", Published on: May 20, 2013, Available at: https://wordpress.org/plugins/zemanta/, 5pp.

"Split-screen User Interface", Published on: Oct. 30, 2012, Available at: http://www.uscellular.com/uscellular/pdf/samsung-note-2-split-screen.pdf, 1pp.

"Techniques for WCAG 2.0", Published on: May 17, 2007, Available at: http://www.w3.org/TR/2007/WD-WCAG20-TECHS-20070517/Overview.html#G18 , 229pp.

"Text over a picture: How to Make it Readable", Published on: May 3, 2012, Available at: http://www.well-made-webs.com/visual-marketing/text-work/text-over-images/, 5pp.

"YARPP Basic vs. Pro? Why choose?", Published on: Dec. 26, 2013, Available at: http://www.yarpp.com/, 2pp.

Baumann, Alex, "Machine Learning for User Interfaces", Published on: Aug. 28, 2014, Available at: http://www.cs.uml.edu/~abaumann/HCI/HCI_-_Final_Paper-Machine_Learning.pdf, 8pp.

Eisenstein et al., "Adaptation in Automated User-Interface Design", Jan. 9, 2000, *Proceedings of the 5th International Conference on Intelligent User Interfaces*, 8pp.

Francisco-Revilla et al., "Interpreting the Layout of Web Pages", Jun. 29, 2009, *Proceedings of the 20th ACM Conference on Hypertext and Hypermedia*, 10pp.

Gajos et al., "Preference Elicitation for Interface Optimization", Oct. 23, 2005, Proceedings of the 18th Annual ACM Symposium on User Interface Software and Technology, 10pp.

Gajos, Krzysztof Z., "Automatically Generating Personalized User Interfaces", Jun. 20, 2010, Dissertation of Doctor of Philosophy, Univ. of Washington, 210pp.

Geigel et al., "Automatic Page Layout Using Genetic Algorithms for Electronic Albuming", Jan. 2001, *Proceedings of Electronic Imaging*, 12pp.

Hasegawa et al., "Recommendation and Diagnosis Services for Presentation Semantics", Nov. 29, 2010, *Proceedings of the 18th International Conference on Computers in Education*, pp. 285-289.

Leykin et al., "Automatic determination of text readability over textured backgrounds for augmented reality systems", Nov. 2, 2004, *Proceedings of the Third IEEE and ACM International Symposium on Mixed and Augmented Reality*, 7pp.

Lumley, John., "Functional, Extensible, SVG-based Variable Documents", Sep. 10, 2013, *Proceedings of the 2013 ACM symposium on Document engineering*, pp. 131-140.

Malerba et al., "Correcting the document layout: a machine learning approach", Aug. 3, 2003, *Proceedings of the Seventh International Conference on Document Analysis and Recognition*, 6pp.

Malu et al., "An Approach to Optimal Text Placement on Images", Jul. 21, 2013, *10th International Conference*, EPCE 2013, Held as Part of HCI International, 7pp.

Parker, Jeff., "Yet Another Related Posts Plugin (YARPP)", Published on: Dec. 2009, Available at: http://wordpress.org/plugins/yet-another-related-posts-plugin/, 3pp.

Suh et al., "Automatic Thumbnail Cropping and its Effectiveness", Nov. 2, 2003, *Proceedings of the 16th annual ACM symposium on User interface software and technology*, 10pp.

(56) References Cited

OTHER PUBLICATIONS

Wade et al., "Ontology Add-in for Word", Published on: Apr. 24, 2011, Available at: http://research.microsoft.com/en-us/projects/ontology/, 1pp.
PCT/US2015/052758—International Preliminary Report on Patentability, dated Dec. 20, 2016, 16 pages.
PCT/US2015/052765—International Preliminary Report on Patentability, dated Nov. 28, 2016, 13 pages.
PCT/US2015/052540—International Preliminary Report on Patentability, dated Dec. 13, 2016, 16 pages.
PCT/US2015/052763—International Preliminary Report on Patentability, dated Dec. 8, 2016, 16 pages.
PCT/US2015/052764—International Preliminary Report on Patentability, dated Nov. 28, 2016, 15 pages.
Jason Fitzpatrick, "Fillerati Generates Dummy Text from Classic Literary Works", May 27, 2014.
U.S. Appl. No. 14/503,211—Final Office Action dated Nov. 18, 2016, 22 pages.
U.S. Appl. No. 14/503,192—Notice of Allowance dated Dec. 21, 2016, 16 pages.
"Related Entires", Published on Sep. 2, 2011, 2 pages.
Martin, et al., "Automatic Multimedia Creation Enriched with Dynamic Conceptual Data", Dec. 2012, International Journal of Ariticial Intelligence and interactive Multimedia, vol. 1, No. 7, 2 pgs.
International Preliminary Report on Patentability Issued in PCT Application No. PCT/US2015/052539, dated Dec. 8, 2016, 11 Pages.
International Preliminary Report on Patentability Issued in PCT Application No. PCT/US2015/052538, dated Dec. 16, 2016, 6 Pages.
Corrected International Preliminary Report on Patentability Issued in PCT Application No. PCT/US2015/052758, dated Jan. 18, 2017, 6 Pages.
U.S. Appl. No. 14/503,199—Final Office Action dated Mar. 9, 2017, 16 pages.
U.S. Appl. No. 14/503,211—Non-Final Office Action dated Mar. 24, 2017, 44 pages.
U.S. Appl. No. 14/503,199—Non Final Office Action dated Aug. 11, 2016, 12 pages.
U.S. Appl. No. 14/503,192, Notice of Allowance dated Oct. 26, 2016, 4 pages.
U.S. Appl. No. 14/503,207—Final Office Action dated Oct. 24, 2016, 46 pages.
"International Search Report & Written Opinion Issued in PCT Application No. PCT/US2015/052540", dated Jan. 21, 2016, 12 Pages.
"Second Written Opinion Issued in PCT Application No. PCT/US2015/052540", dated Aug. 10, 2016, 6 Pages.
Written Opinion Issued in PCT Application No. PCT/US2015/052758, dated Aug. 29, 2016, 6 Pages.
Written Opinion Issued in PCT Application No. PCT/US2015/052538, dated Aug. 31, 2016, 6 Pages.
Written Opinion Issued in PCT Application No. PCT/US2015/052539, dated Aug. 26, 2016, 6 Pages.
Written Opinion Issued in PCT Application No. PCT/US2015/052763, dated Aug. 26, 2016, 7 Pages.
Written Opinion Issued in PCT Application No. PCT/US2015/052764, dated Aug. 23, 2016, 7 Pages.
Written Opinion Issued in PCT Application No. PCT/US2015/052765, dated Aug. 26, 2016, 23 Pages.
U.S. Appl. No. 14/503,192—Notice of Allowance dated Aug. 10, 2016, 16 pages.
U.S. Appl. No. 14/503,188—Non Final Office Action dated Oct. 4, 2016, 15 pages.
Shumeet Baluja, "Browsing on Small Screens: Recasting Web-Page Segmentation into an Efficient Machine Learning Framework", May 2006.
Sano, et al, "A Web Page Segmentation Method based on Page Layouts and Title Books"; IJCSNS International Journal of Computer Science and Network Security, vol. 11 No. 10, pp. 84-90, Published Oct. 2011.
U.S. Appl. No. 14/503,216—Non Final Office Action dated Sep. 26, 2016, 19 pages.
U.S. Appl. No. 15/464,157—Notice of Allowance dated Sep. 19, 2017, 9 pages.
U.S. Appl. No. 14/503,188—Non Final Office Action dated Sep. 21, 2017, 16 pages.
U.S. Appl. No. 14/503,211—Final Office Action dated Sep. 25, 2017, 23 pages.
U.S. Appl. No. 14/503,188—Final Office Action dated Apr. 27, 2017, 15 pages.
U.S. Appl. No. 15/464,157—Non-Final Office Action dated May 19, 2017, 15 pages.
U.S. Appl. No. 14/503,216, Final Office Action dated May 18, 2017, 16 pages.
U.S. Appl. No. 14/503,207—Non-Final Office Action dated Jun. 2, 2017, 24 pages.
U.S. Appl. No. 14/503,199—Non Final Office Action dated Dec. 14, 2017, 22 pages.
U.S. Appl. No. 14/503,216, Final Office Action dated Jan. 8, 2018, 15 pages.
"Final Office Action Issued in U.S. Appl. No. 14/503,188", dated May 3, 2018, 17 Pages.
"Office Action Issued in European Patent Application No. 15781217.3", dated Apr. 24, 2018, 8 Pages.
"International Search Report & Written Opinion Issued in PCT Application No. PCT/US2015/052758", dated Jan. 25, 2016, 11 Pages.
"Final Office Action Issued in U.S. Appl. No. 14/503,199", dated Jul. 25, 2018, 19 Pages.
"Office Action Issued in European Patent Application No. 15775598.4", dated Sep. 19, 2018, 8 Pages.

\* cited by examiner

DYNAMIC PRESENTATION OF SUGGESTED CONTENT

BACKGROUND

Content authors run into all types of encumbrances when creating content. For example, in some scenarios, authors may compose documents that are optimized for display on a mobile phone in portrait mode that may not be suitable for presentation when the device is used in landscape mode. In addition to formatting issues, authors may often find themselves in a situation where they may have difficulties in writing about a particular topic or they may even have difficulties coming up with a topic.

It is with respect to these and other considerations that the disclosure made herein is presented.

SUMMARY

Technologies are described herein for providing a dynamic presentation of contextually relevant content during an authoring experience. In some configurations, as a user writes about a topic, the authored content is analyzed to identify one or more keywords that may be used to identify, retrieve and present suggested content to the user. The suggested content may be received from one or more resources, such as a search engine, a data store associated with the user, social media resources or other local or remote files. Techniques described herein might also select the keywords from authored content based on a cursor position. As a result, the suggested content may change as the cursor moves to a new position in the authored content. In addition, techniques described herein provide a user interface control that allows for the selection and de-selection of one or more keywords, which allows a user to tailor the suggested content by toggling one or more controls.

According to further aspects, other information, such as data describing device capabilities of a display device, and/or consumer preferences may also be obtained and utilized when generating the layout. The generated layout may then be utilized to present the content data to the author or other user. The author may further provide feedback to request the generated layout be adjusted or re-generated. The feedback may include overriding feedback that overrides the intent interpretation used in the layout, and/or intent feedback that changes or adds more intent data for the content data.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
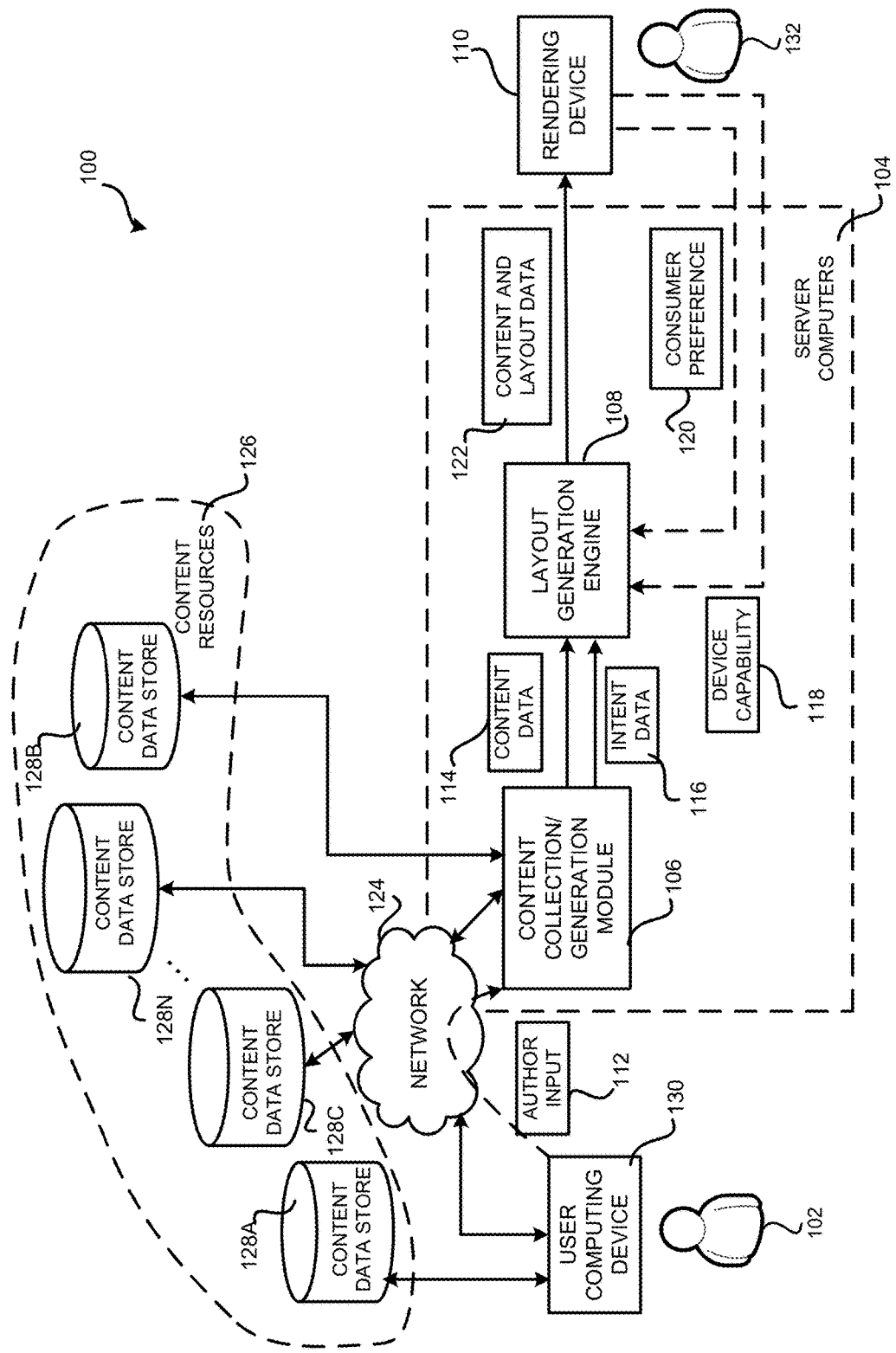
FIG. 1 is a system diagram providing an overview description of one mechanism disclosed herein for providing a content authoring service for generating a layout for content data based on user intent.

The following detailed description is directed to concepts and technologies for a dynamic presentation of contextually relevant content during an authoring experience. In some configurations, as a user writes about a topic, the authored content is analyzed to identify one or more keywords that may be used to identify, retrieve and present suggested content to the user. The suggested content may be received from one or more resources, such as a search engine, a data store associated with the user, social media resources or other local or remote files. Techniques described herein might also select the keywords from authored content based on a cursor position. As a result, the suggested content may change as the cursor moves to a new position in the authored content. In addition, techniques described herein provide a user interface control that allows for the selection and de-selection of one or more keywords, which allows a user to tailor the suggested content by toggling one or more controls.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for content authoring based on user intent. As will be described in more detail below with respect to FIGS. 19-21, there are a number of applications and services that can embody the functionality and techniques described herein.

FIG. 1 is a system diagram providing an overview description of one mechanism disclosed herein for providing a content authoring service for generating a layout for content data based on user intent. As shown in FIG. 1, a system 100 may include one or more server computers 104 supporting content authoring. The server computers 104 might include web servers, application servers, network appliances, dedicated computer hardware devices, personal computers ("PC"), or any combination of these and/or other computing devices known in the art.

The server computers 104 may execute a number of modules in order to provide content authoring services. For example, as shown in FIG. 1, the server computers 104 might include a content collection/generation module 106 for collecting and/or generating content data 114. By way of example, and not limitation, the content data 114 may include various content data elements, such as text, images, video, tweets, charts, graphs, tables, opaque web data, and/or any data elements that may be utilized in content authoring. The content data elements may be obtained from an author 102 as an author input 112 through a user computing device 130. For illustrative purposes, the author input 112 may also be referred to herein as content data where the content data retrieved from the content resource comprises a description of the identified entity. The user computing device 130 may be a personal computer ("PC"), a desktop workstation, a laptop or tablet, a notebook, a personal digital assistant ("PDA"), an electronic-book reader, a smartphone, a game console, a set-top box, a consumer electronics device, a server computer, or any other computing device capable of connecting to the network 124 and communicating with the content collection/generation module 106. The network 124 may be a local-area network ("LAN"), a wide-area network ("WAN"), the Internet, or any other networking topology known in the art that connects the user computing device 130 to the content collection/generation module 106.

When providing content data elements, the author 102 may type in text, upload images, or upload an existing file that contains the content data elements through a user interface presented to the author 102 by the content collection/generation module 106. The author 102 may also provide other data, such as the metadata for the content data elements, through the user interface. Alternatively, or additionally, the author 102 may submit content elements and/or any other data associated therewith through the user computing device 130 by utilizing an application programming interface ("API") exposed by the layout generation services.

According to further aspects, content data elements may also be obtained from various content resources 126. The content resources 126 may include local content in content data store 128A that is locally accessible to the user computing device 130 and/or in content data store 128B that is locally accessible to the server computers 104. The content resources 126 may also include remote content on content stores 128C-128N that are accessible through the network 124. For example, the remote content may include content in the author's social media account, such as posts, blogs that have been written by the author, images and/or video that have been saved under the author's account, etc. The remote content may further include content that is publicly available.

In addition to the content data 114, the content collection/generation module 106 may further obtain intent of the author 102 on how the content data 114 should be presented to consumers. For example, an author 102 may want one image to be presented more prominently than its surrounding content data. The author 102 may further want a certain block of text to be presented more noticeably than other text. The intent of the author 102 may be obtained as intent data 116 that describes relationships among two or more of the content elements in the content data 114. The intent data 116 may further indicate an intended use of the content data 114, such as being published as a blog article posted online, an article to be printed out in a newspaper, a video to be published presented to consumers, and others. It should be noted that the intent may be conveyed through high level description, and the intent data 116 may contain no specific formatting instructions. Additional details regarding the content data 114 and the intent data 116 will be provided below with regard to FIG. 3.

Once the content data 114 and the intent data 116 are obtained, the server computers 104 may employ a layout generation engine 108 to generate the layout for the content data 114 based on the intent data 116. As discussed briefly above, a layout of content data may include a macro-level scheme for presenting the content data, a mid-level scheme of arrangement for a group of content data elements of the content data, and a micro-level scheme for formatting each of the content data elements. The macro-level scheme for presenting the content data may include a high-level structure of the content data, an overall color scheme of the content data, a high-order interaction model, and/or other design elements that may be applied to the content data on a macro level. An example of the macro-level scheme may be a world scheme, which will be discussed in detail with regard to FIGS. 3-5.

The mid-level scheme of arrangement may include arrangement and/or design for a group of content data elements. To illustrate aspects of the mid-level scheme, consider an example macro-level scheme having a high-level structure organizing content data into one or more sections, where each section contains one or more content data elements. In such an example, a mid-level scheme of an arrangement may include various design aspects for each of the sections, such as the arrangement of data elements in each section, the color scheme to be applied to each of the sections, and so on. Further details regarding mid-level scheme will be discussed below with regard to FIG. 5.

As summarized above, a layout may include a micro-level scheme for each of the content data elements in the content data 114. In some configurations, the micro-level scheme may vary depending on the type of the content data element. For example, for a text content data element, the micro-level scheme may include a font design for the text, such as a font size, a font color, a typeface, and so on. The micro-level scheme for a text content data element may also include line and paragraph spacing, text alignment, bulleting or numbering, and the like. For an image content data element, the micro-level scheme may include a size of the image, a position, an aspect ratio, and/or other aspects of the image. Additional details regarding the content data elements and the micro-level scheme will be described with regard to FIG. 5. It should be understood that the macro-level scheme, the mid-level scheme and the micro-level scheme described above are for illustration only, and should not be construed as limiting. Additional layout schemes may be contained in a layout beyond those described herein, and that not every scheme described will be available for generated layout.

Once the layout is generated, data defining the layout and the content data may be communicated as an output, which for illustrative purposes is referred to herein as "content and layout data 122." Additional details regarding the layout generation engine 108 and the content and layout data 122 are provided below with regard to FIGS. 2-9. The content and layout data 122 may be then sent to a rendering device 110 and be presented to a consumer 132 of the content for consumption or be presented to the author 102 for testing and/or reviewing purposes. The rendering device 110 may be a PC, a desktop workstation, a laptop or tablet, a notebook, a PDA, an electronic-book reader, a smartphone, a game console, a set-top box, a consumer electronics device, a server computer, or any other computing device having a display associated therewith and capable of rendering content according to content and layout data 122. If the output format of the content data 114 is a printed page, the render device 110 may also include a printer.

According to further aspects, the layout generation engine 108 may also be able to obtain additional data for the generation of the layout, such as the device capability 118 of the rendering device, consumer preferences 120, and/or potentially other data. The device capability 118 may include various specifications of the rendering device 110, such as resolution, orientation, memory constraints, graphics capabilities, browser capabilities, and the like. The device capability 118 may further include static-ness/dynamic-ness, such as a printed page as opposed to usual dynamic experiences with a digital display. The consumer preferences 120 may include various features and/or styles according to which the consumer 132 may prefer the content to be presented, such as the overall structure of the content, color schemes, background, animation style, and others. The consumer preferences 120 may be provided by the consumer 132 to the layout generation engine 108 through the rendering device 110 or through any other computing device that is accessible to the consumer 132.

The additional data described above may also be taken into account by the layout generation engine 108 when generating the layout. It should be noted that, however, there might be conflicts among the various types of inputs of the layout generation engine 108. For example, the intent data 116 and the consumer preferences 120 may be intrinsically contradictory. In such scenarios, conflicts need to be solved according to various rules and the specific circumstances involved. For instance, the content data 114 may contain premium content/work-products which the authors may want to make sure the generated layout matches their corporate style and intent, and thus the consumer preferences 120 is given little weight. Conversely, consumer preferences 120 may be given a higher weight when, for example, a consumer has accessibility concerns having to do with color selection, font size, and animation style. As will be described below, in some scenarios, the intent data 116 may be inferred from an existing formatted document that contain related content data, rather than specified by the author 102, and the layout in such scenarios may be generated by assigning more weight to consumer preferences 120 than to the intent data 116.

It should be understood that the various functionalities of the content collection/generation module 106 and layout generation engine 108 described above may be implemented as a Web service provided to the author 102 for content authoring and to the consumer 132 for content consuming. For example, an author 102 may access these functionalities through a web browser to generate a layout for the content. The content may also be accessible to a consumer 132 through a web browser in which the content is presented in the generated layout.

It should be further appreciated that while the above describes that the content collection/generation module 106 and the layout generation engine 108 execute on the server computers 104, any of these modules, or a portion thereof, may be executed on the user computing device 130 and/or the rendering device 110. For example, the functionality of the content collection/generation module 106 and the layout generation engine 108 may be implemented as a software application running on the user computing device 130 operated by the author 102. In another example, some of the functionality of the content collection/generation module 106, such as obtaining author input 112 from the author 102 and/or retrieving content from content resources 126, may be implemented as a client software application that executes on the user computing device 130. The client software application may send the obtained content data 114 and intent data 116 to the layout generation engine 108 for layout generation.

Similarly, some of the functionality of the layout generation engine 108 may be implemented as a client software application that can execute on the rendering device 110. For example, functionalities such as simple adjustment of the generated layout may be included in and implemented by the client software application without contacting the server computers 104. Such client software application may be further configured to collect data, such as the device capability 118 and the consumer preferences 120, and to send to the layout generation engine 108 for layout generation or major layout modification.

Figure 2:
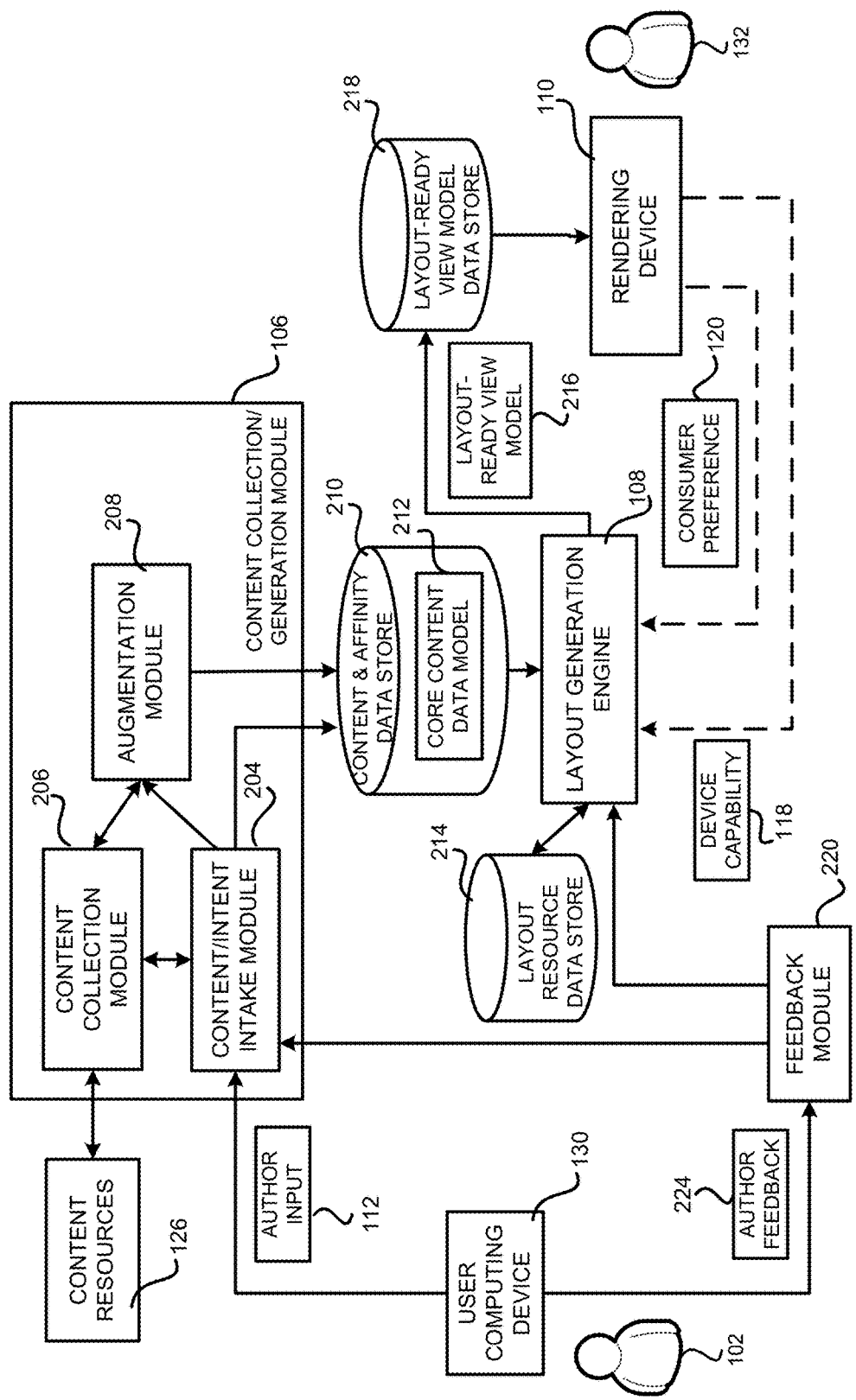
FIG. 2 is a block diagram illustrating further aspects of the techniques and technologies presented herein for content authoring based on author intent.

Turning now to FIG. 2, where a block diagram is shown to illustrate further aspects of the techniques and technologies presented herein for content authoring based on user intent. As shown in FIG. 2, the content collection/generation module 106 may include a content/intent intake module 204 that may be employed to obtain, from the author 102, the content data 114, his/her intent data 116 for the content data 114, as well as other data provided by the author 102. In some aspects, the content/intent intake module 204 may obtain data from the author 102 through the user interface as discussed above where the author 102 may type in text, upload images, provide metadata for the content data 114, specify his/her intent for the content data 114, and/or perform other operations to convey the relevant information.

Apart from obtaining content data 114 and/or intent data 116 directly from the author 102, content data 114 and/or intent data 116 may also be obtained from various content resources 126. A content collection module 206 may be employed to collect content/intent from the content resources 126. The collected content/intent may be then sent to the content/intent intake module 204 to be combined with the content/intent directly provided by the author 102.

According to further aspects, the content collection/generation module 106 may further include an augmentation module 208 to provide additional functionality to enhance the content authoring service. For example, the augmentation module 208 may provide content suggestions to the author 102 based on the content data 114 provided by the author 102 during the authoring process. The augmentation module 208 may also generate sample content as a starting point for the author 102 to begin the authoring process. The suggested content and/or the sample content may be collected through the content collection module 206. The suggested content and/or the generated sample data may be presented to the author 102 through the content/intent intake module 204, where the author 102 may make further selection on the suggested content and/or the generated sample data. Additional details regarding the augmentation module 208 will be presented below with regard to FIGS. 13-18.

The collected and/or generated content data 114 and intent data 116 may then be provided as an output, and the output may be consumed by the layout generation engine 108 for layout generation. In the example shown in FIG. 2, the content data 114 and the intent data 116 may be organized as a core content data model 212 and stored in a content and affinity data store 210. Details regarding the core content data model 212 will be provided below with regard to FIG. 3. The layout generation engine 108 may retrieve the core content data model 212 from the content and affinity data store 210 and generate a layout based on the core content data model 212.

According to some aspects, the layout generation engine 108 may further consult a layout resource data store 214 for various layout resources when generating a layout. The layout resource data store 214 may contain various templates for macro-level schemes, mid-level schemes, and/or micro-level schemes. For example, the layout resource data store 214 may store one or more world schemes that can be utilized as the macro-level scheme for presenting the content data. The layout resource data store 214 may further contain one or more objects that may be utilized to generate templates for mid-level schemes, as will be discussed in detail with regard to FIG. 8B. The layout resource data store 214 may also contain various interpretation of user intent. For example, for a user intent to add emphasize on an image, the interpretations may include increasing the image size to be larger than the images next to it, placing the image in a page or a screen so that it has large space from the surrounding content, resizing the image so that it takes the entire screen when presented, and/or other possible interpretations. The interpretations may have one or more rules associated therewith. The rules may describe the relationship among the different interpretations, the conditions under which a particular interpretation may be adopted, suggested formatting commands when an interpretation is adopted, and so on. The layout resource data store 214 may further include other resources, such as color schemes and animation schemes, that may be applicable to the content data 114. Additional details regarding the generation of the layout will be presented below with regard to FIGS. 6-8.

As shown in FIG. 2, the generated layout along with the content data may then be output as a layout-ready view model 216 and stored in a layout-ready view model data store 218. From the layout-ready view model data store 218, the rendering device 110 may obtain and render the layout-ready view model 216 to present the content data in the generated layout to the consumer 132 or the author 102. Additional aspects regarding the layout-ready view model 216 are provided below with regard to FIG. 3.

According to further aspects, a feedback module 220 may be employed to obtain the feedback 224 from the author 102 with regard to the presented layout. Depending on the nature of the feedback, the feedback may be sent to the layout generation engine 108 to adjust the generated layout, or it may be sent to the content collection/generation module 106 to enable a re-generation of the layout. By way of example, and not limitation, an author 102 may provide an intent feedback that changes his/her intent provided initially, and such an intent feedback may be taken through the content/intent intake module 204 and utilized to modify the core content data model 212 used for the generation of the layout. Alternatively, or additionally, an author 102 may provide a feedback for refining the generated layout by, for example, asking for an alternative layout to be presented, pointing out what went wrong with the generated layout, offering example solutions to the unsatisfied portion of the layout, or even providing specific formatting commands to be used for certain content data elements. Further details regarding the feedback processing will be presented below with regard to FIGS. 10-12.

Figure 3:
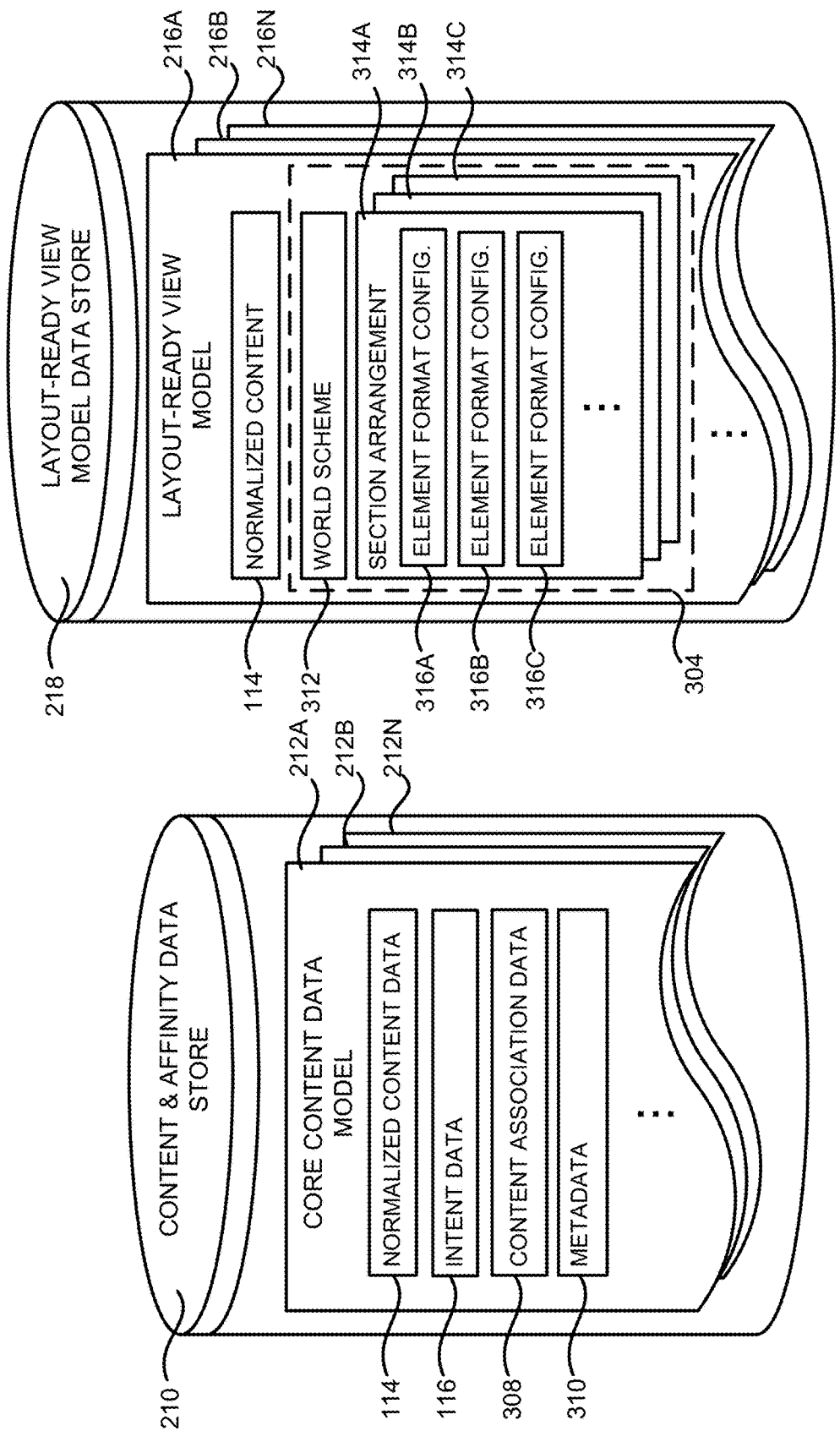
FIG. 3 is a data structure diagram illustrating a number of data elements contained in a core content data model and in a layout-ready view model.

FIG. 3 illustrates detailed data elements contained in a core content data model 212. As shown in FIG. 3, a content and affinity data store 210 may contain one or more core content data models 212A-212N, which may be referred to herein individually as a core content data model 212 or collectively as the core content data models 212. Each of the core content data models 212 may correspond to authored content to be presented as one output. As illustrated in FIG.

3, a core content data model 212 may include normalized content data 114, intent data 116, content association data 308, metadata 310 and potentially other data. The normalized content data 114 may include content data elements that do not have any formatting associated therewith. For example, if a content data element of the normalized content data 114 includes a block of text, the content data element may only include American Standard Code for Information Interchange ("ASCII") codes of the characters included in the text.

The core content data model 212 may further include the intent data 116 that describes the intent of the author 102 on how the content data 114 should be presented. The intent may include the explicit or implicit intent of the author, and may be conveyed by the author 102 through indicating relationships or selecting presentation choices for the content data elements contained in the content data 114, rather than providing specific/direct formatting commands. The intent of the author 102 may include semantic intent and presentation intent. Examples of semantic intent may include, but are not limited to, order, groups, before/after comparison, visual stack, increased emphasis, and others. Examples of presentation intent may include spacing, such as tight or loose, appearance, as such modern, traditional, or professional, animation level, such as no animation, modest animation, or active animation, timing, and others. Data defining the intent may be referred to herein as intent data 116.

By utilizing intent, an author 102 may avoid providing specific formatting instructions, and thus allow the content data 114 to be dynamically presented in a variety of arrangements that are suitable for different rendering devices without deviating from the original intent of the author 102. To facilitate the author 102 to communicate his/her intent, various relationships may be designed and offered to the author 102 to choose from. For example, a relationship "emphasis" may be designed to allow the author 102 to express intent such as "emphasize this text" or "this element is more important than this other element." Based on such intent, the corresponding text or elements may be formatted as appropriate, such as through resizing, underlining, changing color, and/or any other ways that could distinguish the text or the element from other elements. Table I illustrates a list of example relationships that may be utilized by the author 102 to describe his/her intent.

TABLE I

| Relationship | Example | Explanation |
| --- | --- | --- |
| Parent/child hierarchies | Title/body; An outline | Hierarchy within authored content |
| Peripheral | A sidebar with a related story; A comment feed about the current image | Visually related to some content in the authored content, but not part of the main story |
| Sequence | A sequence of events; An unordered collection of photos | Identifies if the content has a specific ordering |
| List | The features of a product; The steps in a recipe; | Implies some visual alignment associated with 'list' |
| Emphasis | The author's favorite picture of several; The important phrase in a paragraph; | Make this one stand out compared to its peers |
| Showcase | A gorgeous high-resolution image, which is the centerpiece of the authored content; An architectural diagram that the author wants to focus on | This content stands on its own, and should be a big as possible. The author may want to linger here to get the full impact. |
| Optional | The verbose product details including pricing and configuration options, available for several different items in the authored content. | Pacing: indicates this content is only available on request, not part of the main walk-through |
| Reveal | The punch line; The solution; The surprise | Pacing: a hint that the author is building suspense to a conclusion, and the conclusion should not be visible until the author is ready for it. |
| Pull Quote | A quotation pulled out of the content for visual effect | |
| Background Image | An author chosen image | An author chosen high-resolution image which explicitly doesn't need to be inspected carefully, but is representative of the subject matter and makes a great backdrop |
| Teaser | the title and background image from a chapter/section, used as a preview for the chapter/section before drilling in. | Can be auto-generated or authored. Allows a summary view glimpse of more detailed content before drilling in |
| Continuity | A series of images with a single subject; A before/after comparison which should always be comparable and on-screen at the same time | These things go together, and are separate from content before or after. These things should be on-screen together |

TABLE I-continued

| Relationship | Example | Explanation |
| --- | --- | --- |
| Crop/Salient region | The focus of the picture | Identifies important (and unimportant) regions of an image so that we can crop or otherwise obscure portions of the image without missing the point of the image. |

It should be noted that the author 102 may not need to provide all of the different types of intent described above. Instead, the author 102 may start with intent data 116 that is predefined in a template and then refine and/or adjust his/her intent when necessary. As will be described in more detail below, the intent data 116 may also be obtained from other sources other than the author 102. For example, the intent data 116 may be derived from a structure or formatting information of content data retrieved from content resources 126. When an article is retrieved from the content resources 126, the structure of the article may indicate that the title of the article as well as the title of each section should be given more emphasis than other parts of the article. Similarly, the intent data 116 may also be inferred from other content or documents related to the content data 114, such as a document provided by the author 102 where content data 114 may be retrieved or a document having a similar style to what the author 102 wants. Based on the derived or inferred intent data 116, the author 102 may further make adjustment or additions to convey his/her intent for the content data 114.

According to further aspects, the core content data model 212 may also include content association data 308 that describes relationships between content data elements in the content data 114 and/or other content that may be related to the content data 114. For example, the normalized content data 114 may include an image with an original resolution of 2400×3200. When presenting such a high-resolution image on a smart phone device with a low resolution display, it may not be necessary to transmit the original image to the smartphone. Instead, the original image may be down-sampled to generate an image with a lower resolution to be transmitted to the smartphone. In such a scenario, the content association data 308 may be utilized to indicate that the original image has an image with a lower resolution associated therewith and may be utilized when proper.

In addition, as will be discussed in detail regarding FIGS. 13-15, content related to the content data 114 may be explored and retrieved from content resources 126. The content association data 308 may also be utilized to describe the relationship between the retrieved content and the content data 114. It should be noted that during the lifecycle of the content data 114, related content may continuously be identified and/or retrieved, and thus the content association data 308 may be updated periodically to reflect the newly identified related content.

Depending on the content data 114, some of the content data elements may have metadata associated therewith. Such metadata may be stored in the metadata 310 of the core content data model 212. For example, the metadata 310 may include metadata of a picture contained in the content data 114, such as the location where the picture was taken, a time when a picture was taken, and/or the size of the picture. Although the metadata 310 may not be the intent directly specified by the author 102, it may be useful in deriving or inferring the intent of the author 102, and/or in generating the layout for the content data 114. It will be appreciated that additional data elements may be contained in the core content data model 212 beyond those described herein, and that not every data element described will be available for authored content.

FIG. 3 further illustrates layout-ready view models 216A-216N stored in the layout-ready view model data store 218 (which may be referred to herein individually as a layout-ready view model 216 or collectively as the layout-ready view models 216) and the data elements that may be contained in a layout-ready view model 216. A layout-ready view model 216 may be generated by the layout generation engine 108 based on a core content data model 212 in the content and affinity data store 210. When generating the layout-ready view model 216, the layout generation engine 108 may transform the intent data 116 into various formatting configurations that may together define the layout for the content data 114. These formatting configurations and the content data 114 may be stored in a layout-ready view model 216 and be ready for rendering by a rendering device 110.

Figure 4:
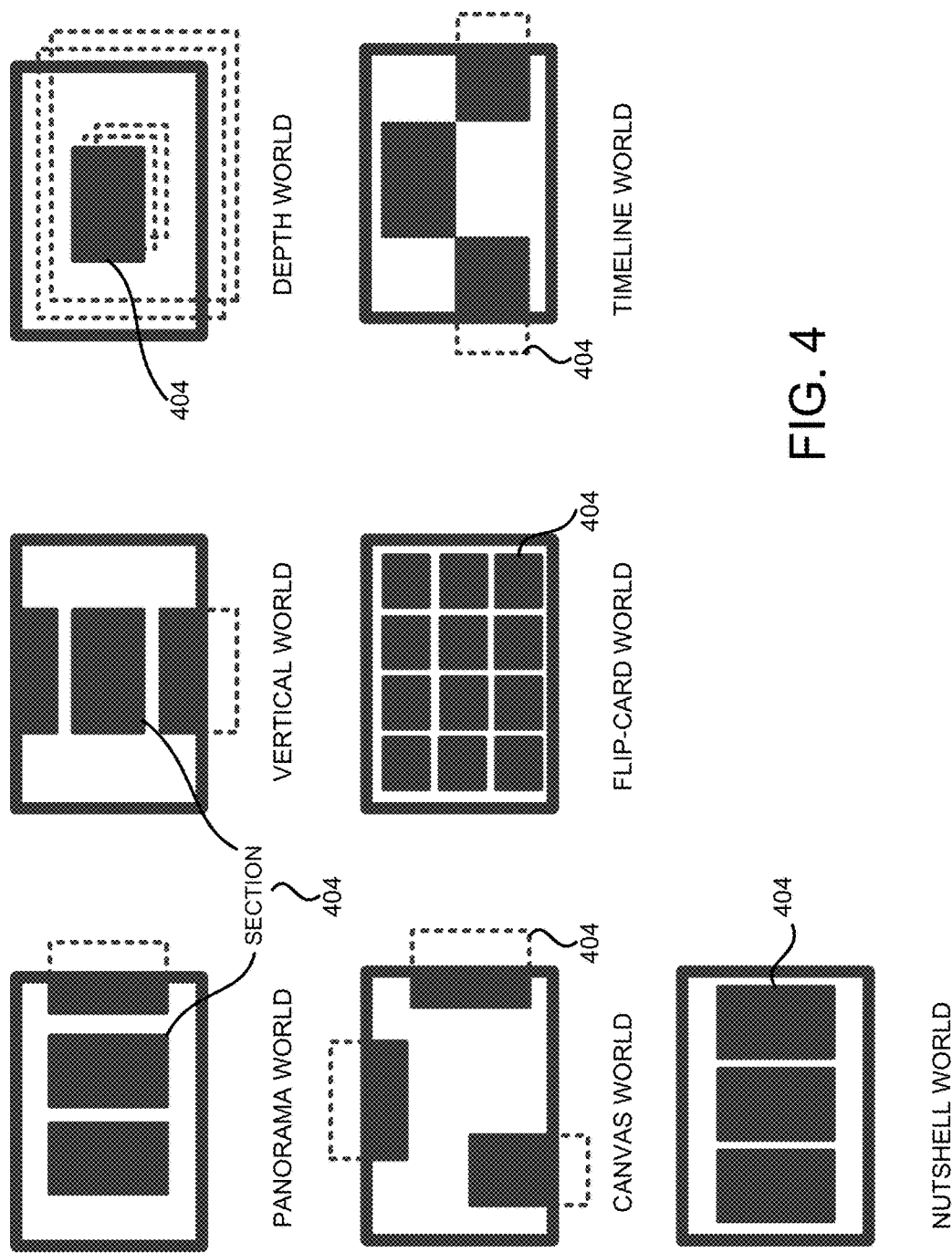
FIG. 4 illustrates example world schemes that may be utilized to generate a layout for content data.
Figure 5:
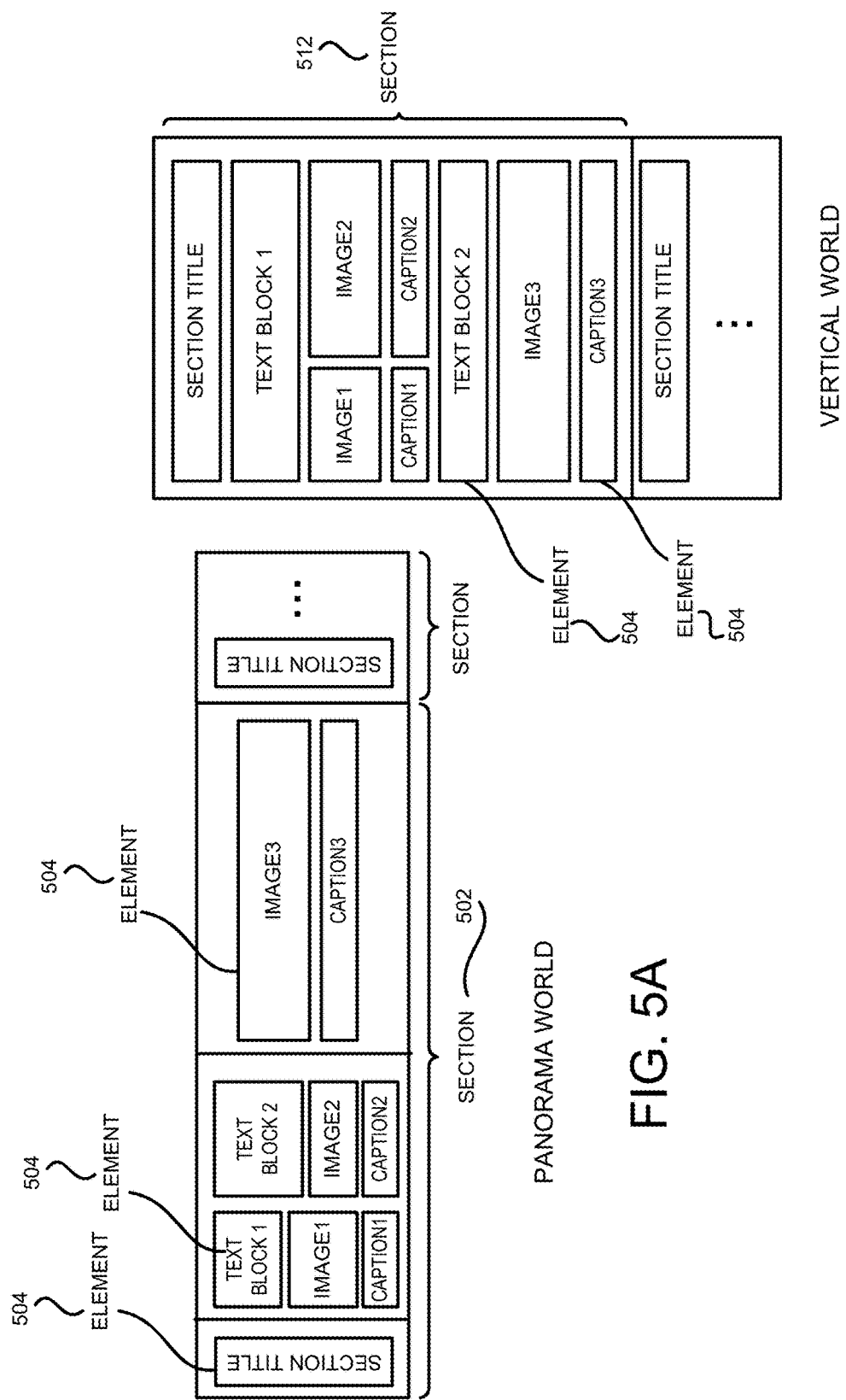
FIGS. 5A and 5B illustrate two example layouts and the components of each of the example layouts.

Specifically, the layout-ready view model 216 illustrated in FIG. 3 includes the normalized content data 114 that is to be presented, and the layout 304 of the content data 114. As discussed above, a layout of content data may include a macro-level scheme for presenting the content data, a mid-level scheme of arrangement for a group of content data elements of the content data, and a micro-level scheme for each of the content data elements. The layout 304 shown in FIG. 3 includes a world scheme 312 which may be employed as the macro-level scheme of the layout 304. The world configuration 312 may specify an overall structure of the layout 304, and describe high-order interaction assumptions, layout constraints, and/or potentially other constraints/assumptions. FIG. 4 illustrates several example world schemes that may be utilized in the layout 304 of the content data 114. A detailed description of each of the world schemes shown in FIG. 4 is provided in Table II. It should be understood that the world schemes presented in Table II are for illustration only, and should not be construed as limiting. Additional world schemes may be designed and utilized beyond those described herein.

TABLE II

| World Scheme | Description |
| --- | --- |
| Panorama World | A continuous horizontally scrolling arrangement of content, with parallax effects, simple adorning animations, and varied rates of panning to give the content a dynamic sense of liveliness. |
| Vertical World | Similar to panorama world, though continuously vertically scrolling. |
| Depth World | A 3D rendered world in which the content ultimately fits into a collection of "sections" or stories. A consumer can switch from section to section by panning in the horizontal axis, and then dive into more detail for a particular section by traversing into the world along the z-axis. |
| Canvas World | An infinite canvas with the potential for a variety of layouts. This world introduces a pan-and-zoom approach to navigation, an ability to 'drill-in' to details which may be at a deeper zoom level than the main content, and can support rotation, both in layout and navigation. |
| Flip-card World | A truly random access experience in which a large set of information is displayed on screen in a grid like format, and the consumer may pick which content from the set she would like to explore next by clicking or tapping on a card to reveal more about that topic. |
| Timeline World | An arrangement which relies upon timestamp metadata being associated with the content data elements to be laid-out so that they may be represented in a dynamically scaled chronological sequence, such as horizontal scrolling with zoom. |
| Nutshell World | A 2D rendition of depth world, where again the top level categories are traversed along the horizontal axis, and now diving deeper into a topic is done by panning vertically in the y-axis. |

As shown in FIG. 4, each of the example world schemes may include one or more sections 404 (which may be referred to herein individually as a section 404 or collectively as the sections 404). The sections 404 may be employed as mid-level schemes to arrange content data elements as groups, with each group filling one or a few pages or screens. One example section may include a single image scaled to fill an entire screen with some title text and some caption text super-imposed over two different regions of the image. Another example section may include a large block of text broken into three columns which wrap around a 16×9 aspect ratio video playback widget with a video thumbnail inside it. The sections may be designed to be generalized and multi-purpose, so that a section of a screenfull of content can be utilized as a building block during the build-up of a wide variety of world schemes. The generation of arrangement schemes for the sections 404 will be discussed in detail below with regard to FIGS. 8A and 8B.

As discussed above, world schemes may be stored in the layout resource data store 214. Additionally, or alternatively, the world schemes may be stored in any data storage that is accessible to the layout generation engine 108. It should be further understood that 3$^{rd}$ parties may also build world schemes which may be incorporated into the system, stored in the layout resource data store 214, and/or utilized by the layout generation engine 108.

Referring back to FIG. 3, the layout 304 may further include section arrangements 314A-314C, each of which may describe the arrangement or design of a corresponding section 404 of a world configuration 312. Since each section 404 may typically include one or more content data elements, the formatting of these content data elements may be utilized as the micro-level scheme of the layout. Such micro-level scheme may be described in the element format configurations 316A-316C contained in the layout 304.

It should be noted that the above-described data elements of layout-ready view model 216 are for illustration only. Additional data elements may be contained in the core content data model 212 beyond those described herein, and that not every data element described will be available for authored content. For example, a section 404 contained in a world scheme 312 may also include a world scheme 312 in itself, and thus resulting in a nested world scheme or a "world-within-world" scheme. Similarly, a section 404 may be nested in another section, thus creating nested section arrangements. In such scenarios, the data elements contained in a layout-ready view model 216 may contain more information than that shown in FIG. 3. It should also be noted that following the nesting idea, a large variety of world schemes and/or section arrangements may be created and utilized in generating the layout 304 for content data 114.

It should also be appreciated that the mappings of the world scheme, section arrangement and element format configuration to the macro-level, mid-level, and micro-level schemes are only illustrative and should not be construed as limiting. Various other ways of building the macro-level, mid-level, and micro-level schemes may be employed. For example, in a nested world scheme, the mid-level scheme may be built to include the world schemes nested inside another world scheme, which may include the high-level structure as well as the sections arrangements of the nested world scheme. Alternatively, the nested world scheme may be regarded as the macro-level scheme and the sections of the nested world may be considered as the mid-level scheme.

The layout 304, the world scheme 312, the sections 404, and the content data elements contained in the section may be further explained utilizing the example layouts illustrated in FIGS. 5A and 5B. FIG. 5A illustrates an example layout utilizing a panorama world scheme, which contains a section 502. Within the section 502, there are several content data elements 504: section title, text block 1, text block 2, image 1, caption 1, image 2, caption 2, image 3 and caption 3. These content data elements 504 are arranged in three columns: the first column is for section title; the third column is for image 3 and its caption 3; and the second column is for the remaining content data elements 504. In the second column, the content data elements 504 may further be arranged into two sub-columns, each holding a text block and an image along with the image caption. Such a design of section 502 may be specified in the section arrangement 314 corresponding to section 502. In addition, the section arrangement 314 may further specify other aspects of the section 502, such as page margin, the width of each column/sub-column, the relative position of content data elements 504 within each column, animation of the section, and so on. Furthermore, each of the content data elements 504 may have its own format configuration, such as the size, color, font type and the like. The format configuration for each individual content data element 504 may be stored in the element format configuration 316.

When a different scheme is selected for presenting the content data elements 504, the section arrangement 314 and element format configurations 316 may be different, and may be adapted to the selected world scheme. FIG. 5B shows a layout to present the content data elements 504 shown in FIG. 5A in a vertical world scheme. In the layout shown in FIG. 5B, the content data elements 504 are also grouped in one section 512, and they are arranged in rows, rather than columns. Other arrangements, such as page margin, row spacing, animation of the section 512 may also be different from that of section 502. Similarly, each of the elements 504 may be formatted differently in the vertical world scheme, and thus the element format configuration 316 contained in the layout 304 may also be different.

It should be understood that the layouts shown in FIGS. 5A and 5B are merely illustrative and other ways of laying out the content data elements 504 may be utilized. For example, the content data elements 504 contained in the section 502 of the panorama world scheme shown in FIG. 5A may be laid out in different sections 512 in the vertical world scheme shown in FIG. 5B. There may not be section title for each of the sections 502 and 512. Content data elements 504 contained in section 502 shown in FIG. 5A may also be organized in one column, rather than multiple columns or sub-columns. Additionally, the content data elements 504 may be laid out utilizing various other world schemes and/or combination of those world schemes.

Figure 6:
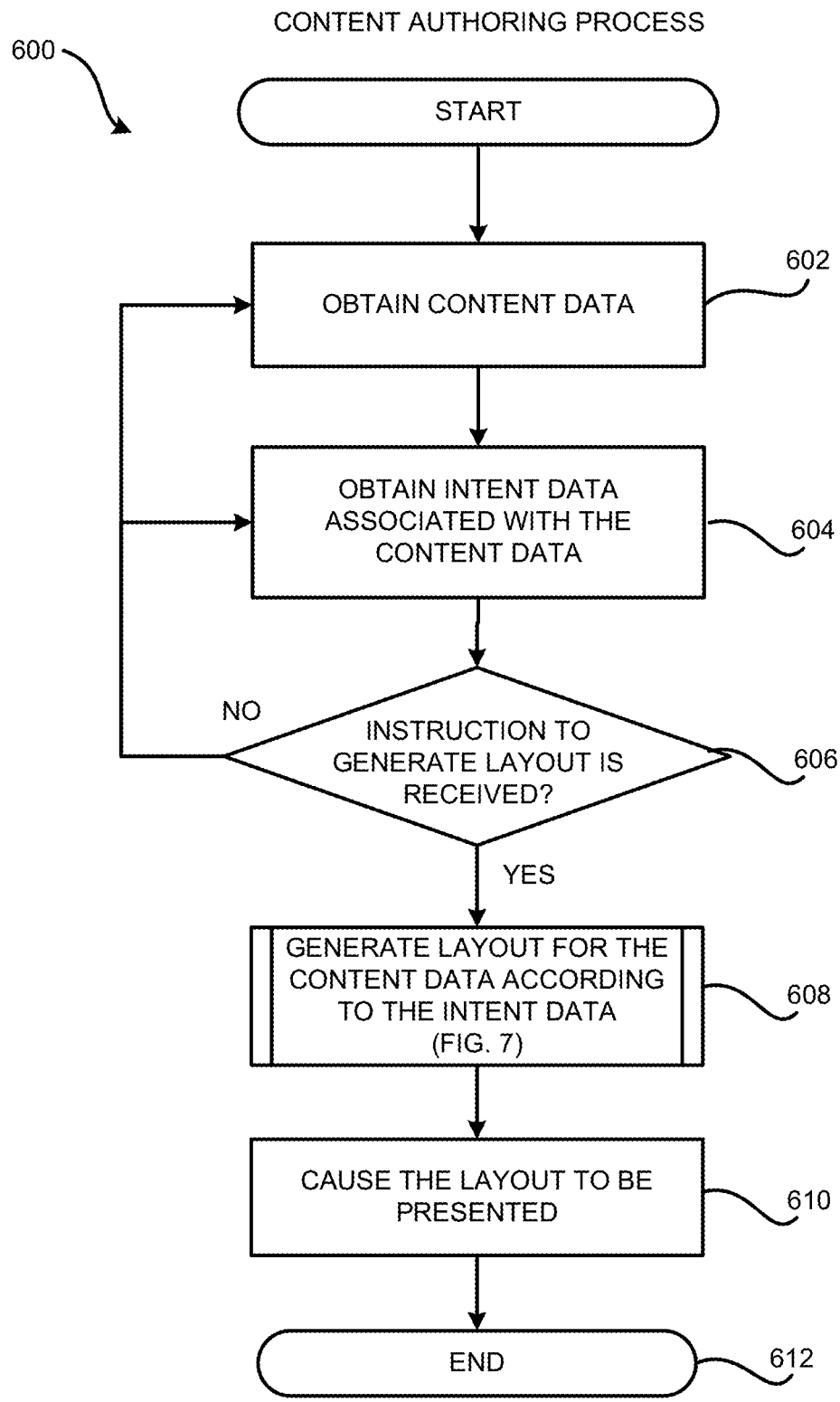
FIG. 6 is a flow diagram illustrating aspects of a process for content authoring.

Turning now to FIG. 6, aspects of a routine 600 for content authoring are shown and described below. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As will be described in more detail below, in conjunction with FIGS. 19-21, the operations of the routine 600 are described herein as being implemented, at least in part, by an application, such as the content collection/generation module 106 and the layout generation engine 108. Although the following illustration refers to the content collection/generation module 106 and the layout generation engine 108, it can be appreciated that the operations of the routine 600 may be also implemented in many other ways. For example, the routine 600 may be implemented by one module that implements functionality of both the content collection/generation module 106 and the layout generation engine 108. In addition, one or more of the operations of the routine 600 may alternatively or additionally be implemented, at least in part, by a web browser application 1910 shown in FIG. 19 or another application working in conjunction with an application service 2024 of FIG. 20.

With reference to FIG. 6, the routine 600 begins at operation 602, where the content data 114 is obtained. As discussed above regarding FIGS. 1 and 2, the content data 114 may be provided by the author 102, such as through a user interface or through an API exposed by content collection/generation module 106. In addition, the content data 114 may be retrieved from various content resources 126 by the content collection/generation module 106.

From operation 602, the routine 600 proceeds to operation 604, where the intent data 116 for the content data 114 may be obtained. As described above, the intent data 116 describes the intent of the author 102 on how the content data 114 should be presented to consumers without utilizing specific formatting instructions. The intent data 116 may describe the intent by describing relationships among two or more of the content elements in the content data 114 and/or by specifying presentation choices for the content data elements. The intent data 116 may further indicate an intended use of the content data 114. Similar to the content data 114, the intent data 116 may be obtained from the author 102 through a user interface, or through an API exposed by content collection/generation module 106. Additionally, or alternatively, the intent data 116, or at least a part of the intent data 116, may be obtained from a template or derived from the content data 114, such as through the underlying structure of the content data 114.

Next, at operation 606, a determination is made as to whether an instruction to generate the layout 304 has been received. If the instruction to generate the layout 304 has not been received, the routine 600 may return back to operation 602 to obtain more content data 114 or back to operation 604 to obtain more intent data 116. If it is determined at operation 606 that the instruction to generate the layout 304 has been received, the routine 600 proceeds to operation 608, where the layout 304 may be generated for the content data 114 based on the obtained intent data 116.

As discussed above, the layout 304 may be generated by the layout generation engine 108 based on the core content data model 212 that contains the content data 114 and the intent data 116. The layout 304 may be generated to fit the content data 114 and also to satisfy the intent of the author 102. The layout 304 may include a multiple-level configuration, which may contain a macro-level scheme, a mid-level scheme and a micro-level scheme. According to one mechanism, the macro-level scheme may be a world scheme that may specify an overall structure of the layout, describe high-order interaction assumptions, layout constraints, and/or potentially other constraints/assumptions.

A world scheme may include one or more sections to arrange content data elements as groups, with each group corresponding to one section and filling one or a few pages or screens. A section of a world scheme may also include other world schemes, thereby forming a nested world scheme. It should be understood that the arrangements of different sections may be similar in terms of style and configuration to form a consistent presentation of content. These arrangements, however, may also be different. For example, the content structure, the page margin, the color scheme, the style, the background in one section may be different from another section. In the nested world scheme, the world scheme nested in one section may also be different from the world scheme nested in another section. The section arrangement along with the nested world scheme, if there is any, may be utilized as the mid-level scheme of the layout. Furthermore, each of the content data elements may have its own format configuration, and the element format configuration may be utilized as the micro-level scheme.

As discussed above, the layout generation engine 108 may have access to other information that may be utilized when generating the layout 304. For example, the device capability 118 may be obtained from the rendering device 110 that describes aspects of the rendering device 110, such as resolution, orientation, memory constraints, graphics capabilities, browser capabilities, and the like. Similarly, the layout generation engine 108 may also be provided with the consumer preferences 120 to indicate features and/or styles according to which the consumer 132 may prefer the content is to be presented, such as the overall structure of the content, color schemes, background, animation style, and others. The additional information may facilitate the layout generation engine 108 to generate a layout 304 for the content data 114 in a way that satisfies the intent/preference of the author 102 and the consumer 132, and is suitable to the rendering device 110. The generated layout 304 along with the content data 114 may be output as a layout-ready view model 216. Additional details regarding one mechanism disclosed herein for generating the layout 304 for the content data 114 will be provided below with regard to FIG. 7.

From operation 608, the routine 600 proceeds to operation 610, where the layout-ready view model 216 may be sent to a rendering device causing the generated layout 304 to be presented. From operation 610, the routine 600 proceeds to operation 612, where it ends.

Figure 7:
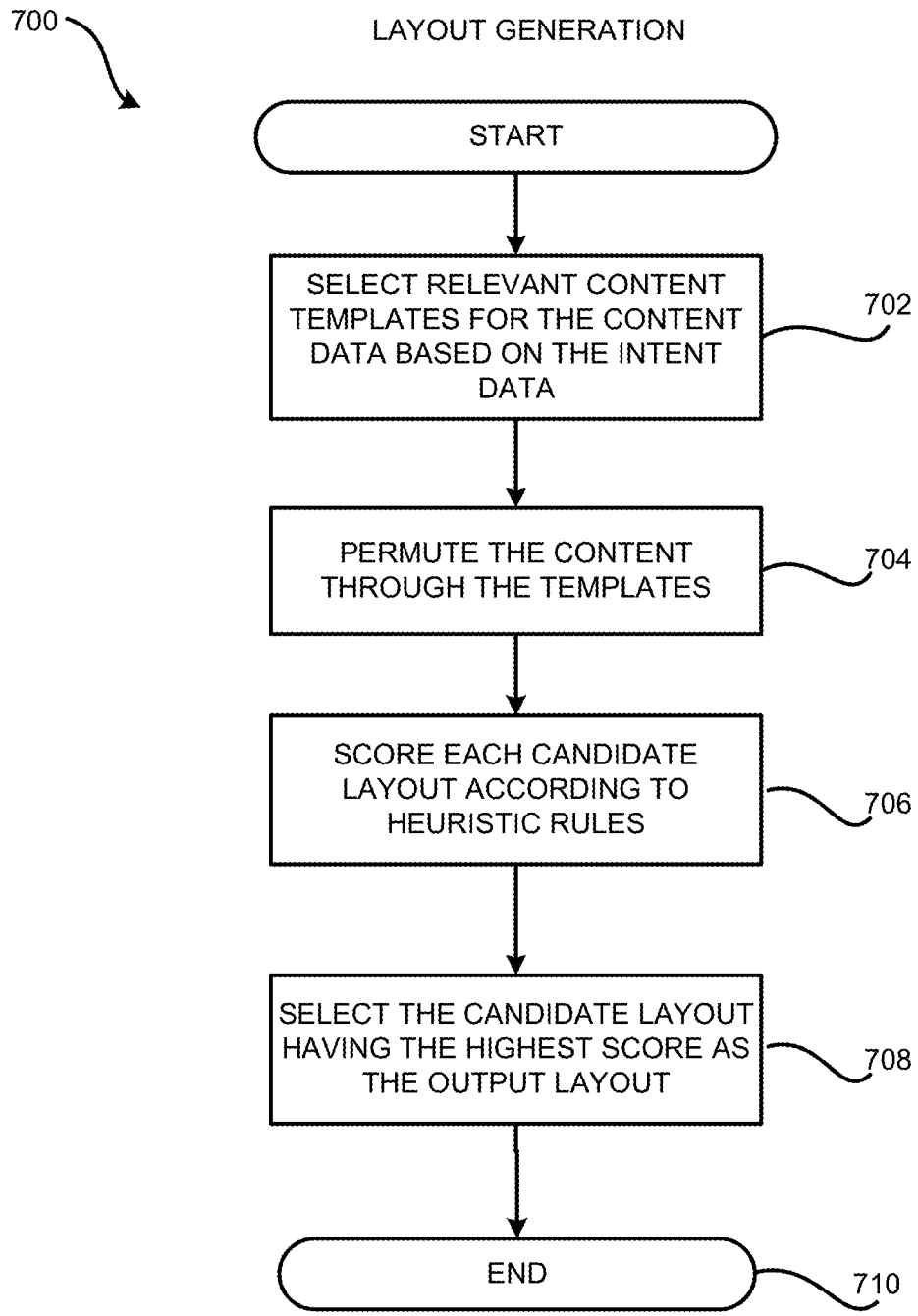
FIG. 7 is a flow diagram illustrating aspects of a method for generating a layout for content data based on author intent.

FIG. 7 shows a routine 700 illustrating aspects of a method for generating a layout 304 for content data 114 based on user intent data 116. FIG. 7 will be described in conjunction with FIGS. 8A and 8B, where examples of templates utilized during generation of the layout 304 are illustrated. In some implementations, the routine 700 may be performed by the layout generation engine 108 described above in regard to FIGS. 1 and 2. It should be appreciated, however, that the routine 700 might also be performed by other systems and/or modules in the operating environment illustrated in FIGS. 1 and 2.

The routine 700 begins at operation 702 where multiple content templates that may be utilized for presenting the content data 114 may be selected. The content templates may include templates that correspond to the macro-level schemes, such as templates for world schemes, and/or templates that corresponding to the mid-level schemes and micro-level schemes, such as templates for sections of a world scheme and for content data elements contained in the sections. Some of the templates may further include multiple sub-templates, each of which may be considered as one template and may be changed or replaced as a single unit. As such, the templates selected in operation 702 may have various sizes, scales, and/or styles, and depending on the amount of content data, the number of selected templates may be on the scale of thousands, tens of thousands or even hundreds of thousands.

The selection of the content templates may be based on the data available at the layout generation engine 108, including the core content data model 212, and/or any additional information, such as the device capability 118 and the consumer preferences 120. In some implementations, the data available at the layout generation engine 108, such as the intent data 116 and/or the device capability 118, may be converted into one or more formatting constraints, and the layout generation engine 108 may select content templates that satisfy the formatting constraints. For example, when presenting two images with a first image having more emphasis than a second image, as indicated by the intent data 116, techniques herein may select a template with an arrangement that presents the first image in a larger viewing area than the second image. Likewise, when the device capability 118 indicates that the target rendering device 110 is a smart phone with a small screen size, templates that are suitable for presenting content in smaller screens may be selected.

Figure 8A:
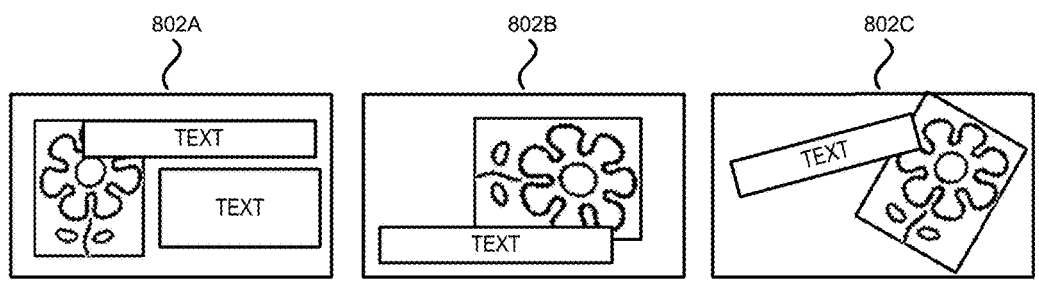
FIG. 8A illustrates examples of templates utilized during generation of the layout.

Furthermore, for a set of content data elements, more than one template may be selected. FIG. 8A illustrates example templates 802A-802C that may be selected to present an image element and a text block element. As shown in FIG. 8, all three templates 802A-802C may be able to lay out an image and a text block, but differ from each other in terms of the position, the orientation, and other aspects of the laid-out image and text block.

Figure 8B:
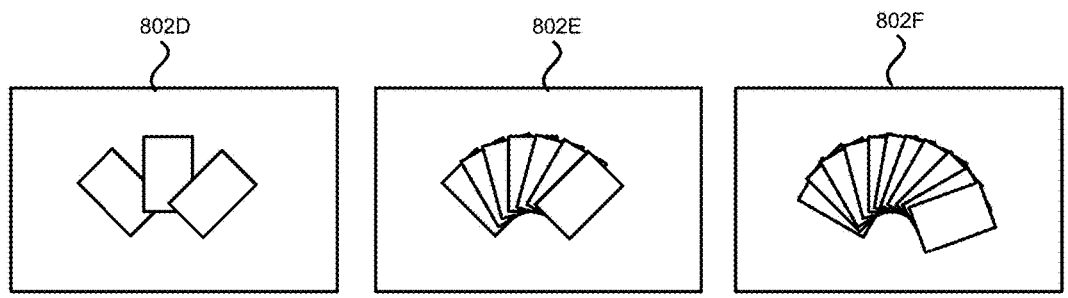
FIG. 8B illustrates an example for algorithmically generating templates for layout generation.

The selected templates may be pre-generated, such as by designers or by retrieving from existing resources, and stored in the layout resource data store 214, where the layout generation engine 108 may select and retrieve the templates. Depending on the type of templates, the templates may also be programmatically generated. FIG. 8B illustrates such type of templates. There are three playing-card-fan type of templates 802D-802F shown in FIG. 8B. While these three templates are visually different from each other, they all follow a certain algorithmic representation. Specifically, the templates 802D-802F may be formulated as a/N, where a is the degree spanned by the fan layout, and N is the number of elements in the fan layout. For template 802D, N=3; for template 802E, N=7; and for template 802F, N=11. Based on this formulation, the template for any number of N may be generated when needed without pre-storing all the possible templates, thereby saving storage space and increasing the flexibility of the layout generation method. Other types of templates, such as a grid of N-elements and a sinusoidal wave of objects, may also be generated in a similar way.

From operation 702, the routine 700 proceeds to operation 704 where the content data 114 may be permuted through the templates selected in operation 702. For example, an image and a text block may be put into each of the templates 802A, 802B and 802C. When needed, the templates may be slightly modified to accommodate the content data elements. For example, one or more objects in the template may be resized, shifted, rotated or otherwise adjusted to fit the content data element contained in it. The templates for all the content data elements in the content data 114 may collectively form a candidate layout 304. Since there may be multiple selected templates for each set of content data elements, the combination of these templates may result in multiple candidate layouts 304.

From operation 704, the routine 700 proceeds to operation 706, where a score is computed for each of the candidate layouts 304. In situations when a candidate layout 304 consists of a number of templates, the score for a candidate layout 304 may be computed by first computing a score for each templates and then combining the scores to generate the final score for the candidate layout 304.

In some implementations, the score for a template is computed according to a set of heuristic rules, which may be a weighted set of general rules, world specific rules, and style specific rules. By way of example, and not limitation, the heuristic rules may include legibility rules, crowdedness/proximity rules, fit-to-aspect-ratio rules, semantic matching rules, and/or potentially other rules. The legibility rules may measure, for example, if a text has sufficient contrast to be read in the context of its background. The crowdedness/proximity rules may measure if objects as close or far apart from each other as required by the intent data 116, device capability 118, or the consumer preferences 120. The fit-to-aspect-ratio rules may measure how well the image or text fits to the prescribed layout. The semantic matching rules may measure if the visual results of the template represents a semantic expression and matches the semantic hints in the metadata of the content data 114.

Intermediate scores may be computed based on each of the above rules, and then normalized and weighted to generate the score for the template. The weight may be assigned to the corresponding intermediate score according to the relative importance of the various inputs of the layout generation engine 108, including the intent data 116, the device capability 118, the consumer preferences 120 and other factors. For example, a score computed based on the fit-to-aspect-ratio rules may indicate how well the template would satisfy the device capability 118. As such, if satisfying the device capability 118 is more important than satisfying the consumer preferences 120, a higher weight may be assigned to the score computed based on the fit-to-aspect-ratio rules.

Similarly, the scores for templates contained in a candidate layout 304 may also be normalized, weighted, or otherwise processed before calculating the final score for the candidate layout 304. From operation 706, the routine 700 proceeds to operation 708 where the candidate layout 304 having the highest score may be selected as the layout 304 for the content data 114, and stored in the layout-ready view model 216 along with the content data 114 for rendering. From operation 708, the routine 700 proceeds to operation 710, where routine 700 terminates.

It should be appreciated that in the layout generation process described in FIG. 7 may be performed automatically and without human intervention. In addition, the templates contained in the layout 304 may be selected after the intent data 116 have been obtained. Comparing such a data-driven template/layout selection mechanism with a method where the author 102 fills content data 116 in a pre-selected template, the former may provide a more accurate template/layout to present the content data 114. This is because, the author 102, when pre-selecting the template, may not, and in general does not, have the knowledge of all the potential templates that may fit the content data 114. In addition, the content data 114 may change as the author 102 continues the authoring process. The pre-selected template may not be suitable for the updated content data 114. On the other hand, the data-driven template/layout selection mechanism may dynamically update the layout as the content data 114 changes by leveraging potentially all the template resources available to the layout generation engine 108. Such a process may also be made transparent to the author 102, and thus require no knowledge of the layout design from the author 102. Furthermore, since the layout 304 is selected based on user intent, rather than specific formatting instructions, the layout 304 generated by routine 700 may be able to dynamically adapt to various output formats and rendering devices while still satisfying the author's intent.

Figure 9A:
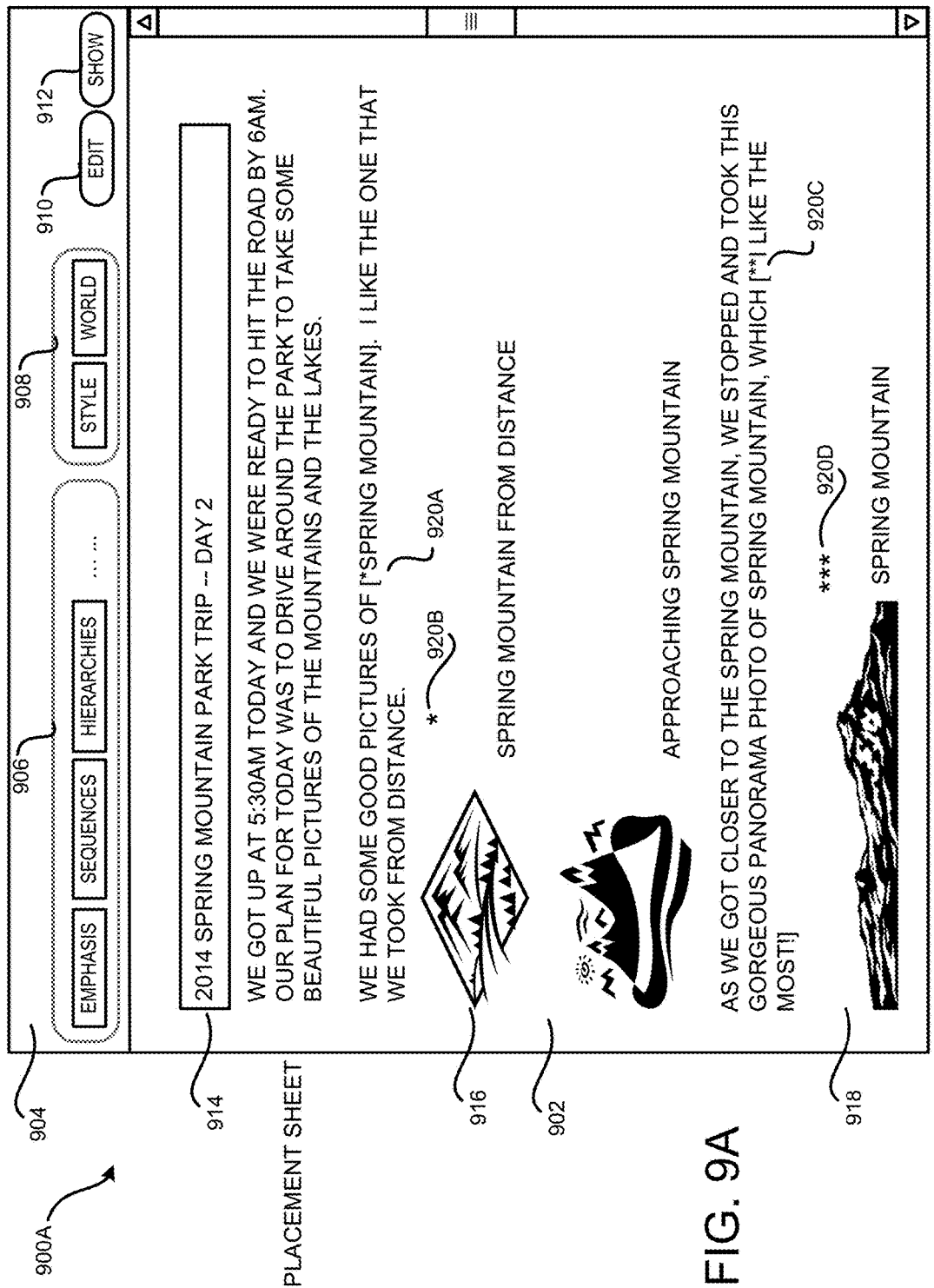
FIG. 9A illustrates a user interface that may be utilized by an author to input content data and specify author intent.

FIG. 9A illustrates an authoring user interface 900A that may be utilized by an author 102 to input content data 114, specify user intent data 116, and/or request a layout 304 to be generated for the input content data 114. The authoring user interface 900A may include an editing field 902, where the author 102 may input various content data elements, such as typing in texts, uploading images, etc. In some implementations, the editing field 902 may include a title field 914 where the author 102 may specify a title for the content data 114, and/or a title for a portion of the content data 114.

The authoring user interface 900A may further include a user interface control field 904, where various user interface controls may be provided to facilitate the layout generation for the content data 114. As shown in FIG. 9A, the user interface control field 904 may include a set of user interface controls 906 for specifying author intent to the content data 114, such as user interface control(s) for adding emphasis, user interface control(s) specifying sequences between content data elements, user interface control(s) for specifying hierarchies among content data elements, and/or others.

For example, the author 102 may specify his/her intent through adding emphasis. FIG. 9A illustrates emphasis 920A-920D that are added to texts and images. A low emphasis 920A is added to the text "spring mountain" indicating that a small amount of emphasis should be added to this text. Similarly, a low emphasis 920B is added to the image 916. A medium emphasis 920C assigned to the text "I like the most" indicates that a medium amount of emphasis should be added to this text, and a high emphasis 920D assigned to image 918 indicates that a large amount of emphasis should be added to image 918. In some implementations, the content data elements which have intent associated therewith may be formatted differently in the editing field 902 in order to signal the assigned intent. As shown in FIG. 9A, asterisks, brackets, or other symbols may be attached to the content data elements that have emphasis added on, and the number of asterisks may indicate the amount of emphasis that has been assigned.

As will be shown below in FIGS. 9B and 9C, to realize the emphasis 920A-920D, the layout generation engine 108 may choose format configurations, such as bold font, underlining, enlarged font, for the text, and select format configurations, such as enlarged image sizes, for the images. It should be noted that these format configurations may not be employed in the authoring user interface 900A to format the corresponding content data elements in order to avoid an impression by the author 102 that the format of these content data elements will be the format used in the generated layout 304. In other words, the manner in which the content data elements with intent associated therewith are formatted or presented may be different from the manner in which these content data elements will be presented in the generated layout 304. In other implements, however, the content data elements with associated intent may be formatted in the editing field 902 in the way that will be employed in the generated layout 304.

The user interface control field 904 may further include a set of user interface controls 908 for specifying the macro-level scheme of the layout 304 for the content data 114. As discussed above, the macro-level scheme may include a world scheme, which may be selected by the layout generation engine 108 based on the intent data 116 and other additional information. Alternatively, or additionally, the author 102 may select the world scheme for the layout 304 through the authoring user interface 900A. Similarly, the authoring user interface 900A may further provide user interface controls allowing the author 102 to specify other types of macro-level schemes, such as the style, overall color scheme, and the like.

Once the author 102 finishes the editing, or at any time during the editing, he/she may select the user interface control 912 to request a layout 304 to be generated for the provided content data 114 and to preview the rendered content data 114 in the generated layout 304. FIGS. 9B and 9C illustrate rendered content data 114 in the two different layouts 304. At any time during the previewing, the author 102 may choose the user interface control 910 to return back to the editing user interface 900A.

It should be understood that the user interface controls shown in FIG. 9A are for illustration only, and should not be construed as limiting. Additional user interface controls/fields may be included in the authoring user interface 900A beyond those illustrated herein, and not all the user interface controls and/or fields illustrated need to be included in an authoring user interface. Furthermore, user interface controls/fields in an authoring user interface may be arranged or designed in a different way than the illustrated.

Figure 9B:
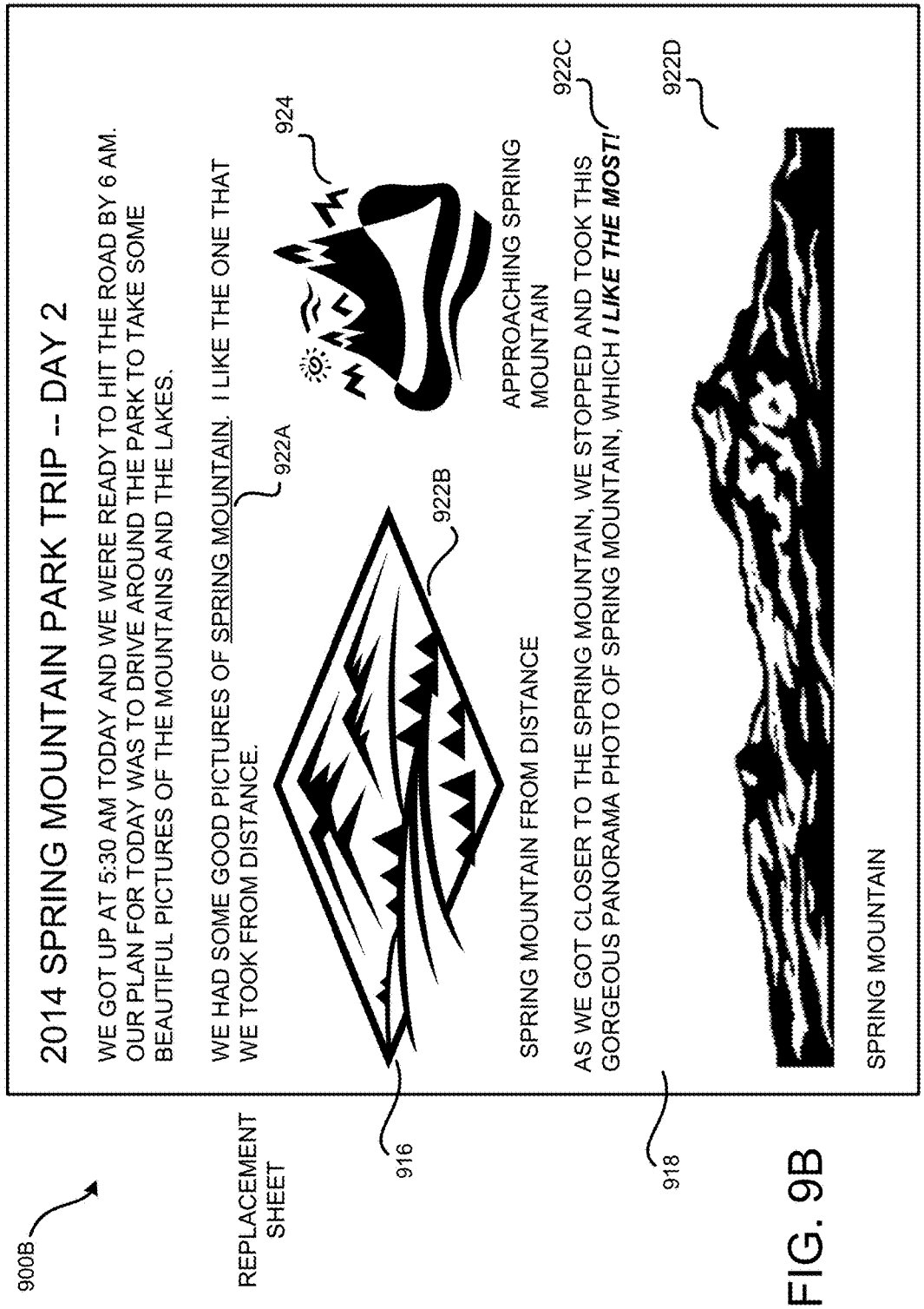
FIG. 9B illustrates a rendered view of content data presented in a layout generated based on author intent according to aspects of the techniques and technologies presented herein.
Figure 9C:
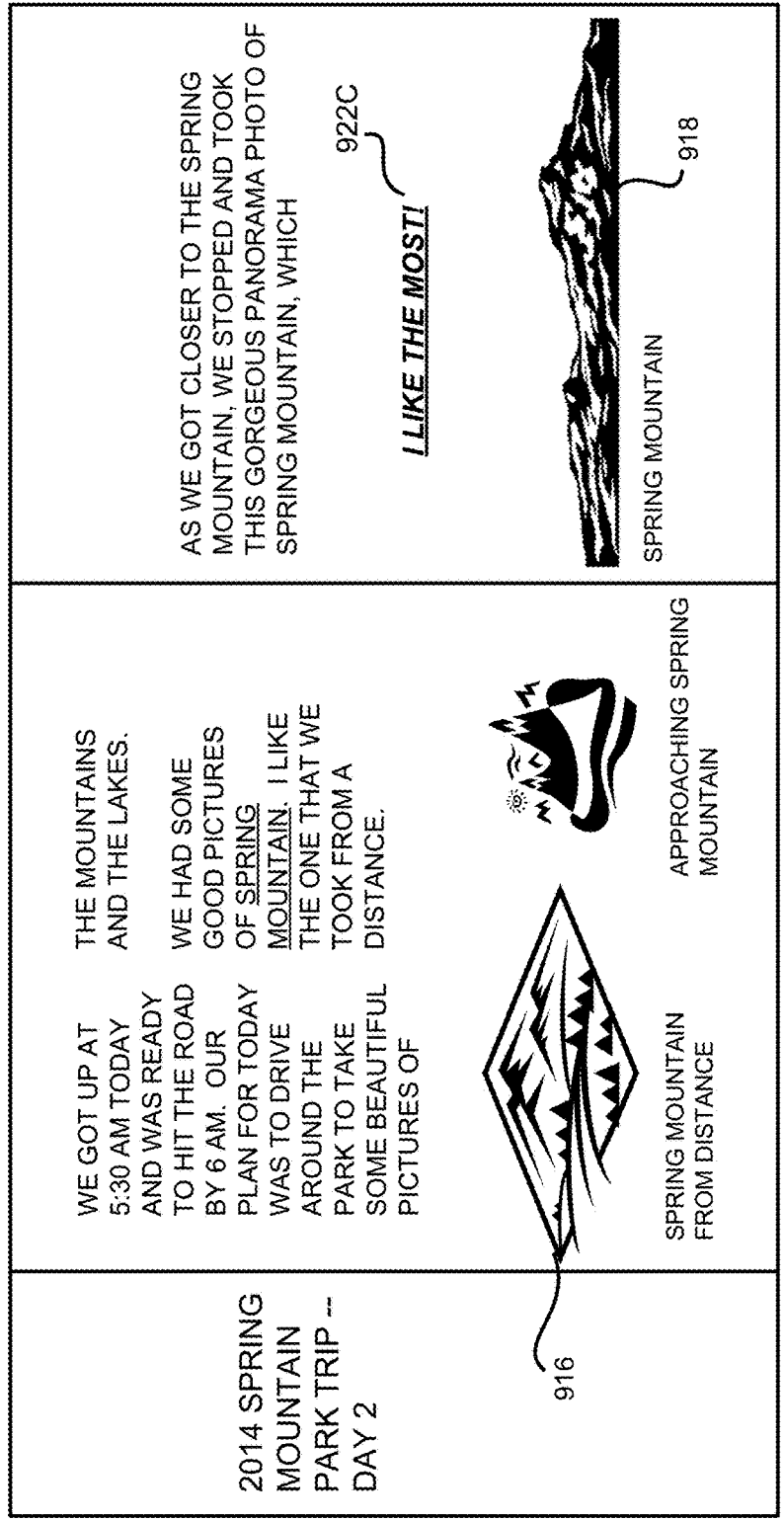
FIG. 9C illustrates another rendered view of content data presented in a different layout generated based on author intent according to aspects of the techniques and technologies presented herein.

Referring now to FIGS. 9B and 9C, where two rendered views of the content data 114 shown in the editing field 902 are illustrated. Specifically, FIG. 9B shows a rendered view 900B where the content data 114 is presented in a layout 304 built based on a vertical world scheme. In the rendered view 900B, the content data elements may be organized into one section of the vertical world scheme. The text in the title filed 914 may be formatted using a large font size to make the section title more prominent. Emphasis 920A is implemented by underlining the text "spring mountain" as interpreted emphasis 922A, and emphasis 920C is implemented by make the text "I like the most" bold and italic as interpreted emphasis 922C. With regard to the images, emphasis 920B has been interpreted as resizing image 916 to have a larger size than image 924 as interpreted emphasis 922B. Likewise, emphasis 920D has been interpreted to lay out the image 918 to take the entire bottom portion of the screen as interpreted emphasis 922D.

FIG. 9C shows a rendered view 900C where the content data 114 is presented in a layout 304 built based on a panorama world scheme. As shown in FIG. 9C, the rendered view 900C may arrange the content data 114 in columns and sub-columns. The emphasis added to the text "spring mountain" and the images 916 and 918 are implemented in a similar manner to that shown in FIG. 9B. For the text "I like the most," however, the layout 304 shown in FIG. 9C may place it in a space between the text and the image 918 as interpreted emphasis 922C and further add a shadow effect to emphasize its importance. It can be seen that the same content data 114 may be presented differently using different layouts 304. Among these layouts 304, different world schemes 312 may be selected or specified, and the section arrangements 314 and the element format configurations 316 may be different. Furthermore, depending on the world configuration 312, section arrangements 314 and the element format configurations 316 of the layout 304, the same intent data 116 may be transformed into different format configurations in different layouts 304.

Figure 10:
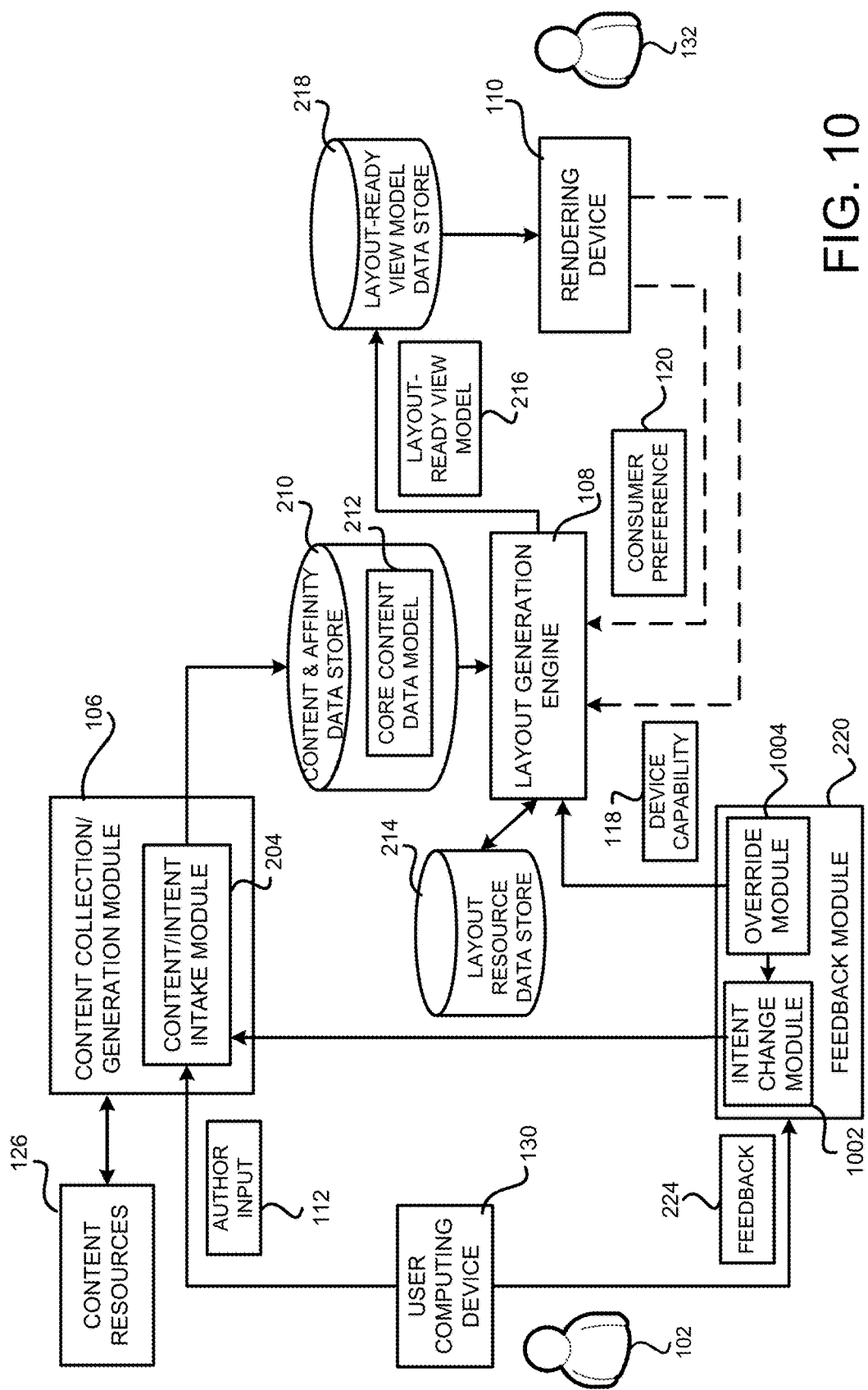
FIG. 10 is a block diagram illustrating aspects of the techniques and technologies presented herein for content authoring based on author intent and author feedback.

FIG. 10 illustrates further aspects of the techniques and technologies presented herein for content authoring based on user intent. Specifically, FIG. 10 illustrates a block diagram that provides more details on processing author feedback 224. As briefly mentioned above, a feedback module 220 may be employed to obtain the feedback 224 from the author 102 with regard to the generated layout 304. The feedback module 220 may include an override module 1004 for handling feedback 224 that may override the interpretation of the intent data 116 initially provided by the author 102. Such overriding feedback 224 may be directly provided to and utilized by the layout generation engine 108 to generate a new layout 304 or to adjust the layout 304 that has been generated.

The overriding feedback 224 provided by the author 102 may include high-level feedback describing the portion of the layout that is unsatisfactory and/or how it should be modified without including specific formatting instructions. For example, the author 102 may point out, in the feedback 224, what went wrong with the generated layout 304. Using the layout shown in FIG. 9B as an example, the author 102 may provide a feedback 224 indicating that title of the section should be more dramatic. In some scenarios, the author 102 may further offer example solutions to the unsatisfied portion of the layout. For instance, the content data 114 may be a company document, such as a report or a presentation, and the author 102 may provide a feedback 224 indicating that the layout 304 should have a color scheme consistent to the color scheme used in the company logo. The author 102 may further supply a copy of the company logo image, which may be utilized by the layout generation engine 108 to generate or select the proper color scheme for the layout 304. It should be noted that the author 102 may also provide high-level feedback 224 to ask for an alternative layout 304 to be generated and presented.

In some scenarios, the high-level feedback may not be sufficient to communicate the information that the author 102 wants to deliver. In other scenarios, the adjusted or re-generated layout 304 based on the high-level feedback 224 may be still unsatisfactory to the author 102. In either case, the author 102 may provide a detailed feedback 224 which may include specific formatting instructions for at least some of the content data elements involved. For example, the author 102 may specify in the feedback 224 that a certain font size and color should be used for a text block, or a certain page margin should be used in the layout 304.

It should be appreciated that the above examples are provided by way of illustration only and should not be construed as limiting. Various other high-level or detailed feedback 224 may be provided by the author 102 to refine or adjust the generated layout 304. It should be further appreciated that the feedback 224 may be provided by the author 102 in multiple iterations. For example, if an adjusted layout 304 based on a high-level feedback 224 in a current iteration is still unsatisfactory, a detailed feedback 224 may be provided in a next iteration.

In some implementations, the feedback 224 may be provided by the author 102 through a user interface presented by the feedback module 1004. The user interface may provide various user interface controls that may allow the author 102 to specify the portion of the layout or rendered content that is referred to in the feedback. For example, the author 102 may draw a circle in the user interface to specify the unsatisfactory portion of the layout 304. Alternatively, or additionally, the author 102 may only need to tap or click on the relevant portion. Furthermore, various mechanisms known in the art that allow the author 102 to upload files, specify formatting instructions, and/or perform other operations may be utilized to facilitate the author 102 to provide the feedback 224. It should be understood that the user interface for providing the feedback 224 may be a separate user interface from the authoring user interface, such as the authoring user interface 900A illustrated in FIG. 9A, or may be integrated as a part of the authoring user interface.

The feedback module 220 may further include an intent change module 1002 to handle feedback 224 that are or can be converted to intent data 116. The intent change module 1002 may allow the author 102 to provide intent feedback 224 that modifies his/her initially specified intent or adds more intent data. In some scenarios, a high-level feedback 224 may also be converted or expressed as an intent feedback 224. The intent feedback 224 may be provided to the content/intent intake module 204 to be included in the intent data 116 of the core content data model 212. The intent feedback 224 may be provided by the author 102 through the authoring user interface, or be provided by the override module 1004 to the content/intent intake module 204.

Figure 11:
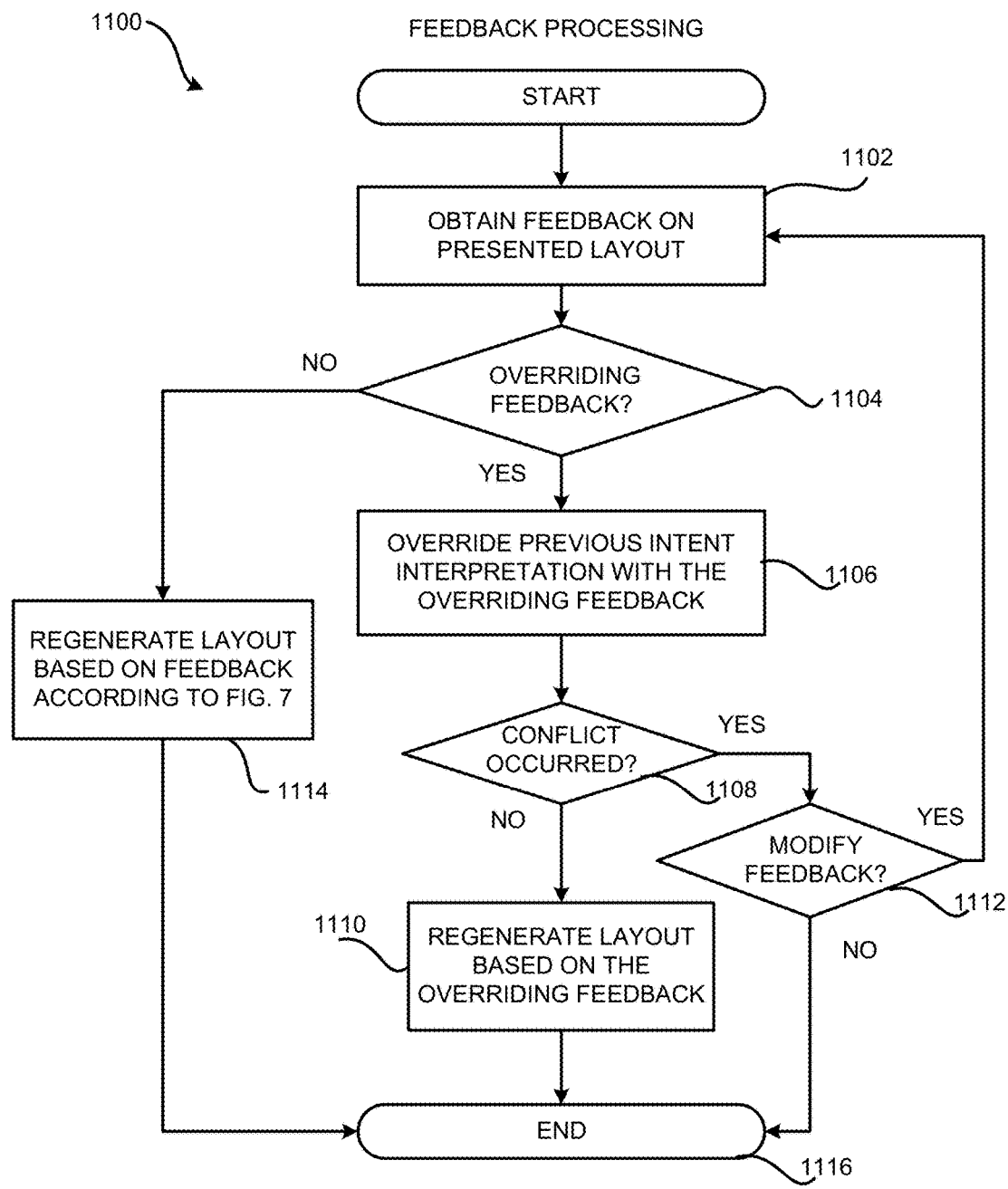
FIG. 11 is a flow diagram illustrating aspects of a method for processing user feedback on a layout generated based on author intent.

FIG. 11 shows a routine 1100 illustrating aspects of a method for processing user feedback 224 about a layout 304 generated based on user intent data 116. In some implementations, the routine 1100 may be performed by the feedback module 220 described above in regard to FIGS. 1, 2 and 10. It should be appreciated, however, that the routine 1100 might also be performed by other systems and/or modules in the operating environment illustrated in FIGS. 1, 2 and 10.

The routine 1100 starts at operation 1102 where a feedback 224 about a generated layout 304 may be obtained. The routine 1100 then proceeds to operation 1104 where a determination may be made as to whether the feedback 224 is an overriding feedback, i.e. a feedback that overrides an interpretation of user intent. For example, a user intent of "word A is more important than the text around it" may be interpreted by the layout generation engine 108 to format text A to be bold and the text round it to be regular font. An overriding feedback about text A would request the layout generation engine 108 not to use such a format for text A.

Such an overriding feedback may be a high-level feedback in which the author 102 may indicate that the emphasis added on text A is not enough. In such a scenario, the layout generation engine 108 may utilize this feedback to override the previous interpretation of user intent and change the formatting for text A by, for example, further enlarging the font size, underlining the text A, and/or use a different typeface. Alternatively, the overriding feedback may be a detailed feedback in which the author 102 may specify the specific format for text A, such as using 12-point Arial Black font. The layout generation engine 108 may utilize the specific formatting instructions provided in the detailed feedback to replace the previous format for text A.

If it is determined at operation 1104 that the feedback 224 is an overriding feedback 224, the routine 1100 proceeds to operation 1106, where the previous intent interpretation may be overridden. Depending on the nature of the feedback 224, a new interpretation may be generated if the feedback 224 is a high-level feedback, or a specific format specified in the feedback 224 may be utilized.

Next at operation 1108, a determination may be made as to whether the feedback 224 may cause any conflict in generating the layout 304. For example, the author 102 may provide a detailed feedback to request a certain size to be used for an image A. Such specified image size, however, may prohibit image A to be presented side-by-side with another image B as indicated in the user intent data 116 provided by the author 102 earlier. If conflicts exist, the routine 1100 proceeds to operation 1112 where the author 102 may be asked to modify the feedback 224 or the intent data 116. If the author 102 is willing to modify the feedback 224 or the intent data 116, the routine 1100 returns back to operation 1102.

If it is determined at operation 1108 that there is no conflict, the routine 1100 proceeds to operation 1110, where a layout 304 may be regenerated or adjusted based on the overriding feedback 224. In some implementations, the author feedback 224 may be further stored and analyzed by the layout generation engine 108. The analysis may facilitate the layout generation engine 108 to improve the interpretation of author intent in future authoring process. From operation 1110 or from operation 1112 where it is determined that the author 102 has not provided a modified feedback 224, the routine 1110 proceeds to operation 1116, where routine 1110 ends.

If at operation 1104, it is determined that the feedback 224 is not overriding feedback, such as an intent feedback, in which the author 102 may modify or add intent data 116, the routine 1100 proceeds to operation 1114, where the layout generation engine 108 may update the layout 304 based on the feedback 224, such as by regenerating the layout 304 according to the method described above with regard to FIG. 7. From operation 1114, the routine 1100 proceeds to operation 1116 where routine 1110 ends.

It should be understood that the method illustrated in FIG. 11 is merely illustrative and should not be construed as limiting. Various other ways of processing the feedback 224 may be utilized. For instance, when a conflict is detected at operation 1108, rather than asking the author 102 to modify the feedback 224, the layout generation engine 108 may try to solve the conflict and provide one or more solutions to the author 102 before asking for a modified feedback. For example, the conflict may be solved by slightly changing the intent data 116 for other content data elements that are affected, and/or by slightly modifying the feedback 224 provided by the author 102. The author 102 may choose one of the proposed solutions or provide a modified feedback 224 if he/she is not satisfied with the solution.

Figure 12:
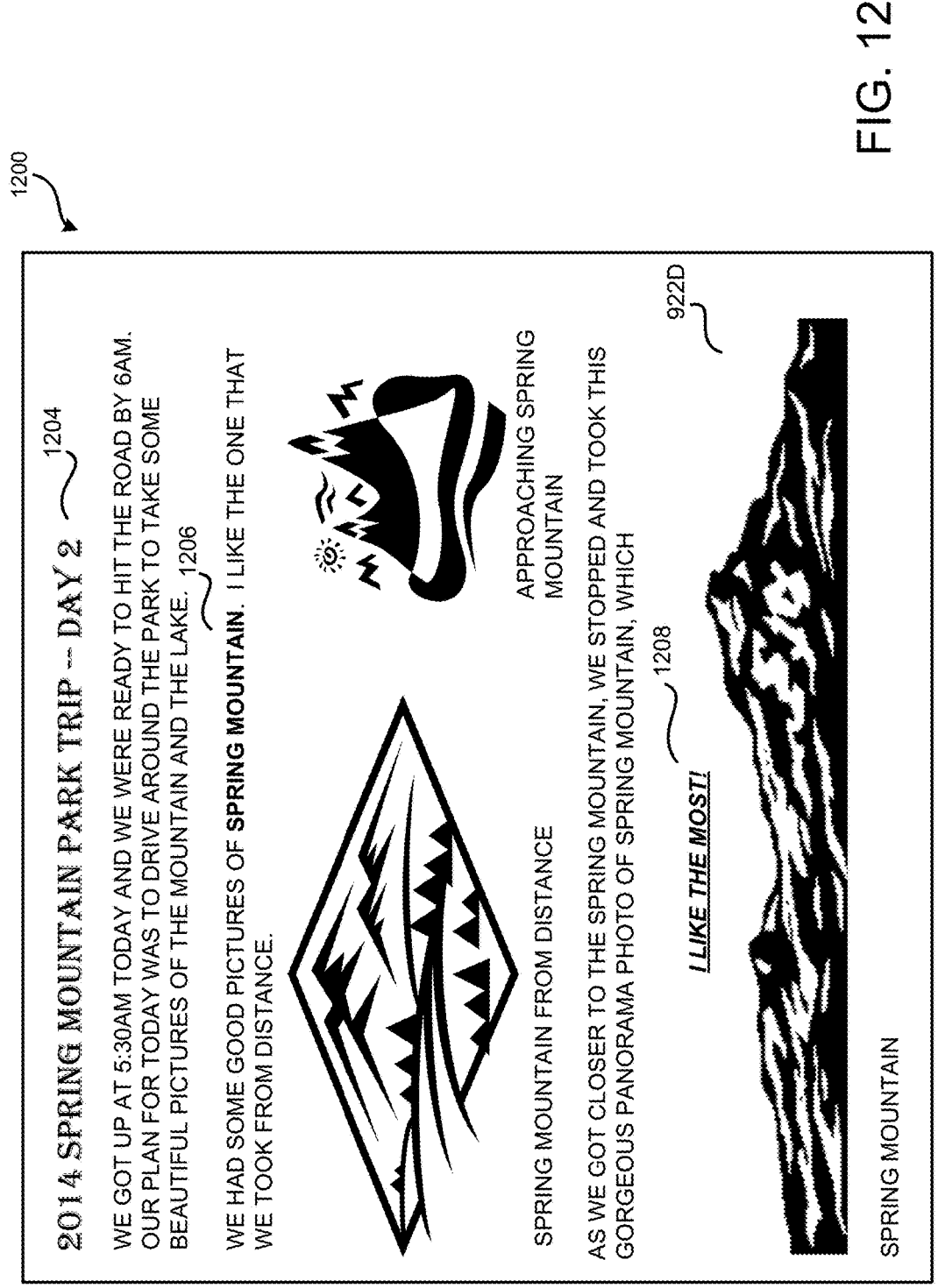
FIG. 12 illustrates a rendered view of content data presented in a modified layout generated based on user feedback according to aspects of the techniques and technologies presented herein.

FIG. 12 illustrates a rendered view 1200 that is a modified version of the rendered view 900B. In this example, the modification is made according to a user feedback 224 about the layout presented in the rendered view 900B. Specifically, the feedback 224 includes a high-level feedback requesting section tile 1204 to be presented more dramatically, a detailed feedback specifying the text "spring mountain" to be made bold, and also a intent feedback that adds more emphasis on the text "I like the most!" Based on the feedback 224, a decorative typeface, such as the Algerian typeface, may be employed by the layout generation engine 108 to present the section title; the text 1206 has been made bold as requested in the feedback 224; and the text 1208 has been underlined and repositioned between the text block where it belongs to and the image 922D. As discussed above, if the author 102 is still not satisfied with the updated rendered view 1200, he/she may provide further feedback 224 to request more changes on the generated layout 304.

As summarized above, technologies are described herein for providing a dynamic presentation of contextually relevant content during an authoring experience. Generally described, as a user writes about a topic, the authored content received from the user is analyzed to identify one or more keywords that may be used to identify, retrieve and present suggested content to the user. The suggested content may be received from one or more content resources, such as a search engine, a data store associated with the user, social media resources, or other local or remote files. Techniques described herein also select the keywords from authored content based on a cursor position. As a result, the suggested content may change as the cursor moves to a new position in the authored content. In addition, techniques described herein provide a user interface control that allows for the selection and de-selection of one or more keywords, which allows a user to tailor the suggested content by toggling one or more controls. The technologies and concepts disclosed herein may be used to assist users, such as a blogger, to write about one or more topics of interest.

Figure 13:
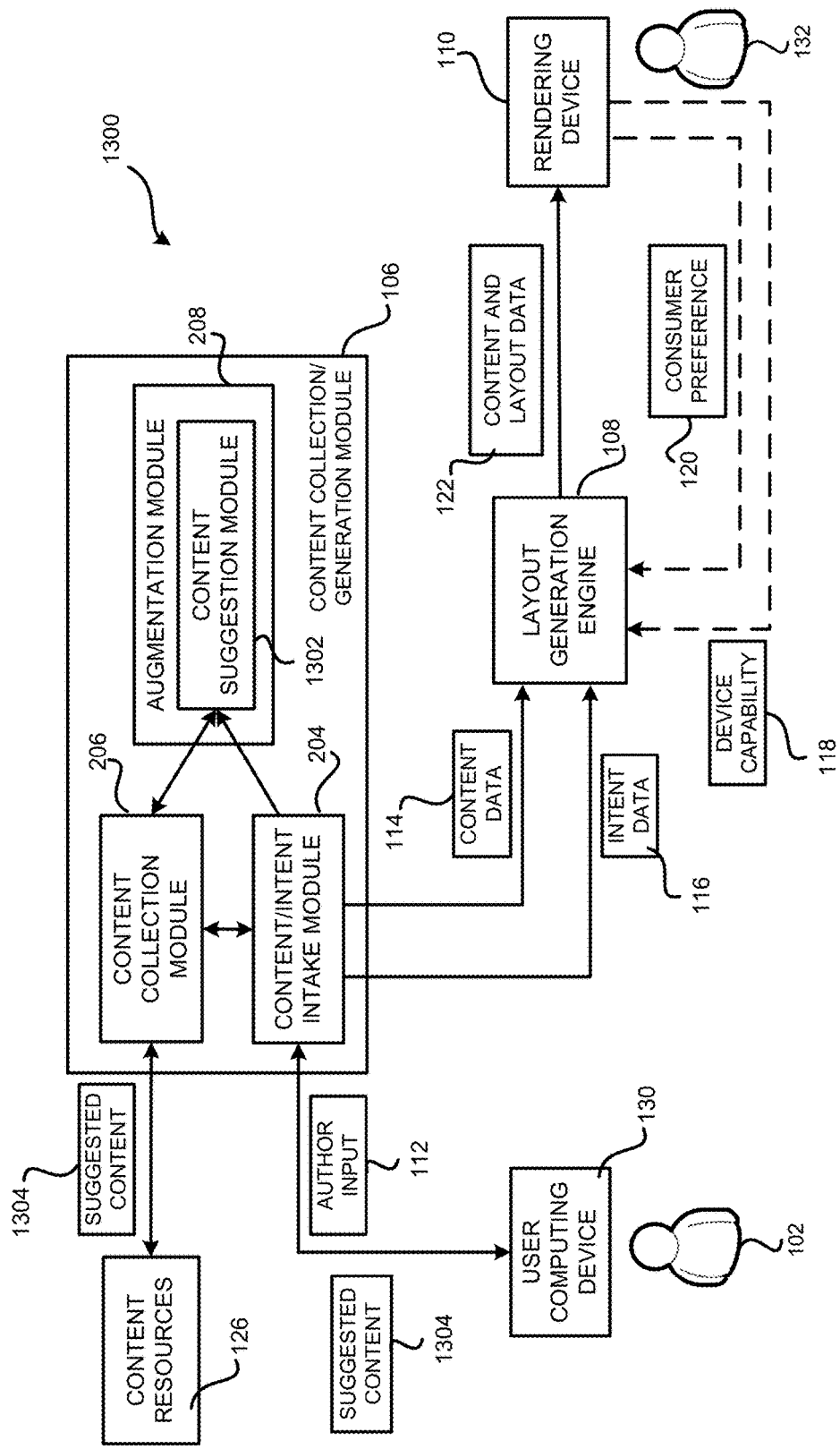
FIG. 13 is a block diagram showing one illustrative operating environment that may be used to implement one or more configurations providing a dynamic presentation of contextually relevant content during an authoring experience.

FIG. 13 is a system diagram showing one illustrative operating environment that may be used to implement one or more configurations for providing a dynamic presentation of contextually relevant content during an authoring experience. As can be appreciated, the system 1300 includes a number of components of the system 100 depicted in FIG. 1. In addition, FIG. 13 shows a system 1300 including a content/intent intake module 204 for receiving an input 112, also referred to herein as the "author input 112" or "content data," from the user computing device 130. The system 1300 also includes a content suggestion module 1302 for determining one or more keywords from the input 112. The content suggestion module 1302 is also configured to identify and retrieve suggested content 1304. For illustrative purposes, the suggested content 1304 is also referred to herein as "additional content data." The content suggestion module 1302 is also configured to identify and retrieve new suggested content 1304 as the author input 112 is modified. A content collection module 206 is in communication with one or more content resources 126, the content suggestion module 1302 and the content/intent intake module 204 to communicate the suggested content 1304 to the user computing device 130. As will be described in detail below, these modules operate in concert to dynamically identify and display the suggested content 1304 based on changes to the input 112.

In some configurations, the input 112 may be communicated from the content/intent intake module 204 to the content suggestion module 1302 where the input 112 is processed to identify one or more keywords. As will be described in more detail below, one or more keywords may be selected by the use of a window that is defined around specific areas of a text entry field. In some configurations the window is positioned in the text entry field relative to a position of a cursor of a text entry application. The content suggestion module 1302 then communicates selected keywords to the content collection module 206 to retrieve suggested content 1304 from one or more content resources 126. In some illustrative examples, the content resources 126 may include a search engine, a data store associated with the user, social media resources, or other local or remote files. The suggested content 1304 and one or more of the selected keywords may be communicated from the content suggestion module 1302 to the content/intent intake module 204. The content/intent intake module 204 may communicate the suggested content 1304 and one or more of the selected keywords to the user computing device 130 for display to the author 102. In addition, intent data 116, the content data 114, which may include the suggested content 1304, may be communicated to the layout engine 108 for further processing.

Figure 14:
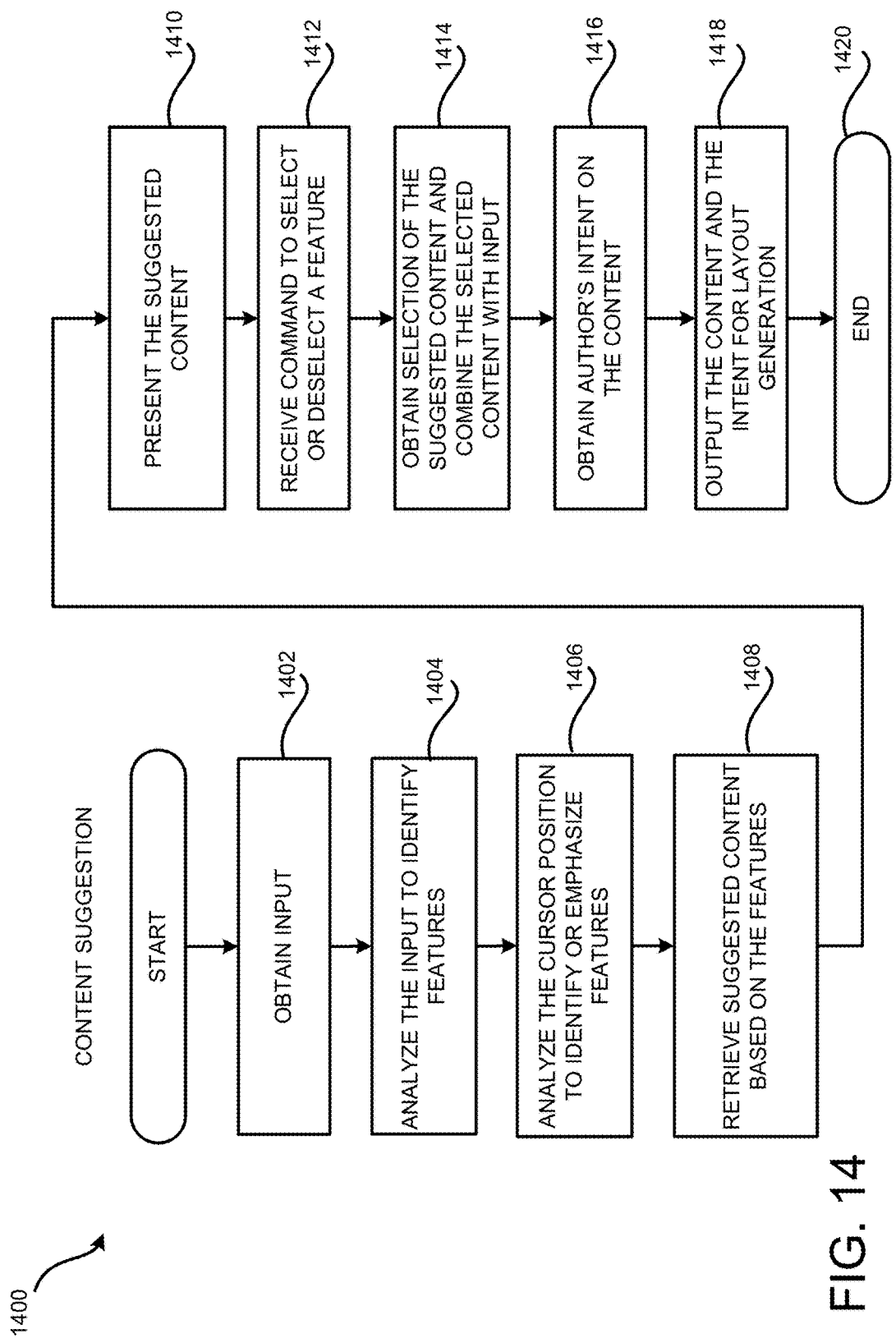
FIG. 14 is a flow diagram illustrating aspects of a method providing a dynamic presentation of contextually relevant content during an authoring experience.

Turning now to FIG. 14, aspects of a routine 1400 for providing a dynamic presentation of contextually relevant content during an authoring experience are shown and described below. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

As shown in FIG. 14, the routine 1400 begins at operation 1402, where the content/intent intake module 204 obtains an input 112, also referred to herein as "input data" or "authored content." Generally described, the input 112 may include any content such as text, images, graphics and/or any other data that may be used for authoring material. In some configurations, as the input 112 is entered into the editing interface, the input 112 may be contemporaneously communicated to the content/intent intake module 204. The input 112 may also be communicated to the content suggestion module 1302 where the input 112 may be analyzed as the input 112 is received from the user computing device 130.

In some configurations, the input 112 may also include data defining a position of a cursor or a pointer. As can be appreciated, text editing applications may utilize a cursor to indicate a current editing point. A cursor may be repositioned to different locations of the text to provide additions or edits to one or more desired editing points. As described in more detail below, to facilitate technologies described herein, data defining the position of a cursor relative to the other input data, such as text characters or images, may be included in the input 112. As will be described in more detail below, a position of the cursor or pointer relative to any input content, such as text or an image, may be used to identify features of the input 112, such as keywords or contextually relevant metadata.

Next, at operation 1404, the content suggestion module 1302 analyzes the input 112 to identify one or more features. Generally described, features may be any type of information that may be used to derive context from the input 112. In some configurations, a feature may include one or more keywords selected from the input 112. As can be appreciated, the one or more keywords may be identified by the use of a number of different algorithms and techniques. For instance, if the input 112 includes a paragraph of text, one or more techniques may determine that certain types of words may have a higher priority than other words in the text. For example, nouns or verbs may have a higher priority than conjunctive words. In other examples, words that may be associated with the user's profile or usability history may have a higher priority than other words. One or more factors, such as the priority of a type of word, may be used to select one or more keywords.

Operation 1404 may also analyze other types of input data, such as an image, to determine one or more features. For instance, the metadata of an image may be analyzed to extract one or more keywords. In addition, other technologies such as face or object recognition technologies may be used to identify features of an image and such technologies may generate one or more contextually relevant keywords describing the features. As can be appreciated, other forms of media included in the input 112, such as video data or data defining a 3D environment, may also be analyzed to determine features and/or keywords.

Next, at operation 1406, the content suggestion module 1302 may analyze the cursor position to identify or emphasize to one or more features. As can be appreciated, the cursor of an editing interface may indicate a current editing position. For instance, in an interface for editing text, the position of the cursor identifies the location of where text or other objects will be inserted as an input is received. As can also be appreciated, the cursor may move as text or other content is added by the user. By using the cursor position to bring emphasis to features or keywords, new features or keywords may be selected as the user adds content. Thus, from a user experience perspective, the suggested content displayed to the user may dynamically update as content is added or as the cursor is moved.

As can be appreciated, operation 1406 may be used in conjunction with operation 1404, where the cursor position is used to bring emphasis to selected keywords. Alternatively, operation 1406 may be used in place of operation 1404, where keywords and other features of the input 112 are selected based on the cursor position. It can also be appreciate that the position of other visual indicators may be used with, or instead of, a cursor. For instance, the selection of one or more keywords or emphasis for selected keywords may be based on the position of a pointer, or the position of any other user-controlled input such as a touch gesture. Additional details and examples of operation 1406 are described in more detail below and shown in FIG. 15.

Next, in operation 1408, the system 1300 retrieves suggested content 1304 from one or more content resources 126 based on the identified features and/or keywords. As summarized above, the suggested content 1304 may be received from one or more resources, such as a search engine, a data store associated with the user, social media resources or other local or remote files. In some illustrative examples, suggested content 1304 may be retrieved from a personal data store, such as files stored in a local device or files stored in a server-based storage service such as, GOOGLE DRIVE or DROPBOX. In other illustrative examples, suggested content 1304 may be retrieved from a search engine, such as BING or GOOGLE, and/or one or more social networks such as FACEBOOK, LINKEDIN, and/or any other online service. Local or network-based databases may also serve as a content resource 126. It can be appreciated that known technologies for utilizing keywords or features may be used to identify, rank and retrieve suggested content 1304. In some configurations, a feature may include image data. In such configurations, the image data may be communicated to one or more resources to identify and retrieve suggested content 1304. Such configurations may utilize known image analysis technologies to identify and retrieve the suggested content 1304.

Next, in operation 1410, the system 1300 may present the suggested content 1304. As can be appreciated, the presentation of the suggested content 1304 may utilize one or more techniques for displaying the suggested content 1304 or communicating the suggested content 1304 to another computing device or module. For instance, in some configurations, the suggested content 1304 may be communicated from the content/intent intake module 204 to the user computing device 130 for display to the author 102. Additional details and examples of operation 1410 are described in more detail below and shown in FIG. 15.

Next, at operation 1412, the system 1300 may receive a command to select or deselect a feature and/or a keyword. Generally described, a user interface displaying the suggested content 1304 may also display the selected keywords or features that were used to retrieve the suggested content 1304 from the one or more content resources 126. In some configurations, the selected keywords or features may be arranged in a control, e.g., a button, which allows a user to toggle the use of individual features or individual keywords.

For example, if the input 112 includes text describing a trip to a park with views of mountains and lakes, by use of the techniques described above, the selected keywords may be "park," "lake" and "mountain." Given that the selected keywords are used to retrieve suggested content 1304, in this illustrative example, the system 1300 may retrieve and present images in the user's ONEDRIVE or another network accessible storage location, having metadata related to the selected keywords. In this illustrative example, it is also a given that the user interface presenting the images may include a "park" button, a "lake" button and a "mountain" button. By actuating each button, the individual keywords may be selected and deselected. Thus, by the use of the buttons, the system 1300 may modify the presentation of the suggested content 1304 as each keyword is selected or deselected. This example is provided for illustrative purposes only and is not to be construed as limiting, as any technique for selecting and deselecting features and/or keywords may be used. Additional details and examples of operation 1412 are described in more detail below and shown in FIG. 15.

Next, in operation 1414, the system 1300 may receive a selection of one or more objects from the suggested content 1304 and combine the selected content with the input 112. Generally described, suggested content 1304 may include a number of objects, such as images, sections of text and/or other types of data. In one illustrative example, the suggested content 1304 may include a number of images that may be displayed on a user interface next to a display of the input 112, e.g., the authored content. By the use of one or more graphical user interface features, a user may select one of the images from the suggested content 1304 and insert the selected image into the authored content. In another example, suggested content 1304 may include a section of text, that section of text may be selected and placed into the authored content. Additional details and examples of operation 1414 are described in more detail below and shown in FIG. 15.

Next, in operation 1416, the system 1300 may obtain the author's intent. Details of techniques for obtaining and processing intent data 116 are provided above. Operation 1416 may be configured in a manner similar to one or more operations of routine 600 shown in FIG. 6. As described, there are a number of techniques for processing and communicating the author's intent.

Next, at operation 1418, the intent data 116 and the content data 114, which may include the suggested content 1304, is communicated from the content/intent intake module 204 to the layout engine 108 where the communicated data is processed in a manner as described above. Once the intent data 116 and/or the content data 114 are communicated to the layout engine 108, the routine 1400 terminates at operation 1420.

Figure 15:
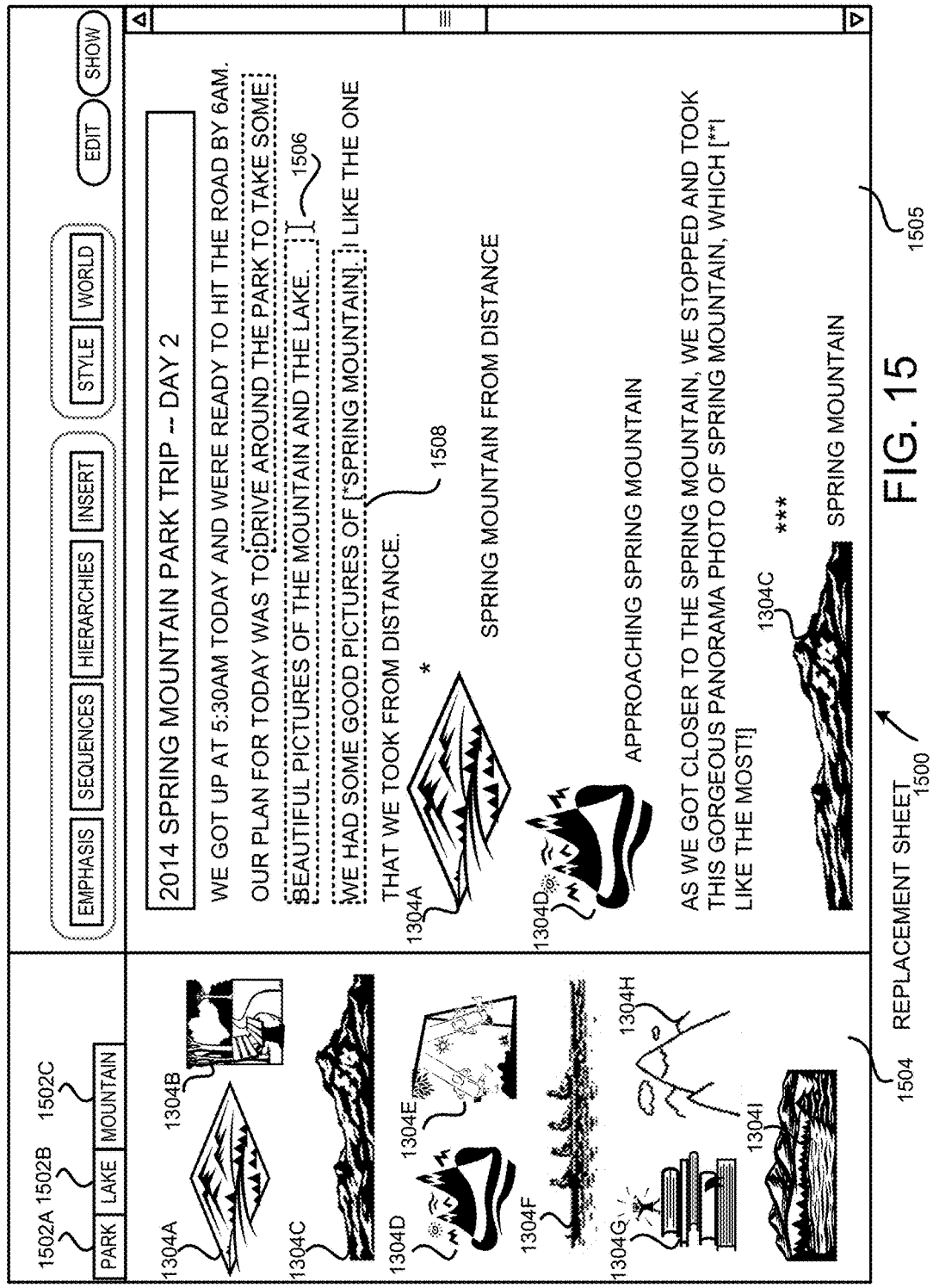
FIG. 15 illustrates an example user interface for receiving authored content and displaying suggested content generated by the method of FIG. 14.

Referring now to FIG. 15, an input interface 1500 for receiving the input 112 and displaying suggested content 1304A-1304I (collectively and generically referred to herein as "suggested content 1304") is shown and described below. As shown, an interface 1500 includes a content suggestion section 1504 for displaying the suggested content 1304. In addition, the interface 1500 is configured with a editing section 1505 for receiving and displaying the input 112. In some configurations, as authored content is entered by the user in the editing section 1505, the authored content is processed to identify one or more keywords to identify and display the suggested content 1304.

As described above, in some configurations, the selection of the features, such as the keywords, may be based on the position of the cursor 1506. In some configurations, a pre-defined area around the cursor 1506 may be utilized to determine one or more selected keywords. For illustrative purposes, the pre-defined area around the cursor 1506 may be referred to herein as a "window 1508," which is represented in FIG. 15 with the dashed-line. Thus, as the user enters authored content, the window 1508 may follow the cursor, thus providing focus to words near the current editing position. Techniques disclosed herein and other techniques may be used to select keywords within the window 1508, and the selected keywords may be used to obtain the suggested content 1304.

The interface 1500 also allows a user to select one or more items from the content suggestion section 1504 and insert the selected items into the editing section 1505. The example shown in FIG. 15 illustrates an example of a modification where three images 1304A, 1304D and 1304C were selected and positioned into the editing section 1505. As can be appreciated, the selection and positioning of the selected content may be achieved by one or more known technologies, including a user interface features for allowing a user to drag and drop an image or other content into a desired position.

Also summarized above, the interface 1500 may display the selected keywords, e.g., the selected features, with the suggested content 1304. With reference to the illustrative example described above, FIG. 15 shows an example interface showing the "park" button 1502A, the "lake" button 1502B and the "mountain" button 1502C. By actuating each button, the individual keywords may be selected and deselected. Thus, by the use of the buttons, the system 1300 may modify the presentation of the suggested content 1304 as each keyword is selected or deselected. If the user actuates the "mountain" button for example, the images of the mountains may be removed or replaced with other images.

In some configurations, the above-described techniques may utilize contextual data derived from the input 112 to identify subjects of the input, and based on the subjects of the input, the system identifies and retrieves content on additional subjects related to the subjects of the input. In such configurations, the input 112 may be analyzed and the system may generate contextual data. Known technologies may be used to analyze the input 112 to identify a subject, such as a person, place or thing. Data describing the identified subject may be used to identify one or more related subjects that may be presented to the user. By providing additional subjects to the author during entry of the input 112, the author may obtain timely information on content that may not have been contemplated.

In one illustrative example, an author 102 may provide an input that describes a history of London and Berlin. In processing this type of input, the content suggestion module 1302 may identify and/or generate contextual data that indicates the author 102 is writing about a certain subject, e.g., capitals of European countries. Using the contextual data, the system may then further identify related subjects, such as capitals of other European countries, such as Rome or Belgrade. Suggested content, such as pictures, text or other forms of media, associated with the related subjects may then be retrieved and presented to the author 102. For example, pictures, text or other media related to Rome or Belgrade may be presented in the content suggestion section 1504. Such techniques may enhance the author's user experience by providing contextually related topics as they are authoring a document.

In addition to identifying related subjects, in some configurations, the above-described techniques may utilize contextual data derived from the input 112 to determine the type of queries that may be used to retrieve suggested content 1304. In such configurations, the input 112 may be analyzed and the content suggestion module 1302 may generate queries to retrieve contextually related data from the content resources 126.

In one illustrative example, an author 102 may provide an input 112 in the form of a sentence that states "Brad Pitt does lots of activities with his children." From this type of input, the system may process the input 112 and identify a specific topic. For instance, the content suggestion module 1302 may interpret this sample input and determine that it is related to Brad Pitt's personal life. The content suggestion module 1302 may then present suggested content 1304 based on Brad Pitt's personal life, such as hobbies, activities, etc. Such techniques allow the content suggestion module 1302 to retrieve suggested content 1304 that is contextually relevant to the author's content. For example, by the use of the techniques described herein, the sample input regarding Brad Pitt's personal life may not produce suggested content 1304 about Brad Pitt's movies or career.

In another illustrative example, consider an input 112 where an author is writing a summary about "taking a drive in their new Lincoln." When such an input is obtained by the system, the techniques described herein may be used to generate contextual data that indicates that the author is describing a car instead of the former President. Conversely, if the input 112 include a statement, such as "Lincoln was born on February 12," the system may analyze this input and generate contextual data indicating that the author is writing about the former President. The contextual data may be used to build queries that retrieves suggested content 1304 that is contextually relevant to the author's content.

As summarized above, keywords used for retrieving suggested content 1304 may be based on the cursor position. In some configurations, in addition to using the cursor position, the process of selecting keywords may be based on the structure of the content the author is providing as an input 112. Generally described, the input 112 may include one or more elements, such as line breaks, section headers, titles or other formatting characteristics. Techniques described herein may interpret these elements of the input to select one or more keywords that are used to obtain the suggested content 1304.

In one illustrative example, consider an input that includes titles, section titles and a number of paragraphs. In this example, a first paragraph describes particular sites in Paris and a second paragraph describes particular sites in London. If the author is currently entering text in the second paragraph, based on a document element such as a line break, the system may determine that keywords in the second paragraph are more relevant than keywords in the first paragraph. Thus, in this example, the selected keywords for retrieving suggested content 1304 may be more focused on keywords related to London and sites in London. As can be appreciated, in some implementations, such techniques may involve the generation of a tree structure of the input. The tree structure may be based on one or more elements of the input, such as titles, section titles, line breaks, formatting indicators or other characteristics. Using the position of the cursor, or even without using the position of the cursor, keywords may be selected based on tree structure, e.g., the structure of the input 112. In the configurations where the position of cursor is not used, keywords may be selected based on the most recently entered element of the tree, spacing between keywords, or any other technique that considers the structure of the tree.

As summarized above, technologies are described herein for generating sample authoring content based on a user input. Generally described, sample content, such as a synopsis of a subject, may be generated from a contextual interpretation of one or more keywords provided by a user. Using the one or more keywords, a system retrieves content data from one or more resources. The content data is parsed and used to generate a structure of the content data. The structure is then used to generate sample content that may be presented to the user. The presented information may provide a way to jumpstart an authoring project on particular topics of interest.

The technologies and concepts disclosed herein may be used to assist users, such as students, amateur-bloggers, to write about one or more topics of interest. In some illustrative examples, technologies disclosed herein may interpret a minimal input, such as the use of one or two keywords, to compile information and build a structured synopsis from one or more resources, such as a Wiki, a video from YOUTUBE, a news article from BING NEWS or other content from other resources. The output communicated to the user may include a structure of suggested content, such as a title, section titles and sample sentences. The structure of the output may come from a signal resource, such as an article from WIKIPEDIA, or the structure may be an aggregation of information from many resources, including input from one or more users. In addition, data describing a relationship type may be determined and processed to create the structure.

Figure 16:
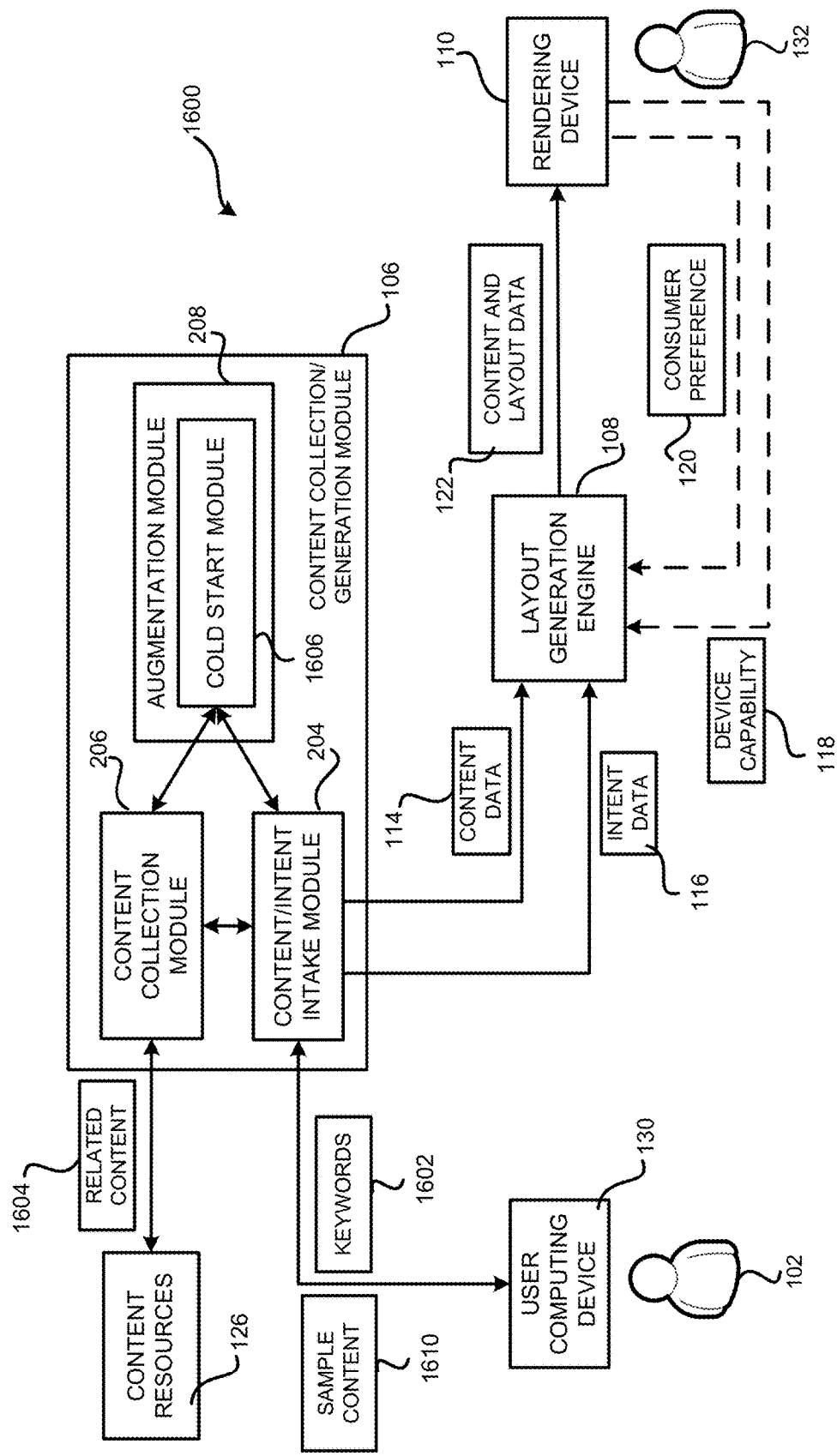
FIG. 16 is a block diagram illustrating aspects of the techniques and technologies presented herein for generating sample content for authoring based on a user input.

FIG. 16 is a system diagram showing one illustrative operating environment that may be used to implement one or more configurations for generating sample authoring content based on a user input. As can be appreciated, the system 1600 includes a number of components of the system 100 depicted in FIG. 1, the details of which are described above. In addition, FIG. 16 shows that the system 1600 includes a content/intent intake module 204 for communicating input data and sample content with a computing device, such as the user computing device 130. The system 1600 also includes a cold start module 1606 for processing input data to determine one or more content resources 126 and for receiving related content 1604 from the content resources 126. In addition, the cold start module 1606 processes the related content 1604 to determine a structure for the sample content 1610. As will be described in detail below, these modules operate in concert to generate and deliver sample content 1610 to the user computer device 130 based on an input, such as the one or more keywords 1602.

In some configurations, the user computing device 130 provides one or more keywords 1602, which are communicated to the content/intent intake module 204, and the content/intent intake module 204 communicates the one or more keywords 1602 to the cold start module 1606. The cold start module 1606 then processes the keywords 1602 to determine an entity type. The cold start module 1606 then utilizes the keywords 1602 and/or data defining the entity type to select one or more content resources 126. The content collection module 206 then communicates one or more queries to the selected content resources 126 to obtain related content 1604. As summarized above, examples of selected content resources 126 may include a Wiki site, a database of articles, a database of videos or other resources containing searchable information. Once the content collection module 206 obtains the related content 1604, the related content 1604 is communicated to the cold start module 1606 where it is processed to determine a structure for an output, such as the sample content 1610. The content/intent intake module 204 may communicate the sample content 1610 to the user computing device 130 for presentation to the author 102. In addition, the content/intent intake module 204 may communicate content data 114 and intent data 116 to the layout engine 108 for further processing, which is described above and shown in FIG. 6.

Figure 17:
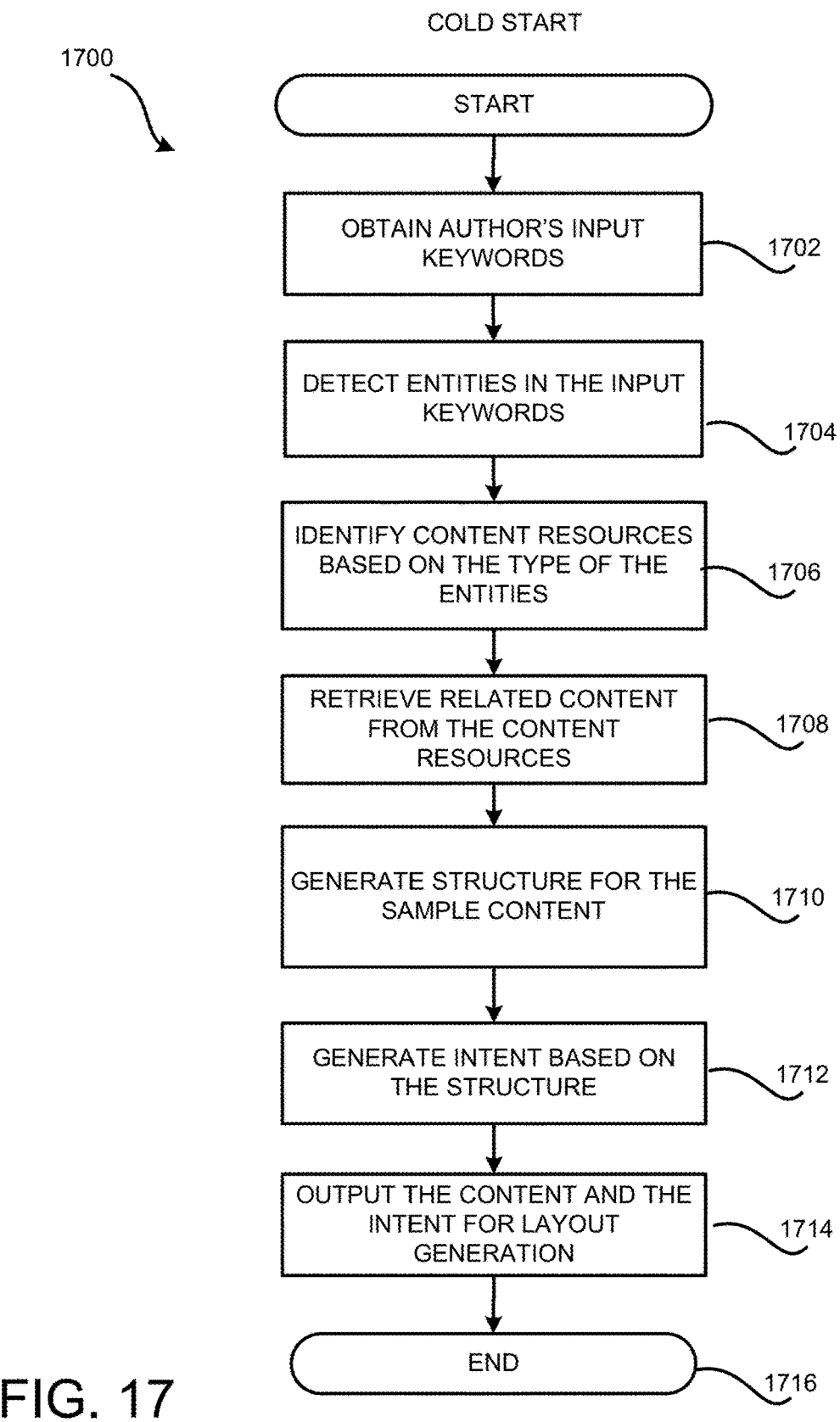
FIG. 17 is a flow diagram illustrating aspects of a method for generating sample content for authoring based on a user input.

Turning now to FIG. 17, aspects of a routine 1700 for generating sample content 1610 based on a user input are shown and described below. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

As shown in FIG. 17, the routine 1700 begins at operation 1702, where the content/intent intake module 204 obtains an input, which may be in the form of one or more keywords 1602. In some configurations, the one or more keywords 1602 are received by the content/intent intake module 204 and communicated to the cold start module 1606 for further processing. In one illustrative example, at operation 1702, the input may include a single keyword, such as "Nebraska." As can be appreciated, the input may include more than one keyword. However, the techniques presented herein may provide relevant content data 114 based on one or two keywords. It can also be appreciated that the input may be in other forms. For instance, a user may provide one or more images as an input. The one or more images, or any other received data, may be analyzed to generate one or more keywords or the image or other data may be used as search criteria.

Next, at operation 1704 the cold start module 1606 processes the input, e.g., the one or more keywords 1602, to detect one or more entities. Generally described, to detect an entity, the cold start module 1606 interprets the input and determines a contextual meaning of the one or more keywords 1602. In some configurations, an interpretation of the one or more keywords 1606 may involve a process of identifying an entity type. The entity type, for example, may be a state, city, person or any category of information associated with a person, place, object or subject. These examples are provided for illustrative purposes and are not to be construed as limiting. With reference to the present example, where the input is a keyword, "Nebraska," the cold start module 1606, in operation 1704, may determine that the keyword is associated with an entity type characterized as a "state." Upon the identification of one or more entities in operation 1704, as described below, data defining the entity type and the one or more keywords 1602 may be used to identify one or more content resources.

In some configurations, one or more content resources 126 may be used to detect and identify the entity type and/or the entity. In such configurations, the keywords 1602 may be communicated to one or more content resources 126, such as BING, GOOGLE, WIKIPEDIA or any other content resource configured to receive an input and generate content based on the input. It can be appreciated that any content received from the one or more content resources 126 may be interpreted and processed to identify an entity and/or an entity type. It can be also appreciated that results from one resource may be used to identify an entity and/or an entity type. Further, it can be appreciated that results from multiple resources may be aggregated to identify an entity and/or an entity type.

Next, at operation 1706, the cold start module 1606 identifies the content resources 126 based on the entity type and/or the one or more keywords 1602. In some configurations, the cold start module 1606 may store data that associates entity types to one or more resources. For example, if the entity type is a location, such as a city or state, the cold start module 1606 may associate that entity type with a particular content resource, such as WIKIPEDIA, an online encyclopedia or another content resource. As can be appreciated, these example content resources are provided for illustrative purposes only and are not to be construed as limiting. In the present example, the entity type, "location," may be identified with the keyword "Nebraska," and with that entity type, the content collection module 206 may identify WIKIPEDIA as one of the selected content resources 126. Upon the identification of one or more selected content resources 126, data describing the identity of the selected content resources 126 may be communicated to the content collection module 206.

Next, at operation 1708, the content collection module 206 obtains the related content 1604 from the selected content resources 126 using the identification of the selected content resources 126. In operation 1708, for example, the content collection module 206 may direct a query to the selected content resources 126 to obtain the related content 1604. For illustrative purposes, the related content 1604 is also referred to herein as "content data." In one illustrative example, a query directed to the selected content resources 126 may include the data describing the entity type and/or the keywords 1602. It can be appreciated that the query that is communicated to the content resources 126 may be in any form and the query may include information or data that accompanies or replaces the one or more keywords 1602 and/or the entity type. In one illustrative example, the query to the content resources 126 may be a URL directed to the selected content resource 126. The URL may include the one or more keywords 1602 and/or the entity type and/or other contextual information related to the keywords 1602.

In response to the query, the selected content resources 126 may return the related content 1604 to the content collection module 206. In the current example, based on the keyword, "Nebraska," and the entity type, the content resource 126, which in this example is WIKIPEDIA, may return related content 1604 in the form of a Web page. It can be appreciated that the related content 1604 may be in any format, such as a markup document, WORD document or a database file. Once the related content 1604 is received, the content collection module 206 may communicate the related content 1604 to the cold start module 1606 where the related content 1604 is processed further.

Next, at operation 1710, the cold start module 1606 may generate a structure for the sample content 1610 by analyzing structural elements of the related content 1604. Generally described, the structure of the related content 1604 and/or other contextual information that may be derived from an analysis of any received content is used to generate the structure of the sample content 1610. For example, Title or Header tags in the related content 1604 may be used to identify text having a heightened priority, e.g., text indicating a topic, subtopic or a need for a section title. Such text may be associated with one or more structural elements, e.g., section titles, in the sample content 1610. In other examples, an increased font size or bolded text may be used to identify text having a heightened priority. As can be appreciated, any data type or formatting indicators within any received content, such as the related content 1604, may be used as a basis for identifying structural elements of the sample content 1610. For illustrative purposes, the sample content 1610 is also referred to herein as "sample content data."

In addition to the identification of structural elements, such as the title or the section title, techniques disclosed herein may identify and utilize sample sentences from the related content 1604 and/or any received content. Generally described, sample sentences may be used to assist an author in starting a composition by providing initial content for one or more topics or sections. For example, in some configurations, when a topic or subtopic is identified, the cold start module 1606 may extract one or two simple sentences that relate to the topic or subtopic, such as a sentence that follows a header or a title. As a result, sample content 1610 and/or content data 114 that is generated in operation 1710 may include a structure having a title, section titles and sample sentences.

In addition to analyzing structural elements of the related content 1604 to determine the structure of the structure for the sample content 1610, content may be generated by the cold start module 1606. The generated content, e.g., titles, section titles and/or sample sentences, may be used to supplement the above-described structural elements and sample sentences obtained from the related content 1604. Alternatively, the generated content may be used alone or in conjunction with other collected information. As can be appreciated, the generated content may be derived from search queries, stored data, historical use information or other data obtained by the system 1600.

With reference to the current example involving the "Nebraska" query, the related content 1604 may be in the form of a Web page returned from WIKIPEDIA. Tags, data defining data types, formatting data and/or other metadata of the Web page may be used as a basis for determining the structure for the sample content 1610. In this example, the generated sample content 1610 may arrange the input, "Nebraska," as a title. In addition, in this example, it is given that the related content 1604 contains a number of words in bolded headlines: Synopsis, News on Nebraska, Geography and Economy. In addition, in this example, it is given that the related content 1604 contains several sentences following each bolded headline. Given this example structure of the related content 1604, the generated sample content 1610 may have a structure having a title (Nebraska), section titles (Synopsis, News on Nebraska, Geography and Economy) and sample sentences. Additional details of this example and other details of operation 1710 are provided below and shown in FIG. 18.

As can be appreciated, although structural elements, e.g., tags, data types and other information, may be used to determine the structure of the sample content 1610, any method for identifying a structure and relevant information may be used. For example, if the related content 1604 is in the form of an image or video, the format of any graphically presented text and other visual indicators that bring highlight to rendered text may be interpreted to identify one or more structural elements.

Returning again to FIG. 17, the routine 1700 proceeds at operation 1712 where the system 1700 generates intent data 116. Details of techniques for processing intent data, also referred to as "user intent," are provided in the description above. As also summarized above, in some configurations, the intent data 116, which is also referred to herein as an "intent" or "data indicating an intent," may emphasize or prioritize certain topics or sections of text. In addition, intent data 116 may further indicate an intended use of the content, such as being published as a blog article posted online, an article to be printed out in a newspaper, a video to be published presented to consumers, and other uses. As described above, intent may influence the generation of an output produced by the layout generation engine 108. As also described above, intent may derived from a number of sources. For example, the intent may be based on an interpretation of the structure of the sample content 1610 and/or the related content 1604.

In some configurations, one type of intent may be based on the priority associated with one or more words or phrases. With reference to the current example involving the "Nebraska" query, for example, the text associated with the title may have a higher priority than text associated with a section title. Similarly, in another example, the section titles may have a higher priority than the sample sentences. As summarized above, data defining one or more priorities, e.g., intent, may be used by the layout engine 108 for further processing models.

Next, at operation 1714, the intent data 116 and the content data 114 may be communicated from the content/intent intake module 204 to the layout engine 108. As described above, the layout engine 108 may process the intent data 116 and/or the content data 114 in a number of different ways, details of which are provided above. In addition to communicating data with the layout engine 108, content data 114 may be presented to a user on a display device using one or more interfaces. Once the intent data 116 and/or the content data 114 are communicated to the layout engine 108, the routine 1700 terminates at operation 1716.

As summarized above, with reference to operation 1710, techniques described herein may generate sample content 1610. In some configurations, the cold start module 1606 may analyze the related content 1604 to derive contextual information related to the related content 1604. In one illustrative example, the analysis of the of the related content 1604 may identify one or more entities, such as a person, place or an object. In addition, the analysis of the of the related content 1604 may identify related entities having one or more associations to the identified entities. For example, a contextual analysis of the related content 1604 may identify a first entity, such as a person, and a related entity, such as the person's spouse. From this information, the cold start module 1606 may generate additional content, such as a section header, title, sample sentences, or any other content describing any identified entities and/or related entities.

In one illustrative example, if a user enters an input containing the string "Brad Pitt," the cold start module 1606 may identify the actor as one entity. In addition, the cold start module 1606 may analyze the related content 1604 and identify related entities, such as family members. Based on derived contextual information, the cold start module 1606 may generate additional section titles, e.g., a section title regarding the spouse, each child or other family members. In addition, the cold start module 1606 may generate additional sample sentences. As can be appreciated, the cold start module 1606 may aggregate and/or modify retrieved content. Thus, new structural elements and/or content may be generated.

In some configurations of operation 1710, the cold start module 1606 may be configured to randomize the structure that is derived from the related content 1606. For instance, with reference to the above example involving the Nebraska query, the existing structure involving the synopsis, city & state, may be change to a different structure. For instance, the section headers may be rearranged, reworded or other otherwise modified to appear differently each time the same input is used. As can be appreciated, a process of randomizing the structure of the output may be beneficial given that the output is to be used as an authoring tool. Such features allow the system 1700 to accommodate a large number of users without creating sample data having identical structures for each user.

Figure 18:
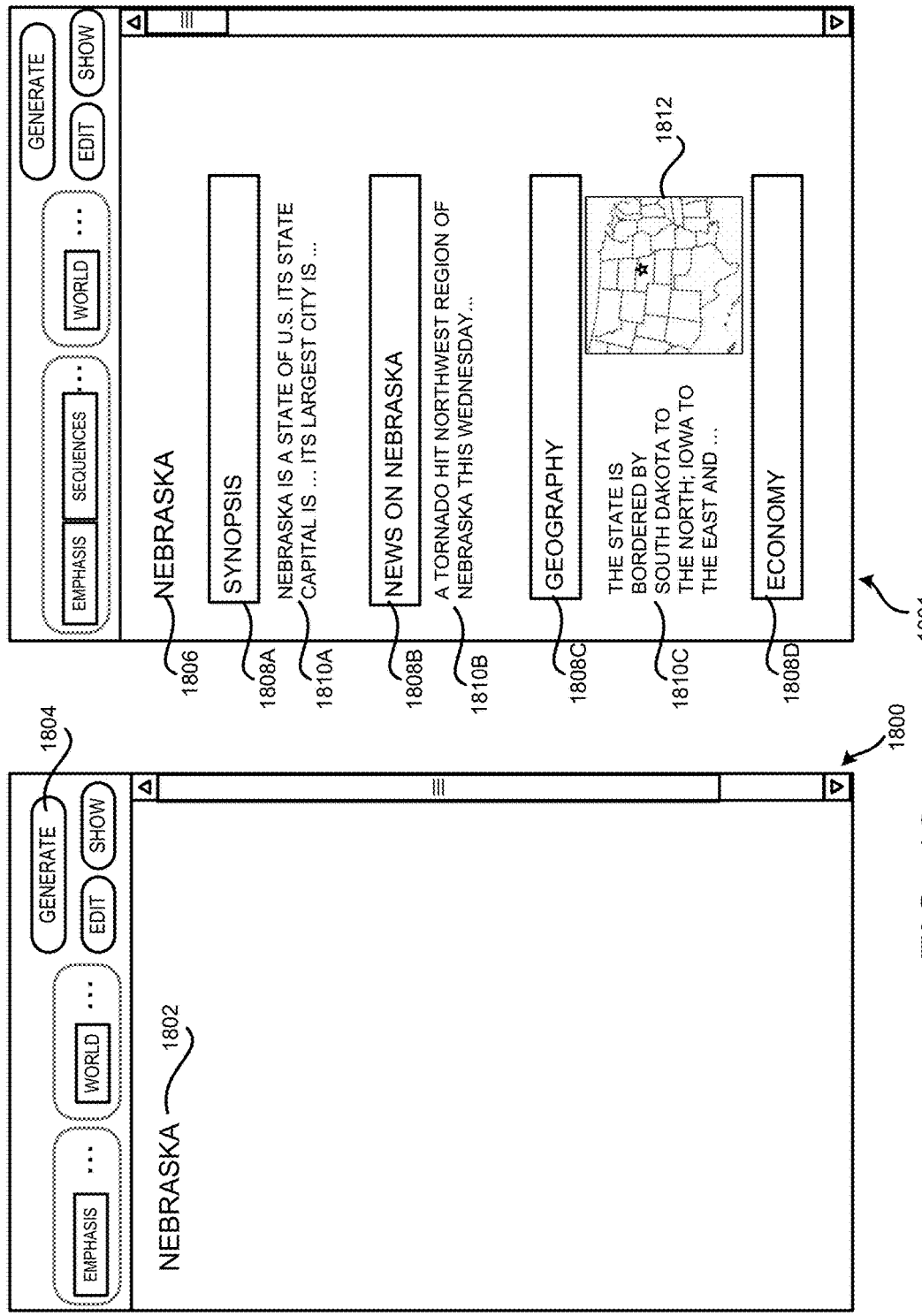
FIG. 18 illustrates a first user interface that may be utilized by an author to input content data and a second user interface to receive generated sample content based on the input content data.

Referring now to FIG. 18, an input interface 1800 for receiving an input is shown and described below. As shown in FIG. 18, the input interface 1800 is configured with a field 1802 for receiving an input, such as a text input. As can be appreciated, the field 1802 may be configured to receive and edit text and other forms of data. In addition, the input interface 1800 may be configured to communicate text and other forms of data to the content/intent intake module 204. The input interface 1800 may also be configured with one or more controls, such as a "generate" button 1804. When the generate button 1804 is invoked, data or text from the field 1802 may be communicated from the interface 1800 to the content/intent intake module 204 for processing.

FIG. 18 also illustrates the display interface 1801 that is configured to display data or information, such as the sample content 1610. As applied to the current example involving the "Nebraska" query, the display interface 1800 is configured to display the sample content 1610 that is generated in operation 1710. As shown, the display interface 1801 displays a title 1806, a list of section titles (1808A-1808D) and related sample sentences (1810A-1810C). The display interface 1801 may be configured to communicate text and other forms of data with the content/intent intake module 204. In addition, the display interface 1801 may be configured to display an image 1812, which may be provided by the sample content 1610 or any other resource or module. In addition, the display interface 1801 may be configured to allow a user to edit the displayed content, such as text or images. For example, a user may edit the title, one or more section titles, one or more sample sentences or one or more images.

Figure 19:
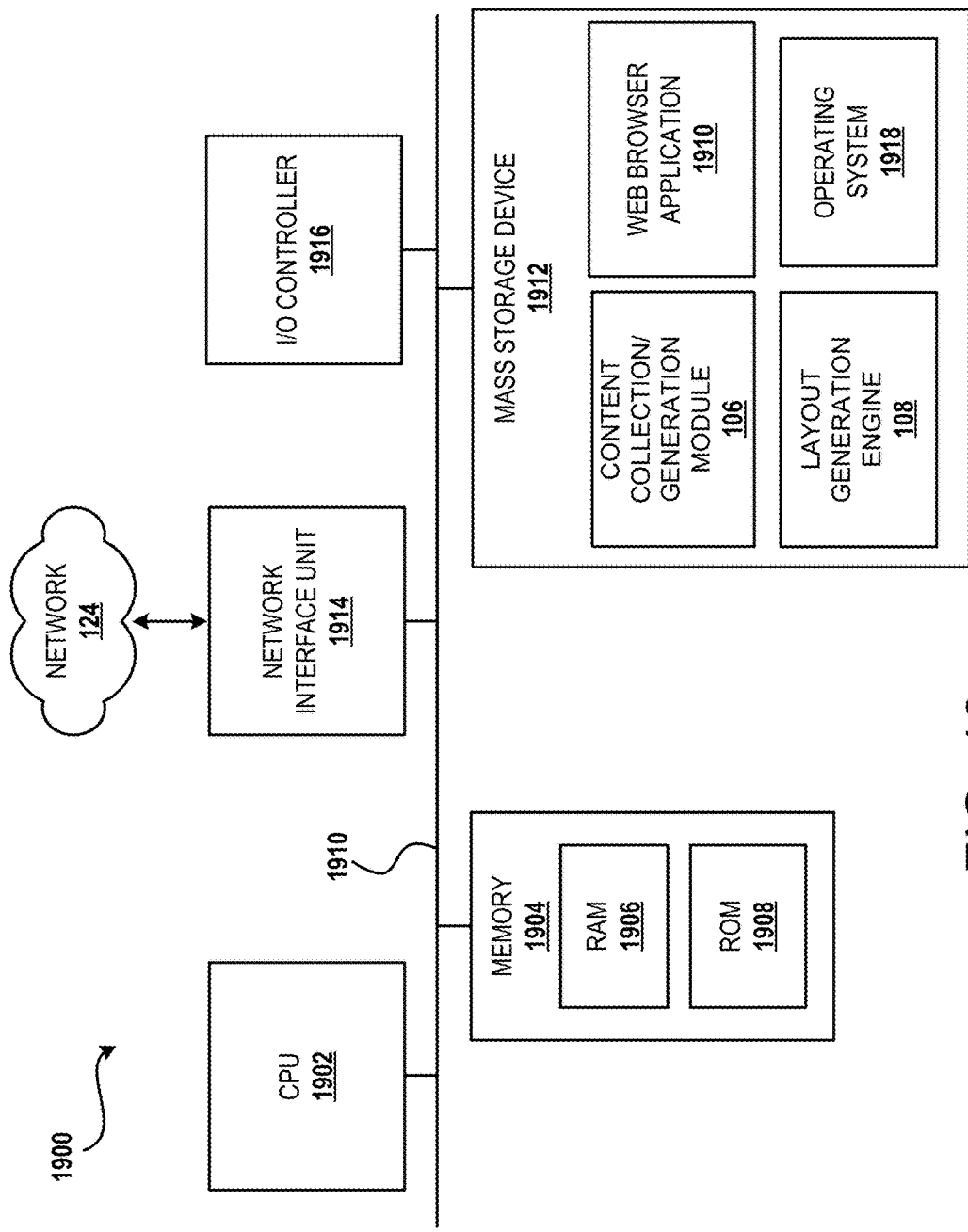
FIG. 19 is a computer architecture diagram illustrating an illustrative computer hardware and software architecture for a computing system capable of implementing aspects of the techniques and technologies presented herein.

FIG. 19 shows additional details of an example computer architecture 1900 for a computer capable of executing the program components described above for providing content authoring service for generating a layout for content data based on user intent. The computer architecture 1900 illustrated in FIG. 19 may illustrate an architecture for a server computer, a mobile phone, a PDA, a smart phone, a desktop computer, a netbook computer, a tablet computer, and/or a laptop computer. The computer architecture 1900 may be utilized to execute any aspects of the software components presented herein.

The computer architecture 1900 illustrated in FIG. 19 includes a central processing unit 1902 ("CPU"), a system memory 1904, including a random access memory 1906 ("RAM") and a read-only memory ("ROM") 1908, and a system bus 1910 that couples the memory 1904 to the CPU 1902. A basic input/output system containing the basic routines that help to transfer information between elements within the computer architecture 1900, such as during startup, is stored in the ROM 1908. The computer architecture 1900 may further include a mass storage device 1912 for storing an operating system 1918, and one or more application programs including, but not limited to, the layout generation engine 108, the content collection/generation module 106, and/or a web browser application 1910.

The mass storage device 1912 is connected to the CPU 1902 through a mass storage controller (not shown) connected to the bus 1910. The mass storage device 1912 and its associated computer-readable media provide non-volatile storage for the computer architecture 1900. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 1900.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 1900. For purposes the claims, the phrase "computer storage medium," "computer-readable storage medium" and variations thereof, does not include waves, signals, and/or other transitory and/or intangible communication media, per se.

According to various configurations, the computer architecture 1900 may operate in a networked environment using logical connections to remote computers through the network 1056 and/or another network (not shown). The computer architecture 1900 may connect to the network 1056 through a network interface unit 1914 connected to the bus 1910. It should be appreciated that the network interface unit 1914 also may be utilized to connect to other types of networks and remote computer systems. The computer architecture 1900 also may include an input/output controller 1916 for receiving and processing input from a number of other devices, including a keyboard, mouse, or electronic stylus (not shown in FIG. 8). Similarly, the input/output controller 1916 may provide output to a display screen, a printer, or other type of output device (also not shown in FIG. 8).

It should be appreciated that the software components described herein may, when loaded into the CPU 1902 and executed, transform the CPU 1902 and the overall computer architecture 1900 from a general-purpose computing system into a special-purpose computing system customized to facilitate the functionality presented herein. The CPU 1902 may be constructed from any number of transistors or other discrete circuit elements, which may individually or collectively assume any number of states. More specifically, the CPU 1902 may operate as a finite-state machine, in response to executable instructions contained within the software modules disclosed herein. These computer-executable instructions may transform the CPU 1902 by specifying how the CPU 1902 transitions between states, thereby transforming the transistors or other discrete hardware elements constituting the CPU 1902.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 1900 in order to store and execute the software components presented herein. It also should be appreciated that the computer architecture 1900 may include other types of computing devices, including hand-held computers, embedded computer systems, personal digital assistants, and other types of computing devices known to those skilled in the art. It is also contemplated that the computer architecture 1900 may not include all of the components shown in FIG. 19, may include other components that are not explicitly shown in FIG. 19, or may utilize an architecture completely different than that shown in FIG. 19.

Figure 20:
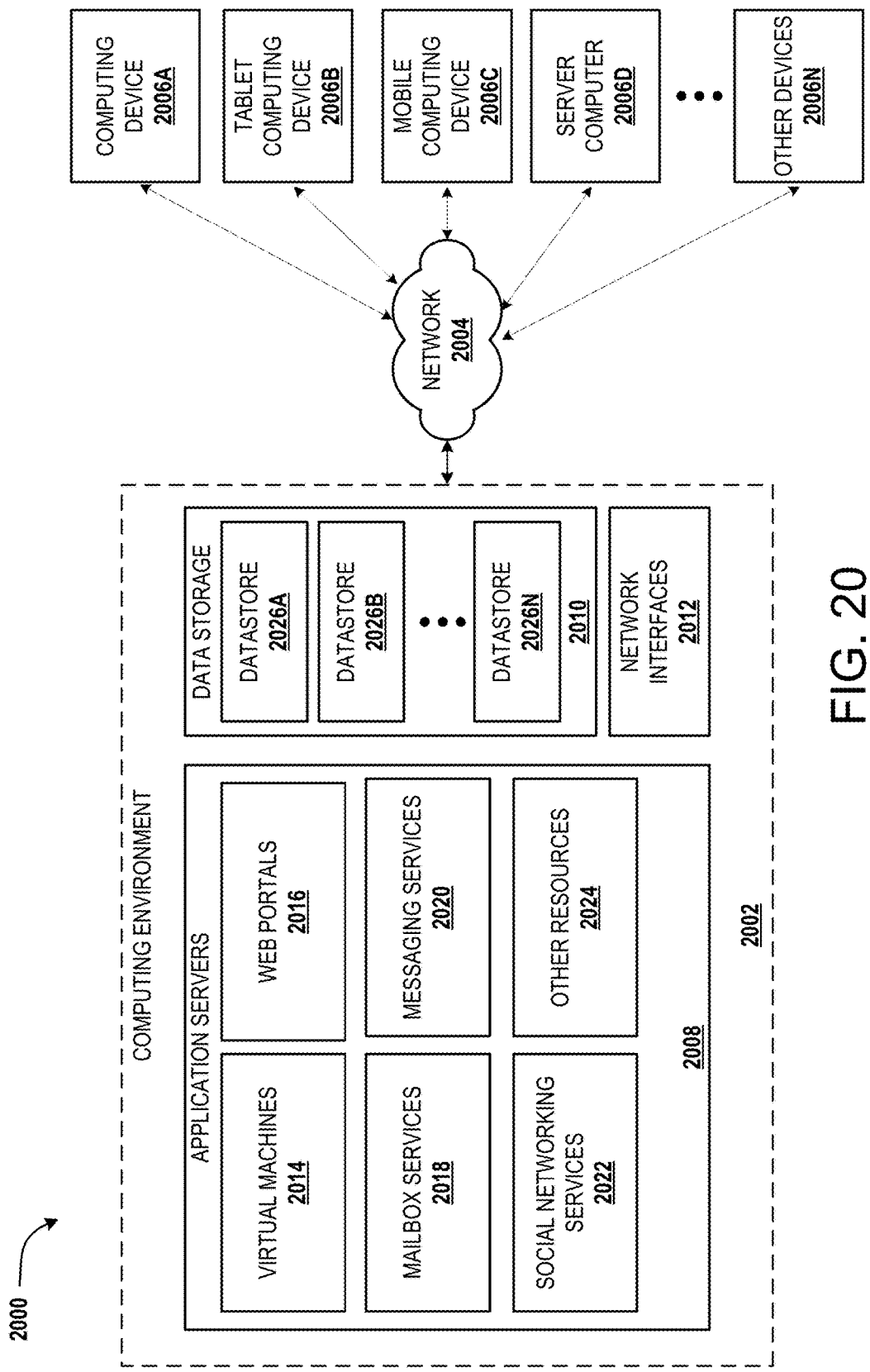
FIG. 20 is a diagram illustrating a distributed computing environment capable of implementing aspects of the techniques and technologies presented herein.

FIG. 20 depicts an illustrative distributed computing environment 2000 capable of executing the software components described herein for providing content authoring based on user intent, among other aspects. Thus, the distributed computing environment 2000 illustrated in FIG. 20 can be utilized to execute any aspects of the software components presented herein. For example, the distributed computing environment 2000 can be utilized to execute aspects of the content collection/generation module 106, the layout generation engine 108 and/or other software components described herein.

According to various implementations, the distributed computing environment 2000 includes a computing environment 2002 operating on, in communication with, or as part of the network 2004. The network 2004 may be or may include the network 124, described above with reference to FIG. 19. The network 2004 also can include various access networks. One or more client devices 2006A-2006N (hereinafter referred to collectively and/or generically as "clients 2006") can communicate with the computing environment 2002 via the network 2004 and/or other connections (not illustrated in FIG. 20). The clients 2006 may include the user computing device 130, and/or the rendering device 110. In one illustrated configuration, the clients 2006 include a computing device 2006A such as a laptop computer, a desktop computer, or other computing device; a slate or tablet computing device ("tablet computing device") 2006B; a mobile computing device 2006C such as a mobile telephone, a smart phone, or other mobile computing device; a server computer 2006D; and/or other devices 2006N. It should be understood that any number of clients 2006 can communicate with the computing environment 2002. Two example computing architectures for the clients 2006 are illustrated and described herein with reference to FIGS. 19 and 21. It should be understood that the illustrated clients 2006 and computing architectures illustrated and described herein are illustrative, and should not be construed as being limited in any way.

In the illustrated configuration, the computing environment 2002 includes application servers 2008, data storage 2010, and one or more network interfaces 2012. According to various implementations, the functionality of the application servers 2008 can be provided by one or more server computers that are executing as part of, or in communication with, the network 2004. The application servers 2008 can host various services, virtual machines, portals, and/or other resources. In the illustrated configuration, the application servers 2008 host one or more virtual machines 2014 for hosting applications or other functionality. According to various implementations, the virtual machines 2014 host one or more applications and/or software modules for content authoring based on user intent. It should be understood that this configuration is illustrative, and should not be construed as being limiting in any way. The application servers 2008 also host or provide access to one or more portals, link pages, Web sites, and/or other information ("Web portals") 2016.

According to various implementations, the application servers 2008 also include one or more mailbox services 2018 and one or more messaging services 2020. The mailbox services 2018 can include electronic mail ("email") services. The mailbox services 2018 also can include various personal information management ("PIM") services including, but not limited to, calendar services, contact management services, collaboration services, and/or other services. The messaging services 2020 can include, but are not limited to, instant messaging services, chat services, forum services, and/or other communication services.

The application servers 2008 also may include one or more social networking services 2022. The social networking services 2022 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 2022 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 2022 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 2022 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 2022 are not mentioned herein for the sake of brevity. As such, the above configurations are illustrative, and should not be construed as being limited in any way. According to various implementations, the social networking services 2022 may host one or more applications and/or software modules for providing the functionality described herein for content authoring based on user intent. For instance, any one of the application servers 2008 may communicate or facilitate the functionality and features described herein.

As shown in FIG. 20, the application servers 2008 also can host other services, applications, portals, and/or other resources ("other resources") 2024. The other resources 2024 can include, but are not limited to, content authoring functionality. It thus can be appreciated that the computing environment 2002 can provide integration of the concepts and technologies disclosed herein with various mailbox, messaging, social networking, and/or other services or resources.

As mentioned above, the computing environment 2002 can include the data storage 2010. According to various implementations, the functionality of the data storage 2010 is provided by one or more databases operating on, or in communication with, the network 2004. The functionality of the data storage 2010 also can be provided by one or more server computers configured to host data for the computing environment 2002. The data storage 2010 can include, host, or provide one or more real or virtual datastores 2026A-2026N (hereinafter referred to collectively and/or generically as "datastores 2026"). The datastores 2026 are configured to host data used or created by the application servers 2008 and/or other data. Although not illustrated in FIG. 20, the datastores 2026 also can host or store core content data model 212, layout-ready view model 216, layout resources, and/or other data utilized by the layout generation engine 108 or other modules. Aspects of the datastores 2026 may be associated with a service, such as ONEDRIVE, DROPBOX or GOOGLEDRIVE.

The computing environment 2002 can communicate with, or be accessed by, the network interfaces 2012. The network interfaces 2012 can include various types of network hardware and software for supporting communications between two or more computing devices including, but not limited to, the clients 2006 and the application servers 2008. It should be appreciated that the network interfaces 2012 also may be utilized to connect to other types of networks and/or computer systems.

It should be understood that the distributed computing environment 2000 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 2000 provides the software functionality described herein as a service to the clients 2006. It should be understood that the clients 2006 can include real or virtual machines including, but not limited to, server computers, web servers, personal computers, mobile computing devices, smart phones, and/or other devices. As such, various configurations of the concepts and technologies disclosed herein enable any device configured to access the distributed computing environment 2000 to utilize the functionality described herein for providing content authoring based on user intent, among other aspects. In one specific example, as summarized above, techniques described herein may be implemented, at least in part, by the web browser application 1910 of FIG. 19, which works in conjunction with the application servers 2008 of FIG. 20.

Figure 21:
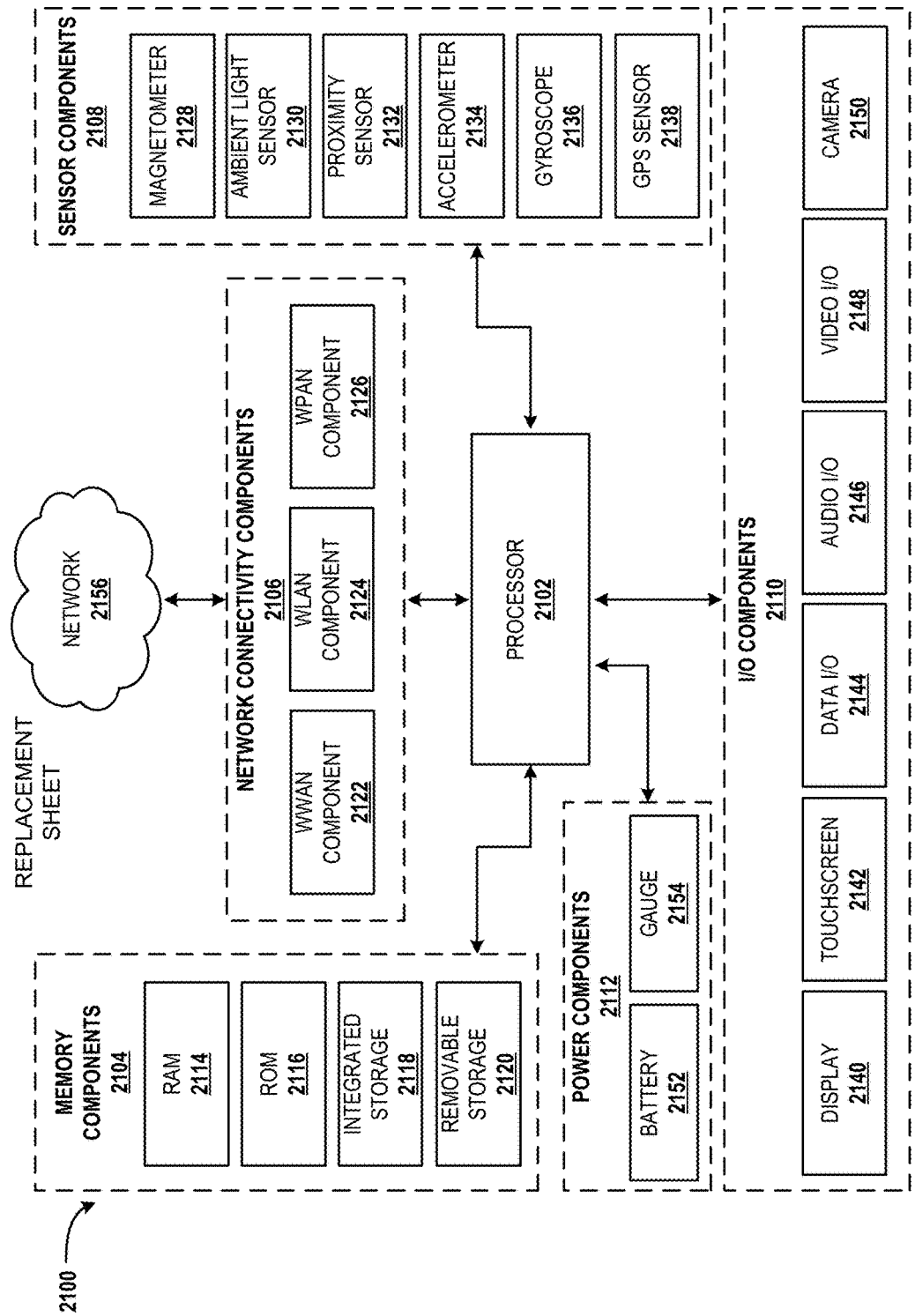
FIG. 21 is a computer architecture diagram illustrating a computing device architecture for a computing device capable of implementing aspects of the techniques and technologies presented herein.

Turning now to FIG. 21, an illustrative computing device architecture 2100 for a computing device that is capable of executing various software components described herein for providing content authoring based on user intent. The computing device architecture 2100 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 2100 is applicable to any of the clients 2006 shown in FIG. 20. Moreover, aspects of the computing device architecture 2100 may be applicable to traditional desktop computers, portable computers (e.g., laptops, notebooks, ultra-portables, and netbooks), server computers, and other computer systems, such as described herein with reference to FIG. 19. For example, the single touch and multi-touch aspects disclosed herein below may be applied to desktop computers that utilize a touchscreen or some other touch-enabled device, such as a touch-enabled track pad or touch-enabled mouse.

The computing device architecture 2100 illustrated in FIG. 21 includes a processor 2102, memory components 2104, network connectivity components 2106, sensor components 2108, input/output components 2110, and power components 2112. In the illustrated configuration, the processor 2102 is in communication with the memory components 2104, the network connectivity components 2106, the sensor components 2108, the input/output ("I/O") components 2110, and the power components 2112. Although no connections are shown between the individuals components illustrated in FIG. 21, the components can interact to carry out device functions. In some configurations, the components are arranged so as to communicate via one or more busses (not shown).

The processor 2102 includes a central processing unit ("CPU") configured to process data, execute computer-executable instructions of one or more application programs, and communicate with other components of the computing device architecture 2100 in order to perform various functionality described herein. The processor 2102 may be utilized to execute aspects of the software components presented herein and, particularly, those that utilize, at least in part, a touch-enabled input.

In some configurations, the processor 2102 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 2102 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 2102 is, or is included in, a system-on-chip ("SoC") along with one or more of the other components described herein below. For example, the SoC may include the processor 2102, a GPU, one or more of the network connectivity components 2106, and one or more of the sensor components 2108. In some configurations, the processor 2102 is fabricated, in part, utilizing a package-on-package ("PoP") integrated circuit packaging technique. The processor 2102 may be a single core or multi-core processor.

The processor 2102 may be created in accordance with an ARM architecture, available for license from ARM HOLDINGS of Cambridge, United Kingdom. Alternatively, the processor 2102 may be created in accordance with an x86 architecture, such as is available from INTEL CORPORATION of Mountain View, Calif. and others. In some configurations, the processor 2102 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 2104 include a random access memory ("RAM") 2114, a read-only memory ("ROM") 2116, an integrated storage memory ("integrated storage") 2118, and a removable storage memory ("removable storage") 2120. In some configurations, the RAM 2114 or a portion thereof, the ROM 2118 or a portion thereof, and/or some combination the RAM 2114 and the ROM 2118 is integrated in the processor 2102. In some configurations, the ROM 2118 is configured to store a firmware, an operating system or a portion thereof (e.g., operating system kernel), and/or a bootloader to load an operating system kernel from the integrated storage 2118 and/or the removable storage 2120.

The integrated storage 2118 can include a solid-state memory, a hard disk, or a combination of solid-state memory and a hard disk. The integrated storage 2118 may be soldered or otherwise connected to a logic board upon which the processor 2102 and other components described herein also may be connected. As such, the integrated storage 2118 is integrated in the computing device. The integrated storage 2118 is configured to store an operating system or portions thereof, application programs, data, and other software components described herein.

The removable storage 2120 can include a solid-state memory, a hard disk, or a combination of solid-state memory and a hard disk. In some configurations, the removable storage 2120 is provided in lieu of the integrated storage 2118. In other configurations, the removable storage 2120 is provided as additional optional storage. In some configurations, the removable storage 2120 is logically combined with the integrated storage 2118 such that the total available storage is made available as a total combined storage capacity. In some configurations, the total combined capacity of the integrated storage 2118 and the removable storage 2120 is shown to a user instead of separate storage capacities for the integrated storage 2118 and the removable storage 2120.

The removable storage 2120 is configured to be inserted into a removable storage memory slot (not shown) or other mechanism by which the removable storage 2120 is inserted and secured to facilitate a connection over which the removable storage 2120 can communicate with other components of the computing device, such as the processor 2102. The removable storage 2120 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 2104 can store an operating system. According to various configurations, the operating system includes, but is not limited to, SYMBIAN OS from SYMBIAN LIMITED, WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 2106 include a wireless wide area network component ("WWAN component") 2122, a wireless local area network component ("WLAN component") 2124, and a wireless personal area network component ("WPAN component") 2126. The network connectivity components 2106 facilitate communications to and from the network 2156 or another network, which may be a WWAN, a WLAN, or a WPAN. Although only the network 2156 is illustrated, the network connectivity components 1006 may facilitate simultaneous communication with multiple networks, including the network 2004 of FIG. 20. For example, the network connectivity components 2106 may facilitate simultaneous communications with multiple networks via one or more of a WWAN, a WLAN, or a WPAN.

The network 2156 may be or may include a WWAN, such as a mobile telecommunications network utilizing one or more mobile telecommunications technologies to provide voice and/or data services to a computing device utilizing the computing device architecture 2100 via the WWAN component 2122. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 2156 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 2156 may be configured to provide voice and/or data communications with any combination of the above technologies. The network 2156 may be configured to or adapted to provide voice and/or data communications in accordance with future generation technologies.

In some configurations, the WWAN component 2122 is configured to provide dual-multi-mode connectivity to the network 2156. For example, the WWAN component 2122 may be configured to provide connectivity to the network 2156, wherein the network 2156 provides service via GSM and UMTS technologies, or via some other combination of technologies. Alternatively, multiple WWAN components 2122 may be utilized to perform such functionality, and/or provide additional functionality to support other non-compatible technologies (i.e., incapable of being supported by a single WWAN component). The WWAN component 2122 may facilitate similar connectivity to multiple networks (e.g., a UMTS network and an LTE network).

The network 2156 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 2124 is configured to connect to the network 2156 via the WI-FI access points. Such connections may be secured via various encryption technologies including, but not limited, WI-FI Protected Access ("WPA"), WPA2, Wired Equivalent Privacy ("WEP"), and the like.

The network 2156 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 2126 is configured to facilitate communications with other devices, such as peripherals, computers, or other computing devices via the WPAN.

The sensor components 2108 include a magnetometer 2128, an ambient light sensor 2130, a proximity sensor 2132, an accelerometer 2134, a gyroscope 2136, and a Global Positioning System sensor ("GPS sensor") 2138. It is contemplated that other sensors, such as, but not limited to, temperature sensors or shock detection sensors, also may be incorporated in the computing device architecture 2100.

The magnetometer 2128 is configured to measure the strength and direction of a magnetic field. In some configurations the magnetometer 2128 provides measurements to a compass application program stored within one of the memory components 2104 in order to provide a user with accurate directions in a frame of reference including the cardinal directions, north, south, east, and west. Similar measurements may be provided to a navigation application program that includes a compass component. Other uses of measurements obtained by the magnetometer 2128 are contemplated.

The ambient light sensor 2130 is configured to measure ambient light. In some configurations, the ambient light sensor 2130 provides measurements to an application program stored within one the memory components 2104 in order to automatically adjust the brightness of a display (described below) to compensate for low-light and high-light environments. Other uses of measurements obtained by the ambient light sensor 2130 are contemplated.

The proximity sensor 2132 is configured to detect the presence of an object or thing in proximity to the computing device without direct contact. In some configurations, the proximity sensor 2132 detects the presence of a user's body (e.g., the user's face) and provides this information to an application program stored within one of the memory components 2104 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 2128 are contemplated.

The accelerometer 2134 is configured to measure proper acceleration. In some configurations, output from the accelerometer 2134 is used by an application program as an input mechanism to control some functionality of the application program. For example, the application program may be a video game in which a character, a portion thereof, or an object is moved or otherwise manipulated in response to input received via the accelerometer 2134. In some configurations, output from the accelerometer 2134 is provided to an application program for use in switching between landscape and portrait modes, calculating coordinate acceleration, or detecting a fall. Other uses of the accelerometer 2134 are contemplated.

The gyroscope 2136 is configured to measure and maintain orientation. In some configurations, output from the gyroscope 2136 is used by an application program as an input mechanism to control some functionality of the application program. For example, the gyroscope 2136 can be used for accurate recognition of movement within a 3D environment of a video game application or some other application. In some configurations, an application program utilizes output from the gyroscope 2136 and the accelerometer 2134 to enhance control of some functionality of the application program. Other uses of the gyroscope 2136 are contemplated.

The GPS sensor 2138 is configured to receive signals from GPS satellites for use in calculating a location. The location calculated by the GPS sensor 2138 may be used by any application program that requires or benefits from location information. For example, the location calculated by the GPS sensor 2138 may be used with a navigation application program to provide directions from the location to a destination or directions from the destination to the location. Moreover, the GPS sensor 2138 may be used to provide location information to an external location-based service, such as E911 service. The GPS sensor 2138 may obtain location information generated via WI-FI, WIMAX, and/or cellular triangulation techniques utilizing one or more of the network connectivity components 2106 to aid the GPS sensor 2138 in obtaining a location fix. The GPS sensor 2138 may also be used in Assisted GPS ("A-GPS") systems.

The I/O components 2110 include a display 2140, a touchscreen 2142, a data I/O interface component ("data I/O") 2144, an audio I/O interface component ("audio I/O") 2146, a video I/O interface component ("video I/O") 2148, and a camera 2150. In some configurations, the display 2140 and the touchscreen 2142 are combined. In some configurations two or more of the data I/O component 2144, the audio I/O component 2146, and the video I/O component 2148 are combined. The I/O components 2110 may include discrete processors configured to support the various interface described below, or may include processing functionality built-in to the processor 2102.

The display 2140 is an output device configured to present information in a visual form. In particular, the display 2140 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 2140 is a liquid crystal display ("LCD") utilizing any active or passive matrix technology and any backlighting technology (if used). In some configurations, the display 2140 is an organic light emitting diode ("OLED") display. Other display types are contemplated.

The touchscreen 2142, also referred to herein as a "touch-enabled screen," is an input device configured to detect the presence and location of a touch. The touchscreen 2142 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 2142 is incorporated on top of the display 2140 as a transparent layer to enable a user to use one or more touches to interact with objects or other information presented on the display 2140. In other configurations, the touchscreen 2142 is a touch pad incorporated on a surface of the computing device that does not include the display 2140. For example, the computing device may have a touchscreen incorporated on top of the display 2140 and a touch pad on a surface opposite the display 2140.

In some configurations, the touchscreen 2142 is a single-touch touchscreen. In other configurations, the touchscreen 2142 is a multi-touch touchscreen. In some configurations, the touchscreen 2142 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 2142. As such, a developer may create gestures that are specific to a particular application program.

In some configurations, the touchscreen 2142 supports a tap gesture in which a user taps the touchscreen 2142 once on an item presented on the display 2140. The tap gesture may be used for various reasons including, but not limited to, opening or launching whatever the user taps. In some configurations, the touchscreen 2142 supports a double tap gesture in which a user taps the touchscreen 2142 twice on an item presented on the display 2140. The double tap gesture may be used for various reasons including, but not limited to, zooming in or zooming out in stages. In some configurations, the touchscreen 2142 supports a tap and hold gesture in which a user taps the touchscreen 2142 and maintains contact for at least a pre-defined time. The tap and hold gesture may be used for various reasons including, but not limited to, opening a context-specific menu.

In some configurations, the touchscreen 2142 supports a pan gesture in which a user places a finger on the touchscreen 2142 and maintains contact with the touchscreen 2142 while moving the finger on the touchscreen 2142. The pan gesture may be used for various reasons including, but not limited to, moving through screens, images, or menus at a controlled rate. Multiple finger pan gestures are also contemplated. In some configurations, the touchscreen 2142 supports a flick gesture in which a user swipes a finger in the direction the user wants the screen to move. The flick gesture may be used for various reasons including, but not limited to, scrolling horizontally or vertically through menus or pages. In some configurations, the touchscreen 2142 supports a pinch and stretch gesture in which a user makes a pinching motion with two fingers (e.g., thumb and forefinger) on the touchscreen 2142 or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes or objects such as styluses may be used to interact with the touchscreen 2142. As such, the above gestures should be understood as being illustrative and should not be construed as being limiting in any way.

The data I/O interface component 2144 is configured to facilitate input of data to the computing device and output of data from the computing device. In some configurations, the data I/O interface component 2144 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 2146 is configured to provide audio input and/or output capabilities to the computing device. In some configurations, the audio I/O interface component 2144 includes a microphone configured to collect audio signals. In some configurations, the audio I/O interface component 2144 includes a headphone jack configured to provide connectivity for headphones or other external speakers. In some configurations, the audio I/O interface component 2146 includes a speaker for the output of audio signals. In some configurations, the audio I/O interface component 2144 includes an optical audio cable out.

The video I/O interface component 2148 is configured to provide video input and/or output capabilities to the computing device. In some configurations, the video I/O interface component 2148 includes a video connector configured to receive video as input from another device (e.g., a video media player such as a DVD or BLURAY player) or send video as output to another device (e.g., a monitor, a television, or some other external display). In some configurations, the video I/O interface component 2148 includes a High-Definition Multimedia Interface ("HDMI"), mini-HDMI, micro-HDMI, DisplayPort, or proprietary connector to input/output video content. In some configurations, the video I/O interface component 2148 or portions thereof is combined with the audio I/O interface component 2146 or portions thereof.

The camera 2150 can be configured to capture still images and/or video. The camera 2150 may utilize a charge coupled device ("CCD") or a complementary metal oxide semiconductor ("CMOS") image sensor to capture images. In some configurations, the camera 2150 includes a flash to aid in taking pictures in low-light environments. Settings for the camera 2150 may be implemented as hardware or software buttons.

Although not illustrated, one or more hardware buttons may also be included in the computing device architecture 2100. The hardware buttons may be used for controlling some operational aspect of the computing device. The hardware buttons may be dedicated buttons or multi-use buttons. The hardware buttons may be mechanical or sensor-based.

The illustrated power components 2112 include one or more batteries 2152, which can be connected to a battery gauge 2154. The batteries 2152 may be rechargeable or disposable. Rechargeable battery types include, but are not limited to, lithium polymer, lithium ion, nickel cadmium, and nickel metal hydride. Each of the batteries 2152 may be made of one or more cells.

The battery gauge 2154 can be configured to measure battery parameters such as current, voltage, and temperature. In some configurations, the battery gauge 2154 is configured to measure the effect of a battery's discharge rate, temperature, age and other factors to predict remaining life within a certain percentage of error. In some configurations, the battery gauge 2154 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 2112 may also include a power connector, which may be combined with one or more of the aforementioned I/O components 2110. The power components 2112 may interface with an external power system or charging equipment via a power I/O component 2142.

The disclosure presented herein may be considered in view of the following clauses.

Clause 1: An example for suggesting content data to a user, the method comprising: obtaining content data provided by a user; analyzing the content data to identify one or more keywords associated with the content data, wherein a selection of the one or more keywords is based on a position of a cursor; retrieving additional content data from one or more content resources based on the one or more keywords; and causing the retrieved additional content data to be displayed in conjunction with the one or more keywords in a user interface, wherein the user interface comprises a user interface control corresponding to at least one of the one or more keywords, the user interface control configured to cause the retrieved additional content data displayed in the user interface to be adjusted based on a selection or a de-selection of the user interface control.

Clause 2: The example of clause 1, wherein the user interface control, when selected, will cause content data elements of the additional content data corresponding to the at least one keyword to be displayed in the user interface, and when deselected, will cause the content data elements corresponding to the at least one keyword not to be displayed in the user interface.

Clause 3: The example of clauses 1 and 2, wherein analyzing the content data, retrieving the additional content data, and causing the retrieved additional content data to be displayed are performed based on an analysis of the content data.

Clause 4: The example of clauses 1-3, wherein analyzing the content data, retrieving the additional content data, and causing the retrieved additional content data to be displayed are performed in response to a request from the user.

Clause 5: The example of clauses 1-4, wherein the one or more content resources comprise a content archive accessible to the user based on a credential of the user.

Clause 6: The example of clauses 1-5, wherein the one or more content resources comprise a content archive stored in a computing device local to the user.

Clause 7: The example of clauses 1-6, wherein the selection of the one or more keywords is based on a window identifying text within a pre-determined area defined around the cursor.

Clause 8: The example of clauses 1-7, wherein the obtained content data comprises one or more of an image, a video clip or text data.

Clause 9: The example of clauses 1-8, wherein the additional content data comprises one or more of an image, a video clip or text data.

Clause 10: The example of clauses 1-9, further comprising: receiving a selection of one or more content data elements of the additional content data; combining the one or more content data elements with the content data obtained from the user; generating a layout based on the combined content; and causing the combined content to be presented in the generated layout.

Clause 11: An example for suggesting content data to a user, the method comprising: obtaining content data provided by a user; analyzing the content data to identify one or more keywords associated with the content data, wherein a selection of the one or more keywords is based on a position of a cursor; retrieving additional content data from one or more content resources based on the one or more keywords; and causing the retrieved additional content data to be displayed in conjunction with the one or more keywords in a user interface, wherein the user interface comprises a user interface control corresponding to at least one of the one or more keywords, the user interface control configured to cause the retrieved additional content data displayed in the user interface to be adjusted based on a selection or a de-selection of the user interface control.

Clause 12: The example of clause 11, wherein the user interface control, when selected, will cause content data elements of the additional content data corresponding to the at least one keyword to be displayed in the user interface, and when deselected, will cause the content data elements corresponding to the at least one keyword not to be displayed in the user interface.

Clause 13: The example of clauses 11-12, wherein analyzing the content data, retrieving the additional content data, and causing the retrieved additional content data to be displayed are performed based on an analysis of the content data.

Clause 14: The example of clauses 11-13, wherein analyzing the content data, retrieving the additional content data, and causing the retrieved additional content data to be displayed are performed in response to a request from the user.

Clause 15: The example of clauses 11-14, wherein the one or more content resources comprise a content archive accessible to the user based on a credential of the user.

Clause 16: An example for suggesting content data to a user, the method comprising: obtaining content data provided by a user; analyzing the content data to identify one or more keywords associated with the content data, wherein a selection of the one or more keywords is based on a position of a cursor; retrieving additional content data from one or more content resources based on the one or more keywords; and causing the retrieved additional content data to be displayed in conjunction with the one or more keywords in a user interface.

Clause 17: The example of clause 16, wherein the selection of the one or more keywords is based on a structure of the content data.

Clause 18: The example of clauses 16-17, wherein the selection of the one or more keywords is based on a contextual interpretation of the content data, and wherein retrieving additional content data from one or more content resources is based on the contextual interpretation of the content data.

Clause 19: The example of clauses 16-18, wherein the selection of the one or more keywords comprises: determining a subject of the input, determining at least one additional subject related to the subject, and generating additional keywords based on the at least one additional subject, wherein retrieving additional content data from one or more content resources based on the additional keywords.

Clause 20: The example of clauses 16-19, wherein the selection of the one or more keywords is based on a window identifying text within a pre-determined area defined around the cursor.

Based on the foregoing, it should be appreciated that concepts and technologies have been disclosed herein for providing content authoring based on user intent. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example configurations and applications illustrated and described, and without departing from the true spirit and scope of the present invention, which is set forth in the following claims.

What is claimed is:

1. A computer-implemented method comprising:
obtaining content data based on text that is input by a user into a text editing section of a user interface that is displayed on a display screen;
identifying a plurality of keywords in the text, the plurality of keywords identified based on a display position that lies within a pre-defined area around a cursor as the cursor changes position within the text editing section of the user interface;
retrieving additional content data from one or more content resources based on the plurality of keywords; and
causing the additional content data to be displayed in conjunction with the plurality of keywords in a content suggestion section of the user interface, wherein the content suggestion section:
is adjacent to the text editing section within the user interfaces;
reproduces the plurality of keywords identified based on the display position that lies within the pre-defined area around the cursor as the cursor changes position within the text editing section of the user interface; and
configures a user interface control for a reproduced keyword of the plurality of reproduced keywords, the user interface control configured to enable the user to actuate a selection or a de-selection of the reproduced keyword and to cause, based on the selection or the de-selection of the reproduced keyword, the additional content data displayed in the content suggestion section of the user interface to be updated.

2. The method of claim 1, wherein identifying the plurality of keywords, retrieving the additional content data, and causing the additional content data to be displayed are performed based on an analysis of the content data.

3. The method of claim 1, wherein identifying the plurality of keywords, retrieving the additional content data, and causing the additional content data to be displayed are performed in response to a request from the user.

4. The method of claim 1, wherein the one or more content resources comprise a content archive accessible based on a credential of the user.

5. The method of claim 1, wherein the one or more content resources comprise a content archive stored in a computing device local to the user.

6. The method of claim 1, wherein the content data comprises text data.

7. The method of claim 1, wherein the additional content data comprises one or more of an image or a video clip.

8. The method of claim 1, further comprising:
receiving a selection of one or more content data elements of the additional content data;
combining the one or more content data elements with the content data;
generating a layout based on the combined content data and the one or more content data elements; and
causing the combined content data and the one or more content data elements to be presented in the layout.

9. A device comprising:
a processor; and
a computer-readable storage medium in communication with the processor, the computer-readable storage medium having computer-executable instructions stored thereupon which, when executed by the processor, cause the device to:
obtain content data based on text that is provided by a user into a text editing section of a user interface that is displayed on a display screen;
analyze the content data to identify one or more keywords that have a display position included within a pre-defined area around a cursor as the cursor changes position within the text editing section of the user interface;
retrieve additional content data from one or more content resources based on the one or more keywords; and
cause the additional content data to be displayed in conjunction with the one or more keywords in a content suggestion section of the user interface, wherein the content suggestion section:
is adjacent to the text editing section within the user interface;
reproduces the one or more keywords identified based on the display position included within the pre-defined area around the cursor as the cursor changes position within the text editing section of the user interface; and
configures a user interface control for a reproduced keyword of the one or more reproduced keywords, the user interface control configured to enable the user to actuate a selection or a de-selection of the reproduced keyword and to cause, based on the selection or the de-selection of the reproduced keyword, the additional content data displayed in the content suggestion section of the user interface to be updated.

10. The device of claim 9, wherein the user interface control, when selected, causes content data elements of the additional content data corresponding to the reproduced keyword to be displayed in the content suggestion section of the user interface, and when de-selected, causes the content data elements corresponding to the reproduced keyword not to be displayed in the content suggestion section of the user interface.

11. The device of claim 9, wherein analyzing the content data, retrieving the additional content data, and causing the additional content data to be displayed are performed as the user writes about a subject.

12. The device of claim 9, wherein analyzing the content data, retrieving the additional content data, and causing the additional content data to be displayed are performed in response to a request from the user.

13. The device of claim 9, wherein the one or more content resources comprise a content archive accessible based on a credential of the user.

14. A computer-implemented method comprising:
obtaining content data as a user writes about a subject within a text editing section of a user interface;
analyzing the content data to identify one or more keywords that have a display position within a pre-defined area around a cursor as the cursor changes position within the text editing section of the user interface;
retrieving additional content data from one or more content resources based on the one or more keywords; and
causing the additional content data to be displayed in conjunction with the one or more keywords in a content suggestion section of the user interface, wherein the content suggestion section:

is adjacent to the text editing section within the user interface;

reproduces the one or more keywords identified based on the display position within the pre-defined area around the cursor as the cursor changes position within the text editing section of the user interface; and includes a user interface control associated with a reproduced keyword of the one or more reproduced keywords, the user interface control configured to select or deselect the reproduced keyword based on user actuation and to cause, based on a selection or a de-selection of the reproduced keyword, the additional content data displayed in the content suggestion section of the user interface to be updated.

15. The method of claim 14, wherein the identification of the one or more keywords is based on a structure of the content data.

16. The method of claim 14, wherein the identification of the one or more keywords is based on a contextual interpretation of the content data, and wherein retrieving the additional content data from the one or more content resources is based on the contextual interpretation of the content data.

17. The method of claim 14, wherein the identification of the one or more keywords comprises:

determining at least one additional subject related to the subject, and generating additional keywords based on the at least one additional subject, wherein retrieving the additional content data from the one or more content resources is based on the additional keywords.

18. The method of claim 1, wherein the pre-defined area is graphically represented by a window on the user interface to bring focus to a text editing position.

19. The device of claim 9, wherein the pre-defined area is graphically represented by a window on the user interface to bring focus to a text editing position.

20. The method of claim 14, wherein the pre-defined area is graphically represented by a window on the user interface to bring focus to a text editing position.

* * * * *